US 6,580,859 B1

(12) United States Patent
Maier

(10) Patent No.: US 6,580,859 B1
(45) Date of Patent: Jun. 17, 2003

(54) METHOD AND DEVICE FOR SWITCHING, AMPLIFICATION, CONTROLLING AND MODULATION OF OPTICAL RADIATION

(75) Inventor: Alexandr Alexandrovich Maier, Moscow (RU)

(73) Assignee: Cleomen Ltd., Moscow (RU)

( * ) Notice: Subject to any disclaimer, the term of this patent is extended or adjusted under 35 U.S.C. 154(b) by 0 days.

(21) Appl. No.: 09/242,255

(22) PCT Filed: Jun. 11, 1998

(86) PCT No.: PCT/RU98/00178
§ 371 (c)(1), (2), (4) Date: Feb. 12, 1999

(87) PCT Pub. No.: WO98/57230
PCT Pub. Date: Dec. 17, 1998

(30) Foreign Application Priority Data

Jun. 13, 1997 (RU) ............................................. 97109964
Nov. 20, 1997 (RU) ............................................. 97119146
Feb. 17, 1998 (RU) ............................................. 98102884

(51) Int. Cl.$^7$ ............................ G02B 6/00; G02B 6/26; G02F 1/35

(52) U.S. Cl. ............................... 385/122; 385/2; 385/5; 385/8; 385/42

(58) Field of Search ................................ 385/122, 1–5, 385/8–10, 16, 42, 129–132

(56) References Cited

U.S. PATENT DOCUMENTS

| | | | | |
|---|---|---|---|---|
| 4,716,449 A | * | 12/1987 | Miller | 257/197 |
| 5,005,933 A | * | 4/1991 | Shimizu | 359/108 |
| 5,673,140 A | * | 9/1997 | Fisher | 359/332 |
| 5,793,905 A | * | 8/1998 | Maier et al. | 359/256 |

FOREIGN PATENT DOCUMENTS

| | | |
|---|---|---|
| EP | 0 806 695 | 11/1997 |
| RU | 1152397 | 9/1982 |
| RU | 1238569 | 10/1984 |
| WO | WO 96/01441 | * 1/1996 ............. G02F/1/01 |

OTHER PUBLICATIONS

F.S. Felber, et al. "Theory of Nonresonant Multistable Optical Devices", Applied Physics Letters, vol. 28, No. 12, 1976, pp. 731–733.

(List continued on next page.)

*Primary Examiner*—John D. Lee
*Assistant Examiner*—Sarah U Song
(74) *Attorney, Agent, or Firm*—Collard & Roe, P.C.

(57) ABSTRACT

The invention has improved parameters when compared iwth prior art devices; pump power was decreased by four orders of magnitude and amplification of signal was increased by two orders of magnitude. The main features of the invention are the following. A nonlinear optical waveguide is made on the basis of a layered MQW-type structure, where unidirectional distributively coupled waves (Ip, Is), e.g. coupled waves having orthogonal polarizations, interact. The wavelength of optical radiation is chosen close to the wavelength of resonance in the structure. Input/output elements, taking into account the asymmetry of the cross section of the nonlinear optical waveguide, are mounted at the input and output of the nonlinear waveguide making up a compact nonlinear-optic module. A small electric current is injected across said nonlinear optical waveguide through electrodes, so as to increase the gain and decrease the pump optical power to a high degree. The device also contains a Peltier element and temperature sensor which help to obtain a low predetermined critical power of pump radiation necessary for large signal gain and to set up the necessary operation mode. The method of mounting and the construction of the optical elements of the device are also claimed. The technological reserves can improve already achieved record parameters. The device may be used as all-optical transistor, all-optical switch, logic element and devices based thereon.

62 Claims, 19 Drawing Sheets

(8 of 19 Drawing Sheet(s) Filed in Color)

OTHER PUBLICATIONS

J.M. Marburger, et al. "Theory of a Lossless Nonlinear Fabry–Perot Interferometer", Physical Review A, vol. 17, 1978, p. 335.

H. Winful, et al. "Theory of Bistability in Nonlinear Distributed Feedback Structures", Applied Physics Letters, vol. 35, No. 5, 1979, p. 379.

H. Winful et al. "Hysteresis and Optical Bistability in Degenerate Four–Wave Mixing" Applied Physics Letters, vol. 36, No. 8, 1980, pp. 613–614.

A.A. Maier, "Optical Transistors and Bistable Elements on the Basis of Nonlinear Tranmission . . . ", Kvantovaya Elektron, 9, 1982, pp. 2296–2302.

A.A. Maier, "On Self–Switching of Light in a Directional Coupler", Kvantovaya Elektron, 11, 1984, pp. 157–162.

A.A. Maier, "Self–Switching of Light in Integrated Optics", Izv. Acad. Nauk SSSR, ser. Fis. vol. 48, No. 7, 1984, pp. 1441–1446.

P. Li Kam Wa et al. "All–Optical Switching Between Modes of a GaAs/GaAlAS Multiple Quantum . . . ", Applied Physics Letters, vol. 52, No. 24, 1988, pp 2013–2014.

R. Jin et al. "Picosend All–Optical Switching in Single–Mode GaAs/AlGaAs Strip–Loaded . . . ", Applied Physics Letters, vol. 53, No. 19, 1988, pp. 1791–1792.

H. Escobar, "All–Optical Switching Systems Near Practical Use", Laser Focus World, Oct. 1994, pp. 135–141.

A.A. Maier, "Coupled Modes . . . ", Kvantovaya Electron, vol. 7, No. 7, 1980, pp. 1596–1598.

H.K. Tsang et al. "GaAs/GaAlAs Multiquantum Well Waveguides . . . ", Electronics Letters, vol. 27, No. 22, 1991, pp. 1993–1994.

A.A. Maier, "Optical Self–Switching of Unidirectional . . . " Physics–Uspekhi, vol. 38, No. 9, 1995, pp. 991–1029.

A.A. Maier, "Experimental Observation of the Optical Self–Switching . . . ", Physics Uspekhi, vol. 39, No. 11, 1996, pp. 1109–1135.

C.L. Chuang, et al"GaAs/AlGaAs Multiple–Quantum–Well Nonlinear . . . ", International Journal of Nonlinear Optical Physics, vol. 1, No. 4, 1992, pp. 799–828.

* cited by examiner

METHOD AND DEVICE FOR SWITCHING, AMPLIFICATION, CONTROLLING AND MODULATION OF OPTICAL RADIATION

TECHNICAL FIELD

The present invention relates in general to nonlinear integrated and fiber optics and more specifically to completely optical switches and optical transistors and may be used in both fiberoptic and air-path optical communications, in optical logical schemes and in other fields, where all optical switching, amplification, control and modulation of optical radiation are needed.

BACKGROUND ART

Methods for switching are known in optical bistable devices with opposite-directional coupled waves, in particular, in Fabry-Perot resonators with a cubic-nonlinear medium (Felber F. S., Marburger J. H., *Appl. Phys. Lett.*, 28, 731, 1976; Marburger J. H., Felber F. S., *Phys. Rev., A* 17, 335, 1878), and also in systems with a distributed coupling of waves (Winful H. G., Marburger J. H., Garmire E., *Appl. Phys. Lett.*, 35, 379,1979; Winful H. G., Marburger J. H., *Appl. Phys. Lett.*, 36, 613,1980).

Extensive opportunities for the creation of an optical switching, modulating and amplifying information signal are provided by a different class of systems with so-called unidirectional distributively coupled waves (UDCWs), if these waves propagate in a nonlinear medium. The methods and devices for optical switching, amplifying and modulating optical radiation based on the self-switching of the UDCWs was described for the first time in the papers: A. A. Maier, "The method of signal switching in tunnel coupled optical waveguides", USSR Patent No. 1152397 (September 1982, publ. 1998). [Byull. Izobret. (46), 300 (1988)]; A. A. Maier, "Optical transistors and bistable elements on the basis of nonlinear transmission of light in systems with unidirectional coupled waves", Kvantovaya Elektron. 9, pp.2296–2302 (1982). [Sov. J. Quantum Electron., v.12, 1490 (1982)]; A. A. Maier, "On self-switching of light in a directional coupler", Kvantovaya Elektron. 11, pp.157–162 (1984). [Sov. J. Quantum Electron. v.11, p.101 (1984)]; A. A. Maier, "Self-switching of light in integrated optics", Izv. Acad. Nauk SSSR, ser. Fis., v.48, 1441–1446 (1984). Later these methods and devices were extensively developed in the whole world.

In particular, in the known method for all-optical switching of radiation in tunnel-coupled optical waveguides A. A. Maier, "The method of signal switching in tunnel-coupled optical waveguides", USSR Patent No. 1152397 (September 1982); Byull. Izobret. (46), 300 (1988)], a signal optical radiation with a variable small power and a pump optical radiation with a power more than threshold value are fed into cubic-nonlinear tunnel-coupled optical waveguides.

A method for switching and modulating UDCWs (P. Li. Kam Wa, P. N. Robson, J. S. Roberts, M. A. Pate, J. P. R. David, <<All-optical switching between modes of a GaAs/GaAlAs multiple quantum well waveguide)>>, *Appl.Phys-.Lett.* v.52, No. 24, 2013–2014, 1988.) is also known. The method consists of switching and modulating waves, propagating as different waveguide modes in a nonlinear-optical waveguide made on the basis of a layered semiconductor multiple quantum well (MQW) structure with alternating layers. The switching and modulating are achieved by changing the power transmission coefficient from one wave to another by changing the power at the input of the optical waveguide. Wavelengths are chosen to be close to an exiton resonance wavelength $\lambda_r$ to provide for a maximum cubic-nonlinear coefficient of the waveguide.

With this method and device it is very difficult to fit the exiton resonance wavelength to the wavelength of pump optical radiation and/or signal optical radiation accurately. So it is very difficult to achieve a maximum nonlinear-optical coefficient, and therefore to decrease the threshold and critical powers of pump optical radiation to a sufficient degree. Besides, it is not possible to adjust (control, regulate) values of threshold and critical powers in order to chose a predetermined regime of operation of the device. The impossibility to adjust the values of threshold and critical powers leads to high demands on the stability in time of the pump optical radiation source, because even a small variation of pump optical radiation power can cause accidental radiation switching, i.e. in this case the probability of an accidental error in switching and modulation at the output is high. Besides, the method has the following significant shortcoming. If the exiton resonance wavelength is close to the wavelength of the pump and/or signal optical radiation then a large loss of the optical radiations takes place. In order to carry out the method a nonlinear-optical waveguide made on the basis of a nonlinear-optic semiconductor MQW wafer structure is used. Micro-objectives are placed at the input and output of the nonlinear-optical waveguide. Besides the shortcomings mentioned above, the device also has loss at the input and output due to shortcomings of collimating optics at the input and output, which ignore the shape (form) of the profile (section) of the nonlinear-optical waveguide. The complexity of placing and mounting the micro-objectives relative to the nonlinear-optical waveguide, and the large size of the device are also shortcomings of the method and the device.

One prior-art switching device (R. Jin, C. L. Chuang, H. M. Gibbs, S. W. Kohh, J. N. Polky, G. A. Pubans "Picosecond all-optical switching in single-mode GaAs/AlGaAs strip-loaded nonlinear directional coupler", *Appl. Phys. Lett.*, 53 [19], 1977, pp.1791–1792) also comprises nonlinear TCOWs, made on the basis of a layered nonliner-optic semiconductor MQW structure with alternate layers GaAs/AlGaAs. The wavelength of the input optical radiation is chosen close to the exiton resonance wavelength to provide a large cubic-nonlinear coefficient of the waveguides. Using this device it is possible to implement the method for switching, modulating, amplifying and controlling, consisting in feeding (launching) optical radiation into nonlinear TCOWs, switching coupled waves in the nonlinear-optical waveguides and separating coupled waves in neighboring optical waveguides at the output of the device.

It is also very difficult in this device and method to adjust the threshold and critical power. Besides, in the device the transmission of radiation through the nonlinear TCOWs is only 1%, this being due to the maximum of absorption at the exiton resonance wavelength. The small transmission and the impossibility to adjust the threshold and critical power; and the mode of operation restricts the field of using the device.

Besides the shortcomings mentioned above, this switching device has optical power losses because of defects of the collimating optics placed at the input and output of the device.

The low efficiency of the focusing and collimating elements at the input and output of the known devices is due to difficulties in precisely positioning and mounting the focusing and collimating elements (objectives) relative to the nonlinear-optical waveguides. Besides, the focusing and collimating elements in the known device do not take into account the asymmetry of the cross section of the nonlinear-optical waveguide(s).

Known methods for feeding light into an optical waveguide (for example, Inventor's Certificate SU No. 1238569, 1984) do not provide possibility to control and check the efficiency of feeding optical radiation into the optical waveguide. This method does not provide for mounting focusing and collimating optical elements relative to the nonlinear-optical waveguide with precision, satisfying the high requirements in respect to the efficiency of feeding radiation into and/or feeding radiation out of the nonlinear-optical waveguide. This method cannot be used for mounting a semiconductor laser or laser module relative to the nonlinear-optical waveguide or nonlinear TCOWs either.

Uniting (joining) the aforesaid devices into a single chip is of great interest for devices processing optical signals, for example, for logical optical schemes, for optical computing devices and optical communications systems.

Known switching and logical schemes, for instance, described in the Hector E. Escobar <<All-optical switching systems near practical use>>, Laser Focus World, October 1994, pp.135–141, paper have limited possibilities due to insufficient speed of operation.

Thus, the known methods and devices place limitations upon the value of the amplification factor of a variable signal.

DISCLOSURE OF THE INVENTION

A technical object of the invention is to significantly decrease the pump power at the input of the device with the possibility of increasing the gain (and sensitivity of the device to signal variation) and depth of switching, and also to provide the possibility for adjustment of threshold and critical powers and control of the differential amplification factor of a variable optical signal and the ratio of powers of coupled waves at the output of the device, and to achieve reliability of its operation and small sizes of the device.

A positive technical result of the present invention is also expressed in providing favorable conditions for creating an optical transistor, as well as devices based thereon.

A technical object of the invention is also to increase the speed of operation of the optical switching devices by use of quadratic-nonlinear-optical waveguide(s).

In first and second variants of a method of switching, amplification, controlling and modulation of optical radiation with use of a nonlinear-optical waveguide, made on the basis of a layered semiconductor MQW-type structure with alternating layers containing at least two hetero-transitions, the nonlinear-optical waveguide is made with an opportunity for propagation in it of two UDCWs, and the method including input of coherent optical radiation with power above the threshold power into the nonlinear-optical waveguide, or of pump optical radiation with power above the threshold power and at least one coherent signal optical radiation into the nonlinear-optical waveguide, interaction of UDCWs in the nonlinear-optical waveguide and separation of UDCWs at the output of the nonlinear-optical waveguide, the object is solved in that a cubic and/or quadratic-nonlinear-optical waveguide is used, the wavelength of radiation is chosen from a condition $0.5\lambda_r \leq \lambda \leq 1.5\lambda_r$, where $\lambda_r$ is a wavelength of one-photon exiton resonance and/or two-photon exiton resonance and/or band-gap resonance and/or half-band-gap resonance of the semiconductor structure of the nonlinear-optical waveguide, an electrical current is passed through the nonlinear-optical waveguide a change of power, or polarization, or wavelength, or angle of input of continuous waves or signal optical radiation, or external electrical or magnetic field applied to the nonlinear-optical waveguide is made at the input of optical radiation or signal optical radiation into the nonlinear-optical waveguide.

In the third and fourth variants of the method of switching, amplification, controlling and modulation of optical radiation with use of a nonlinear-optical waveguide, made on the basis of a layered semiconductor MQW-type structure with alternating layers containing at least two hetero-transitions, and nonlinear-optical waveguide is made with an opportunity of propagation in it of two UDCWs, the method including input of polarized optical radiation with power above threshold power or polarized pump optical radiation with power above threshold power and of at least one polarized signal optical radiation into the nonlinear-optical waveguide, interaction of UDCWs of various polarizations in the nonlinear-optical waveguide and separation of the waves of various polarizations after output from the nonlinear-optical waveguide, the object is solved in that the nonlinear-optical waveguide is made cubic- and/or quadratically-nonlinear, the nonlinear-optical waveguide is made birefringent and/or optically active, an electrical current is passed through the nonlinear-optical waveguide, the wavelength of radiation is chosen from a condition $0.5\lambda_r \leq \lambda \leq 1.5\lambda_r$, where $\lambda_r$ is a wavelength of one-photon exiton resonance and/or two-photon exiton resonance and/or band-gap resonance and/or half-band-gap resonance of the semiconductor structure of the nonlinear-optical waveguide, a change of power, or polarization, or wavelength, or angle of input of continuous waves or signal optical radiation, or external electrical or magnetic field applied to the nonlinear-optical waveguide is implemented.

In the fifth and sixth variants of the method of switching, amplification, controlling and modulation of optical radiation with use of nonlinear-optical TCOWs, at least one of which is made on the basis of a semiconductor layered MQW-type structure with alternating layers containing at least two hetero-transitions, the method including input of optical radiation with power above threshold power or at least one signal optical radiation into at least one of the nonlinear-optical waveguides and pump optical radiation with power above threshold power into at least one nonlinear-optical waveguide, interaction of UDCWs in the nonlinear-optical TCOWs and separation and/or separation out of the optical waves after the output from the nonlinear-optical waveguides by feeding radiations from various waveguides and/or by means of a separator, the object is solved in that nonlinear-optical waveguides are made as cubic and/or quadratic-nonlinear, an electrical current is passed through at least one nonlinear-optical waveguide, a wavelength of optical radiation is chosen from a condition $0.5\lambda_r \leq \lambda \leq 1.5\lambda_r$, where $\lambda_r$ is a wavelength of one-photon exiton resonance and/or two-photon exiton resonance and/or band-gap resonance and/or half-band-gap resonance of the semiconductor structure of least one nonlinear-optical waveguide, a change of power, and/or wavelength, and/or of polarization of input optical radiation, and/or of external electrical or magnetic field is implemented at the input of optical radiation in nonlinear-optical waveguide and applied to at least one nonlinear-optical waveguide.

Thus in all variants of the method the nonlinear-optical waveguide has a length which is not smaller than the length necessary for switching and/or transfer of at least 10% of power from one of the UDCWs into another, and the length of the nonlinear-optical waveguide, necessary for switching and/or transfer of at least 10% of power from one of said UDCWs into another, does not exeed the length, at which the power of the more strongly attenuated wave from the UDCWs decreases by 20 times or less.

In a more preferable embodiment of the suggested method and device, the length of the nonlinear-optical waveguide is not less than the length which is necessary for the switching and/or the transfer of at least 50% of power of one of the unidirectional distributively coupled waves to another one from the unidirectional distributively coupled waves, and the length of the nonlinear-optical waveguide which is necessary for the switching and/or the transfer at least 50% of the power of the one of the unidirectional distributively coupled waves to the other one from the unidirectional distributively coupled waves, does not exceed the length at which the power of the most attenuated wave from the unidirectional distributively coupled waves is attenuated by a factor of 10.

In an even more preferable embodiment of the suggested method and device, the length of the nonlinear-optical waveguide is not less than the length which is necessary for the switching and/or the transfer of at least 80% of power of one of the unidirectional distributively coupled waves to another one from the unidirectional distributively coupled waves, and the length of the nonlinear-optical waveguide which is necessary for the switching and/or the transfer at least 80% of the power of the one of the unidirectional distributively coupled waves to the other one from the unidirectional distributively coupled waves, does not exceed the length at which the power of the most attenuated wave from the unidirectional distributively coupled waves is attenuated by a factor of 10.

Thus, in special cases, the power of radiation or power of pump optical radiation is established on an input of the nonlinear-optical waveguide from a condition of maintenance of a given value of the differential factor of amplification and/or of a given ratio of powers and/or difference in phases of UDCWs at the output of stabilization of average power of continuous wave radiation or peak power of pulse radiation, or power of pump optical radiation.

In order to increase the differential gain and maintain linearity of the amplification in the case of cubic-nonlinear-optical waveguide or cubic-nonlinear TCOWs, as a rule power of the fed continuous wave radiation, or peak power of the fed pulse radiation, or power of the pump optical radiation is chosen in the range from 0.4 $P_M$ to $3P_M$, where $P_M$—the critical power given (consideration below); or mainly—in the range from 0.6 $P_M$ to 1.5 $P_M$, or even more preferably from 0.8 $P_M$ to 1.2 $P_M$.

As a rule, the average power of radiation or the power of pump optical radiation, fed into the nonlinear-optical waveguide is stabilized.

In another special case pulse radiation, in particular solitons, is used as optical radiation or pump optical radiation and/or signal optical radiation.

Thus, in special cases, the temperature of the nonlinear-optical waveguide or at least one nonlinear-optical waveguide is set from a condition of choosing and maintaining the given value of threshold power and/or critical power and/or the differential factor of amplification and/or a given ratio of the powers and/or differences in phases of UDCWs at the output of the nonlinear-optical waveguide and/or differences in phases between them, and to stabilize the temperature of the nonlinear-optical waveguide.

In order to reduce threshold radiation intensity (by making the wavelengths of radiation and of the exiton resonance of the semiconductor structure closer) and to eliminate the influence of external temperature influences, the temperature of the nonlinear-optical waveguide or nonlinear TCOWs is adjusted and/or stabilized with a thermostat and/or at least one Peltier element, equipped with a regulator and/or a stabilizer of temperature.

In all variants of the method the power of pump optical radiation can be at least more than the power of signal optical radiation by a order of magnitude, or the powers of signal optical radiation and pump optical radiation can differ from their average value by no more than an order of magnitude.

As a rule, in order to exclude the existence of opposite-directional distributed coupled waves in the nonlinear-optical waveguide, at least one end face of the nonlinear-optical waveguide is covered with an AR coating.

As a rule, the wavelength $\lambda$ of the optical radiation is chosen from the conditions $0.9\lambda_r \leq \lambda \leq 1.1\lambda_r$.

In the variant of the method in which UDCWs having different polarizations (as a rule, having mutually orthogonal polarizations) are used, as a rule, the nonlinear-optical waveguide is made as birefringent and/or optically active. It should be mentioned that the MQW-type structure almost always has birefringence, however to reach a predetermined, sufficiently large birefringence, the difference in the refractive indexes of the layers should be sufficiently large; hence the value of <<x>> in such a structure as $GaAs/Al_xGa_{1-x}As$ should be sufficiently large, e.g. x>0.1.

In special cases the UDCWs are waves of various wavelengths and/or various polarizations and/or various waveguide modes.

In special cases of all variants of the method, continuous waves of pulse radiation or pump optical radiation and/or signal optical radiation fed into the nonlinear-optical waveguide includes waves of two frequencies differing by a value larger than $\tau^{-1}$, where $\tau$ is a characteristic time of change of a parameter of the optical radiation. The parameter of the optical radiation is the power, the phase, the polarization, or the frequency of the optical radiation, the parameter of the signal optical radiation is the power, the phase, the polarization, or the frequency of the signal optical radiation. In particular, the carrying frequencies of signal optical radiation and pump optical radiation differ by a value larger than $\tau^{-1}$, where $\tau$ is a characteristic time of a change of a parameter of the signal optical radiation, in particular, pump optical radiation and signal optical radiation of various wavelengths are used. Then, after the output of the nonlinear-optical waveguide(s) the radiations of various wavelengths are separated or at least one of them is separated out by means of the separator.

In other special cases, optical radiation of linear or elliptic or circular polarization is used as coherent optical radiation fed into at least one nonlinear-optical waveguide or the pump optical radiation contains waves of at least two polarizations or two wavelengths or two waveguide modes.

In particular, pump optical radiation and signal optical radiation having identical or opposite circular polarization are used, or pump optical radiation and signal optical radiation having identical or various linear or elliptic polarization are used, thus at the output of the nonlinear-optical waveguides radiation of various polarizations are separated or at least one of them is separated by means of the separator.

In particular, pump optical radiation and signal optical radiation with linear or elliptic mutually orthogonal polarizations are used.

In a specific case, a difference in phases between the UDCWs having orthogonal polarization in the optical radiation fed into the nonlinear-optical waveguide is set up from the condition of maintenance of the given value of differential gain and/or the ratio of the UDCW powers at the output of the nonlinear-optical waveguide and/or the differences between the UDCW phases at the output.

In special cases, with one birefringent nonlinear-optical waveguide, a vector of an electrical field or an axis of an ellipse of polarization in optical radiation (or in signal and/or pump optical radiation) fed into the aforesaid nonlinear-optical waveguide is directed at an angle of $10°<\alpha<80°$ to a <<fast>> or <<slow>> axis of the aforesaid nonlinear birefringent optical waveguide, in particular, the vector of the electrical field or the axis of the ellipse of polarization in the optical radiation (or signal and/or pump optical radiation) entered into the aforesaid nonlinear-optical waveguide is directed at an angle of $10°<\alpha<80°$ or $30°<\alpha<60°$ or $45°$ or $-15<\alpha<15°$ to the <<fast>> or <<slow>> axis of the nonlinear-optical waveguide, either vector of the electrical field or the axis of the ellipse of polarization in optical radiation (or in the signal and/or the pump optical radiation) entered into the nonlinear-optical waveguide coincides with the <<fast>> or <<slow>> axis of the nonlinear-optical waveguide.

Thus, they orient the vector of the electrical field or the axis of the ellipse of polarization in optical radiation, entered into the nonlinear-optical waveguide relative to the <<fast>> or <<slow>> axis of the nonlinear-optical waveguide, by a turn of the optical elements of the nonlinear-optical module (connected by fiber-optic sockets and/or by optical connectors) around a longitudinal axis of the nonlinear optic module.

In special cases pump optical radiation and signal optical radiation with the same wavelength are used.

In special cases the pump optical radiation contains waves of at least two polarizations or two wavelengths or two waveguide modes.

As a rule, optical radiation of the semiconductor laser and/or of the laser module is used as coherent optical radiation, or pump optical radiation and/or signal optical radiation fed into the nonlinear-optical waveguide or nonlinear TCOWs. With this, in order to reduce, regulate or choose given threshold and critical powers and to increase or regulate differential gain (by increasing or regulating the nonlinear factor of the nonlinear-optical waveguide due to regulation of the degree of closeness to an exiton resonance of the wavelength of radiation of the laser) the temperature of radiating semiconductor structure of the laser and/or of the laser module is additionally adjusted and/or stabilized.

To increase the efficiency of feeding optical radiation into the nonlinear-optical waveguide and/or to increase the efficiency of feeding optical radiation out of the nonlinear-optical waveguide, the optical elements for the input/output of the optical radiation (hereinafter referred to as ‚input/output elements,,) are mounted accordingly at the input and/or at the output of the nonlinear-optical waveguide, wherewith the input/output elements are mounted relative to the nonlinear-optical waveguide with a precision provided by their positioning (adjustment) with the aid of luminescent radiation of the nonlinear-optical waveguide, occurring when electrical current is passed through the nonlinear-optical waveguide.

As a rule, the input/output elements are made with asymmetry of the cross section of the nonlinear-optical waveguide. In other words the input/output elements are usually made with asymmetrical divergence of beam launching into the nonlinear-optical waveguide and/or asymmetrical divergence of the beam leaving the nonlinear-optical waveguide. That is why the efficiency of the input/output of optical radiation is very high ( the efficiency is about 70% and higher).

As a rule the input/output elements are mounted at the input and output ends of the nonlinear-optical waveguide, making a compact combined nonlinear-optic module.

In a specific preferred embodiment, the input/output elements are made as objectives; wherein, as a rule, the objective comprises a cylindrical lens and a gradan. In other words, to increase the efficiency of the input/output of optical radiation, the optical radiation is focused before the input and/or after passage through the nonlinear-optical waveguide the optical radiation is collimated by a cylindrical lens and/or gradan. As a rule, the surfaces of the cylindrical lenses and/or gradans are antireflection coated.

The positioning and/or mounting of the input and/or output elements, made as objectives, relative to the nonlinear-optical waveguide is accomplished until the formation of a collimated optical radiation beam outside (beyond) the objectives. As a rule the collimated optical radiation beam has cylindrical symmetry.

In another special preferred embodiment, the input/output elements are made as input and/or output optical waveguides (hereinafter referred to as input/output waveguides). In this case the feeding of optical radiation into the nonlinear-optical waveguide and/or the feeding of radiation out of the nonlinear-optical waveguide is carried out by the input and/or output waveguide. As a rule, a lens is made and/or gradan is mounted on the output and/or input end of the input and/or output optical waveguide. Usually the lens is made as a cylindrical lens or a parabolic lens or a conic lens. It should be noted that the output end of the input waveguide is adjoined to the input of the nonlinear-optical waveguide, and so the lens, by means of which the radiation is launched into the nonlinear-optical waveguide is formed on the output end of the input waveguide. Similarly the input end of the output optical waveguide is adjoined to the output of the nonlinear-optical waveguide, and so the lens, by means of which the radiation is fed out of the nonlinear-optical waveguide, is formed on the input end of the output optical waveguide. As a rule, the input and/or output end of the optical waveguides and/or gradans are antireflection coated.

The input and output waveguides are preferably surrounded by protective buffer covers. As a rule 3 mm and 0.9 mm buffer covers can be used.

The nonlinear-optical waveguide together with firmly mounted input/output elements at the ends of the nonlinear-optical waveguide can make up a nonlinear-optical module. Thus, a nonlinear-optical module comprises at least one nonlinear-optical waveguide and input/output elements. Besides, a nonlinear-optical module can comprise other optical elements: a separator of UDCWs, an optical polarizer, an optical isolator, laser, phase compensator, polarization controller and etc., optically and firmly mechanically connected to each other; and other elements: a thermoelectric Peltier element, temperature sensor, mountings elements and other subsidiary elements firmly connected to each other.

In order to provide the possibility for modulation of optical radiation by an electric current on the basis of Faraday effect, the input waveguide is made from a magneto-optic material and is placed in a solenoid, through which a variable electrical current modulating the polarization of the optical radiation is passed, or is made as an electrooptical rotator of a plane of polarization; or the input waveguide contains a Y-mixer, into one input input branch of which the signal optical radiation is fed, and into the other input branch—the pump optical radiation is fed wherein, the input branch, into which the signal optical radiation is fed, is made from a magneto-optic material and is placed in a solenoid, through which the variable electric current modulating polarization of signal optical radiation is passed, or is made as an electrooptical rotator of a plane of polarization.

As a rule, in all variants of the method, a constant electric current from 0.5 mA up to 10 mA is carried (passed) across the nonlinear-optical waveguide, wherein the current spread from an average value over time does not exceed 0.1 mA.

In that specific case, with the purpose of providing the possibility of controllability (in particular, for rejection of noise and jamming in optical communication lines) the electric current is passed through the nonlinear-optical waveguide in given intervals of time.

In another special case for elimination of atmosphere fluctuations, noise and jamming dependences on time of powers of the UDCWs, separated after the output of the nonlinear-optical waveguide, are compared and their amplified opposite-modulation in powers is selected out by means of a correlator and/or differential amplifier.

It is preferred for elimination of the return influence of reflected radiation that an optical isolator be mounted before the input of the nonlinear-optical waveguide and/or after its output. In particular, the optical isolator is made as a waveguide optical isolator, e.g., fiber-optic isolator.

In all variants of the method the separation of UDCWs after the output of the nonlinear-optical waveguide is executed by the separation of waves of various polarizations and/or of various wavelengths, and/or of waves in different TCOWs, and/or of various waveguide modes or by the separation out of one wave of predetermined polarization, or predetermined wavelength, or from one of TCOWs, or predetermined waveguide mode.

In the case of using UDCWs of various polarizations, their separation after the output of the nonlinear-optical waveguide is carried out by a polarizer, which, as a rule, is made as a polaroid, or a polarizing prism, or a birefringent prism, or a directional coupler, separating polarization, or as a polarizer on the basis of a single optical waveguide.

In special cases, in order to reduce the requirements in respect to stability of a source of pump optical radiation, pump optical radiation and/or at least one signal optical radiation with various wavelengths is chosen, and the wavelength of the exiton resonance $\lambda_r$ in the semiconductor MQW-type structure of the nonlinear-optical waveguide is set by regulation of its temperature, and/or the wavelength of laser radiation is set by regulation of the temperature of the radiating semiconductor structure of the laser in such manner that the difference between the wavelength of signal optical radiation(s) and the wavelength of the exiton resonance in the semiconductor MQW-type structure of the nonlinear-optical waveguide is less than the difference between the wavelength of the pump optical radiation and the wavelength of the exiton resonance in the semiconductor MQW-type structure of the nonlinear-optical waveguide.

In special cases, in order to reduce the requirements in respect to stability of a source of pump optical radiation, pump optical radiation and/or at least one signal optical radiation with various wavelengths is chosen, and the wavelength of the exiton resonance $\lambda_r$ in the semiconductor MQW-type structure of the nonlinear-optical waveguide is set by regulation of its temperature, and/or the wavelength of laser radiation is set by regulation of the temperature of the radiating semiconductor structure of the laser in such manner that the difference between the wavelength of signal optical radiation(s) and the wavelength of the exiton resonance in the semiconductor MQW-type structure of the nonlinear-optical waveguide is more than the difference between the wavelength of the pump optical radiation and the wavelength of the exiton resonance in the semiconductor MQW-type structure of the nonlinear-optical waveguide.

In the seventh variant of the method of switching, amplification, controlling and modulation of optical radiation carried out with the use of at least one nonlinear-optical waveguide, made on the basis of a layered semiconductor structure such as MQW with alternating layers containing at least two hetero-transitions, and the nonlinear-optical waveguide is made with an opportunity for propagation therein of opposite-directional coupled waves, the method including feeding at least one optical radiation with power above the threshold value into the nonlinear-optical waveguide, switching power between the coupled waves at the output and input of the nonlinear-optical waveguide(s) effected by changing at least one of the parameters of optical radiation at the input, the object is solved by feeding optical radiation with at least one changeable parameter and power above the threshold power or pump optical radiation with power above the threshold power and at least one signal optical radiation with at least one changeable parameter, using an optical waveguide or an optical waveguide having cubic and/or quadratic nonlinearity, passing an electrical current through the nonlinear-optical waveguide(s), choosing a wavelength of optical radiation with a changeable parameter, or pump optical radiation, or signal optical radiation, or pump and signal-optical radiation, from the condition $0.5\lambda_r \leq \lambda \leq 1.5\lambda_r$, where $\lambda_r$ is the wavelength of one-photon exiton resonance or two-photon exiton resonance and/or band-gap resonance or half-band-gap resonance of the semiconductor MQW-type structure of the nonlinear-optical waveguide, changing the power and/or phase(s) and/or polarization of the entered optical radiation, and/or wavelength and/or angle of input of the entered optical radiation, and/or an external electrical or magnetic field applied to the nonlinear-optical waveguide.

In a specific case, the average power of optical radiation with a changeable parameter, or the power of pump optical radiation, entering the nonlinear-optical waveguide(s) at the input waveguide is set from the condition of maintenance of the given value of the differential factor of amplification and/or of the given ratio of powers of the coupled waves at the output and the input of the nonlinear-optical waveguide (s).

As a rule, the average power of optical continuous wave radiation with a changeable parameter or the peak power of pulse optical radiation or the power of pump optical radiation is stabilized.

In another special case, pump optical radiation is applied as pulses, for example, as solitons.

In a specific case, the temperature of at least one nonlinear-optical waveguide is set from the condition of maintenance of a given value of the threshold power and/or of the differential factor of amplification and/or the ratio of the powers of the coupled waves at the output and input ends of the nonlinear-optical waveguide(s), and the temperature of the nonlinear-optical waveguide(s) is stabilized.

In order to decrease threshold intensity of the optical radiation (due to rapproachement of the wavelengths of the radiation and the exiton resonance of the MQW-type structure) and eliminate the influence of external temperature, the temperature of the nonlinear-optical waveguide and the said MQW-type structure are set and/or regulated and/or stabilized by at least one Peltier element and a temperature sensor and/or thermostat.

In a specific case, the wavelength $\lambda$ of the optical radiation with changeable parameter or the pump optical radiation or/and the signal optical radiation are chosen from the condition $0.9\lambda_r \leq \lambda \leq 1.1\lambda_r$.

In special cases, the power of the opposite-directional coupled waves of various frequencies is switched, thus the switching of power is done between the coupled waves of various frequencies and/or of opposite directions.

As a rule, a constant electrical current in the range from 0.5 mA up to 10 mA is passed across the nonlinear-optical waveguide(s), the current spread from the average value over time not exceeding 0.1 mA.

With the aim of achieving the possibility of controlling the gain (in particular, to eliminate noise and jamming in optical communication lines), an electrical current is passed through the waveguide in given intervals of time.

In order to eliminate the influence of radiation reflected from the ends of waveguides on a source of radiation or other optical elements located before the waveguides, and also to eliminate the influence of the reflected radiation on the nonlinear-optical waveguide, an optical isolator is mounted before the input of the nonlinear-optical waveguide and/or after its output. In particular, the optical isolator is made as a waveguide optical isolator, e.g., a fiber-optic isolator.

As a rule, radiation of a semiconductor laser and/or of a laser module is used as optical continuous waves or pulse radiation and/or pump optical radiation and/or signal optical radiation with the temperature of radiating semiconductor structure of the laser and/or of the laser module being adjusted and/or stabilized.

In a specific case, in order to reduce the requirements for stabilizatino of a source of pump optical radiation, pump optical radiation and/or at least one signal optical radiation with various wavelengths is chosen, and the resonance wavelength $\lambda_r$ in the semiconductor structure of the nonlinear-optical waveguide is set by adjustment of its temperature, and/or the radiation wavelength of the laser is set by adjustment of the temperature of the radiating semiconductor structure of the laser in such a way that the difference between the wavelengths of signal optical radiation and of the exiton resonance of the semiconductor structure of the nonlinear-optical waveguide is less than the difference between the wavelengths of pump optical radiation and of the exiton resonance in the semiconductor structure of the nonlinear-optical waveguide.

In another special case, in order to reduce the threshold power, pump optical radiation and/or signal optical radiation with various wavelengths is chosen, and the resonance wavelength $\lambda_r$ in the semiconductor structure of the nonlinear-optical waveguide is set by adjustment of its temperature, and/or the laser radiation wavelength is set by adjustment of the temperature of the radiating semiconductor structure of the laser in such way that the difference between the wavelengths of signal optical radiation and of the resonance in the semiconductor structure nonlinear-optical waveguide is more than the difference between the wavelengths of pump optical radiation and of the resonance of the semiconductor structure of the nonlinear-optical waveguide.

In that specific case, in order to increase the efficiency of input/output of the radiation before feeding radiation into at least one nonlinear-optical waveguide, the radiation is focused and/or after its passage through the nonlinear-optical waveguide(s) the optical radiation is collimated with the help of a cylindrical lens and/or gradan; as a rule, the surfaces of the cylindrical lenses and/or gradans are covered with an AR coating.

In the other special case, in order to increase the efficiency of input/output of optical radiation, the feeding of radiation into the nonlinear-optical waveguide(s) and/or the feeding of radiation from a nonlinear-optical waveguide(s) is carried out by means of a corresponding input and/or output waveguide; as a rule, a cylindrical lens and/or parabolic lens and/or conic lens is made or a gradan is mounted at the output and/or input end of the input and/or output optical waveguide; as a rule, the input and/or the output end of the waveguide(s) and/or gradan(s) are antireflection coated.

In the first and second variants of the device for switching, amplification, controlling and modulation of optical radiation containing a nonlinear-optical waveguide, made on the basis of layered semiconductor structure such as MQW with alternating layers containing at least two hetero-transitions, and the nonlinear-optical waveguide is made with an opportunity for propagation therein of at least two UDCWs, and also the device contains optical elements of an input/output located accordingly at the input and/or the output of the nonlinear-optical waveguide, and a separator of UDCWs at the output of the device, the object is solved in that the nonlinear-optical waveguide is made as cubic and/or quadratic nonlinear, the nonlinear-optical waveguide is provided with contacts for passage of an electric current through it, a wavelength $\lambda_r$ of one-photon and/or two-photon exiton resonance and/or band-gap resonance and/or half-band-gap resonance in the semiconductor structure of at least one nonlinear-optical waveguide satisfies the inequality $0.5\lambda_r \leq \lambda \leq 1.5\lambda_r$, where $\lambda$ is the wavelength of at least one optical radiation fed into the nonlinear-optical waveguide, the input/output elements are mounted relative to the nonlinear-optical waveguide with a precision provided by their positioning with use of luminescent radiation of the nonlinear-optical waveguide, the luminescent radiation occurring when the electric current is passed through the nonlinear-optical waveguide, the device further contains at least one Peltier element, one side of which is in thermal contact with the nonlinear-optical waveguide and with at least one temperature sensor.

In the second variant of embodiment of the device for switching, amplification, controlling and modulation of optical radiation, comprising two nonlinear TCOWs, at least one of which is made on the basis of layered semiconductor structure such as MQW with alternating layers, containing at least two hetero-transition, and optical elements of an input/output located accordingly at the input and/or the output of at least one of the nonlinear TCOWs, the object is solved in that the nonlinear TCOWs are made as cubic and/or quadratic-nonlinear, at least one nonlinear-optical waveguide is supplied with contacts for passage of electric current through it, a wavelength of one-photon and/or two-photon exiton resonance $\lambda_r$ of the semiconductor structure of at least one nonlinear-optical waveguide satisfies the inequality $0.5\lambda_r \leq \lambda \leq 1.5\lambda_r$, where $\lambda$ is the wavelength of at least one optical radiation fed into the nonlinear TCOWs, the input/output elements are mounted relative to the nonlinear-optical waveguides with a precision provided by their positioning with use of luminescent radiation of the nonlinear-optical waveguides, occurring when electrical current is passed through them, the device further contains at least one Peltier element, one side of which is in thermal contact with at least one nonlinear-optical waveguide and with at least one temperature sensor, a length of said nonlinear tunnel-coupled optical waveguides is not less than the length, which is necessary for switching or transfer of at least 10% of power from one of said nonlinear tunnel-coupled optical waveguides to the other one from said nonlinear tunnel-coupled optical waveguides, thereto the length of said nonlinear tunnel-coupled optical waveguides, which is necessary for switching or transferring of at least 10% of the power from one of the nonlinear tunnel-coupled optical waveguides to the other one of the nonlinear tunnel-coupled optical waveguides, does not exceed the length at which the power of the most attenuated wave from said unidirectional distributively coupled waves is attenuated by a factor of 20 or less.

In a more preferable embodiment a length of said nonlinear tunnel-coupled optical waveguides is not less than the length, which is necessary for switching or transfer of at least 50% of power from one of the nonlinear tunnel-coupled optical waveguides to the other one of the nonlinear tunnel-coupled optical waveguides, wherewith the length of said nonlinear tunnel-coupled optical waveguides, which is necessary for the switching or transfer of at least 50% of the power from one of said nonlinear tunnel-coupled optical waveguides to the other one of the nonlinear tunnel-coupled optical waveguides, does not exceed the length, at which the power of the most attenuated wave among the unidirectional distributively coupled waves is attenuated by a factor of 10.

As a rule, at least one temperature sensor and at least one Peltier element are electrically connected to a temperature regulator and/or to a temperature stabilizer.

As a rule the end faces of nonlinear-optical waveguide(s) have AR coatings.

In particular, the AR coatings at the ends of a nonlinear-optical waveguide are made to decrease the reflection factor of optical radiation from input and/or output ends up to a value of no more than 1%.

As a rule, the device contains a source of current (which is usually made as a controller and stabilizer of the current) connected to electrical contacts of the nonlinear-optical waveguide; in particular, the source of current is a source of constant current supplying electric current across the nonlinear-optical waveguide with values from 0.5 mA to 10 mA in operation, wherewith the current spread from an average value in time does not exceed 0.1 mA.

In one specific case, with the purpose to control the gain (in particular, for the elimination of noise and jamming in optic communication lines), the source of constant current is supplied with a high-speed switch.

In another special case, a correlator of optical waves and/or differential amplifier is set after the separator of UDCWs at the output of the device.

In particular cases, the aforesaid semiconductor MQW-type structure is made as alternating layers $GaAs/Al_xGa_{1-x}As$, or $In_xGa_{1-x}As/InP$, or $In_{1-x}Ga_{x'}As_{y'}P_{1-y'}$, Y, where $x \neq x'$ and/or $y \neq y'$, or $CdSe_{1-x}S_x/CdSe$ or $InAs_{1-x}Sb_x/InAs$, or $PbS_xSe_{1-x}/PbSe$, or $Ge_xSi_{1-x}/Si$ or alternating layers of other semiconductor materials.

In the case of using TCOWs, as a rule, both nonlinear TCOWs are made on the basis of a united semiconductor layered MQW-type structure with alternating layers.

In special cases, when the device is used for switching, amplification, controlling and modulation of optical radiation, the separator of the UDCWs at the output of the device is made as the separator of waves with various polarizations; wherewith a polarizer can be mounted before the nonlinear-optical waveguide.

The function of a polarizer can be carried out by an optical isolator mounted before the input of the nonlinear-optical waveguide. The optical isolator also eliminates the return influence of radiation, reflected from waveguide ends and other optical elements, on the source of optical radiation or other optical elements placed before the nonlinear-optical waveguide. In particular, the optical isolator is made as a waveguide optical isolator, e.g., as a fiber-optic isolator.

In special cases, the separator of waves of various polarizations and/or the polarizer, mounted before the nonlinear-optical waveguide or nonlinear TCOWs, is made as a polaroid, or a polarizing prism, or a birefringent prism, or a directional coupler, separating waves of different polarizations, or a polarizer on the basis of a single optical waveguide.

The function of the separator of optical waves with various polarizations can be carried out by the nonlinear-optical waveguide as such or by an optical isolator mounted after the output of the nonlinear-optical waveguide. In the latter case the influence of the reflected radiation on the nonlinear-optical waveguide is eliminated. In particular, the optical isolator is made as a waveguide optical isolator, e.g., a fiber-optic isolator.

In special cases, when optical radiation of various wavelengths is used, the separator of the UDCWs at the output of the device is made as a separator of waves of various wavelengths.

In this case the separator of waves of various wavelengths is made as a dispersive element or a frequency filter or a directional coupler.

In special cases, when the optical radiation of various optical waveguide modes is used, the separator is made as a diaphragm for separation of the various waveguide modes or as a waveguide separator of the modes.

In the case of use of nonlinear TCOWs, as a rule, the TCOWs as such operate as a separator of coupled waves in the neighboring waveguides: one of the UDCWs leaves the zero waveguide, and another leaves the first waveguide.

Sometimes, the nonlinear TCOWs can be made as TCOWs separating radiation of various polarizations and/or of various wavelengths and/or of various waveguide modes at the output of the device.

To provide the possibility for orientation of "fast" and "slow" axes of the nonlinear-optical waveguide relative to a vector of an electrical field of linearly polarized optical radiation or axes of an ellipse of polarization of optical radiation, the semiconductor laser and/or laser module and/or nonlinear-optical waveguide with optical elements for the input and output of radiation and/or the separator of the UDCWs at the output of the device and/or the polarizer mounted at the input of the nonlinear-optical waveguide and/or the optical isolator are connected among themselves by fiber-optic sockets and fiber-optic connectors ensuring an opportunity for the aforementioned elements relative to each other around the optical axis of the device. Wherewith the optical isolator is made as a waveguide optical isolator, as a rule, in the form of a fiber-optic isolator.

As a rule, the nonlinear-optical waveguide is oriented relative to a vector of polarization of optical radiation which has entered the nonlinear-optical waveguide, in such a way that the vectors of an electric field of the linearly polarized optical radiation which has entered the nonlinear-optical waveguide, or the axis of an ellipse of polarization of the elliptically polarized optical radiation, which has entered the nonlinear-optical waveguide, are set at an angle of $10°<\alpha<80°$ to the "<<fast" and/or <<slow>> axes in the birefringent nonlinear-optical waveguide, in a specific case—at an angle of $40°<\alpha<50°$, in particular—at an angle of 45°. In another special case the nonlinear-optical waveguide is oriented relative to a vector of polarization of optical radiation, which has entered the nonlinear-optical waveguide, in such a way that the vectors of an electrical field of the linearly polarized optical radiation which has entered the nonlinear-optical waveguide, or the axis of an ellipse of polarization of the elliptically polarized optical radiation which has entered the nonlinear-optical waveguide is directed at an angle $-10°<\alpha<10°$ to the <<fast>> and/or <<slow>> axes of the nonlinear-optical waveguide. In particular, the vector of an electrical field of the linearly polarized optical radiation which has entered the nonlinear-optical waveguide or the axis of an ellipse of polarization of the elliptically polarized optical radiation which has entered the nonlinear-optical waveguide coincides with the <<fast>> and/or <<slow>> axis of the nonlinear-optical waveguide.

In particular, the opportunity for a relative turn of the elements is provided by use of fiber-optic sockets and connectors such as FC/PC.

Let it be noted that if UDCWs are UDCWs having orthogonal polarization, then the angular position of the separator, which in this case is made as a polarizer (e.g. polaroid), is determined by two UDCWs which are under consideration. So the opportunity for a relative turn (or rotation) of the separator relative to the nonlinear-optical waveguide should be provided. It can be provided by use of fiber-optic sockets and connectors such as FC/PC.

In a specific case, to provide the possibility for input into the nonlinear-optical waveguide of two and more optical radiations (pump optical radiation and at least one signal optical radiation) the input waveguide is made as at least one Y-mixer or directional coupler.

Thus, to provide the possibility for modulation of optical radiation by an electrical current on the basis of the Faraday effect, one input branch of the optical waveguide mixer is made from magneto-optic material and is surrounded by solenoid or is made as an electrooptical rotator of a plane of polarization.

In another special case, the device additionally contains a mixer of pump optical radiation and at least one signal optical radiation mounted at the input of the device; in particular, the mixer is made as a waveguide mixer, in which the output branch is the input waveguide.

As a rule, the input and/or output elements are connected to the nonlinear-optical waveguide by glue, or by splice, or by welding, or by soldering, or by means of a tiny mechanical connector.

In order to set a given difference in the phases of the UDCWs, a phase compensator, or phase controller is mounted at the input and/or at the output of the nonlinear-optical waveguide before and/or after the nonlinear-optical waveguide, in particular, the phase compensator or phase controller is made as an optical waveguide.

As a rule, the device additionally contains at least one semiconductor laser and/or laser module with modulated output radiation power, and/or a laser module as a source of pump optical radiation, the power of which exceeds the threshold power of the semiconductor laser and/or laser module with modulated output radiation power. The semiconductor laser and/or the laser module is mounted relative to the nonlinear-optical waveguide with a precision provided by its positioning with the aid of luminescent emission of the nonlinear-optical waveguide, occurring when electric current is passed across it, and/or by control of a change of optical radiation power, transmitted through the nonlinear-optical waveguide, when the electric current (with a value less than that required for the positioning) across it is switching on and/or switching off; in particular, a semiconductor laser and/or laser module with a spectrum-line width not exceeding 20 Å is used.

Wherewith, the semiconductor laser and/or the laser module is connected to at least one nonlinear-optical waveguide by means of an input element made as an input waveguide.

For stabilization of the radiation wavelength (i.e. frequency) and/or to obtain a one-frequency mode of generation, the semiconductor laser and/or the laser module is made with an external resonator and/or includes a dispersive element.

In a specific case, a periodic grating which is a partially or completely reflecting Bragg reflector is used as at least one mirror of the external resonator.

In particular, the mirror of the external resonator (of the semiconductor laser and/or laser module including the semiconductor laser and optical waveguide) is made as a periodic grating of refractive index in an optical waveguide made in the form of a fiber-optic waveguide contiguous to the laser; or the mirror is made as a corrugation on a surface of the optical waveguide contiguous to the laser.

In another special case, the dispersive element is made as a diffracted grating.

In order to decrease threshold radiation intensity and eliminate the influence of external temperature, the device additionally contains at least one Peltier element, one side of which is in thermal contact with the nonlinear-optical waveguide and with at least one temperature sensor.

Wherewith at least one temperature sensor and at least one Peltier element are electrically connected to a temperature controller (driver) and/or to a temperature stabilizer.

Wherewith a thermistor, and/or a thermocouple and/or a sensor in the form of an integrated circuit is used as the temperature sensor.

In a specific case, the device contains a radiator for the removal of heat, placed in thermal contact with one (<<hot>>) side of Peltier element.

In order to eliminate the influence of external temperature, the radiating semiconductor structure of the laser is additionally provided with at least one thermoelectric Peltier element, a side of which is in thermal contact with the radiating semiconductor structure, and with at least one temperature sensor, wherewith at least one temperature sensor and at least one thermoelectric Peltier element are electrically connected to a controller and/or stabilizer of the temperature.

The device for switching, amplification, controlling and modulation of optical radiation is easily united with similar devices, i.e. it is easily ,cloned,,. To do this it additionally contains at least one device similar to the first one, and at least one input element of each subsequent device is connected optically with at least one output element of the preceding device.

Wherewith, in a specific case, the input/output elements of the separate devices are made as a united optical waveguide or as joined optical waveguides.

In a third variant of the device for switching, amplification, controlling and modulation of optical radiation containing at least one nonlinear-optical waveguide, made on the basis of a layered nonlinear-optical semiconductor MQW-type structure with alternating layers containing at least two hetero-transitions, the device is made with the possibility for propagation in the nonlinear-optical waveguide of at least two opposite-directional coupled waves, the object is achieved in that the nonlinear-optical waveguides are quadratic- and/or cubic- nonlinear, at least one nonlinear-optical waveguide is provided with contacts for passage of an electric current through them, the wavelength $\lambda_r$ of one-photon and/or two-photon exiton resonance in the semiconductor structure of at least one nonlinear-optical waveguide satisfies the relationship $0.5\lambda_r \leq \lambda \leq 1.5\lambda_r$, where $\lambda$ is the wavelength of optical radiation, input and/or output elements are mounted relative to the nonlinear-optical waveguide(s) with a precision provided by their positioning with the aid of luminescent emission of the nonlinear-optical waveguide(s), occurring when the electric current is passed through it (them), the device additionally contains at least one Peltier element, one side of which is in thermal contact with at least one nonlinear-optical waveguide, and with at least one temperature sensor.

In particular cases, the semiconductor structure is made as alternating layers $GaAs/Al_xGa_{1-x}As$, or $In_xGa_{1-x}As/InP$, or $In_{1-y'}Ga_{x'}As_{y'}P_{1-y'}$, where $x \neq x'$ and/or $y \neq y'$, or $CdSe_{1-x}A_x/CdSe$ or $InAs_{1-x}Sb_x/InAs$, or $PbS_xSe_{1-x}/PbSe$, or $Ge_xSi_{1-x}/Si$ or alternating layers of other semiconductor materials.

In special cases, as the temperature sensor, a thermistor, and/or a thermocouple is used and/or the sensor is an integrated circuit.

As a rule, at least one sensor and at least one Peltier element are electrically connected to the temperature controller (regulator) and/or the temperature stabilizer.

In a specific case, the device contains a radiator for the removal heat, placed in thermal contact with at least one Peltier element.

As a rule, the device additionally contains an electric current source, electrically connected to the electrical contacts of the nonlinear-optical waveguide.

As a rule, a current through the nonlinear-optical waveguide passes in a direction perpendicular to the layers of the semiconductor structure.

As a rule, the electric current source is a precision direct current source providing electric current across the nonlinear-optical waveguide in operation with values from 0.5 mA to 10 mA, wherewith the current spread from the average value in time does not exceed 0.1 mA.

As a rule, the contacts for passage of electric current through the nonlinear-optical waveguide are electrically connected to a driver (regulator, controller) and/or stabilizer of the current.

In special cases, the device additionally contains at least one semiconductor laser and/or laser module with modulated output radiation power, and/or laser module as a source of pump optical radiation, the power of which exceeds threshold power of the semiconductor laser and/or the laser module with modulated output radiation power; wherewith the semiconductor laser and/or laser module is mounted relative to the nonlinear-optical waveguide with a precision provided by its positioning by luminescent emission of the nonlinear-optical waveguide, occurring when an electric current flows across it, and/or by the check of a change of optical radiation power, transmitted through the nonlinear-optical waveguide, by switching the electric current (with a value less than that required for the positioning) flowing across it on and/or off; in particular, a semiconductor laser and/or laser module with a spectrum-line width not exceeding 20 Å is used.

In order to eliminate temperature influences and to stabilize the frequency of the laser radiation, the radiating semiconductor structure of the laser and/or of the laser module is additionally provided with at least one Peltier element, one side of which is in thermal contact with the radiating laser semiconductor structure and with at least one temperature sensor, wherewith at least one temperature sensor and at least one Peltier element are electrically connected to a temperature controller and/or stabilizer of temperature.

In special cases, the semiconductor laser and/or laser module is used with a spectrum-line width of radiation, which is not more than 20 Å.

In order to stabilize the wavelength of radiation and/or maintain the one-frequency mode of generation, the semiconductor laser and/or laser module is made with an external resonator and/or includes a dispersive element.

In a specific case, a periodic grating which is a partially or completely reflecting Bragg reflector is used as at least one mirror of the external resonator.

In particular, the mirror of the external resonator of the semiconductor laser and/or of a laser module including the semiconductor laser and waveguide is made as a periodic grating of refraction index contiguous to the laser waveguide, made as a fiber-optic waveguide, or as a corrugation on a surface of an optical waveguide, contiguous to the laser.

In one special case, at the ends of the nonlinear-optical waveguide, the mirrors are made with formation of a Fabry-Perot element.

In particular, the mirrors are made by means of a natural cleave, or by coating reflected coatings, or as periodic gratings which are Bragg reflectors.

In another special case, the periodic grating in the nonlinear-optical waveguide is made with formation of an optical bistable element with distributed feedback.

In special cases, the nonlinear-optical waveguide is birefringent and/or magneto-optic and/or electrooptical and/or acouso-optic.

In a third special case, the device additionally contains a second nonlinear-optical waveguide, and both nonlinear waveguides are TCOWs.

In one special case, in order to increase the radiation input/output efficiency the input and/or output elements are made as objectives consisting of a cylindrical lens and/or gradan; as a rule, the surfaces of the cylindrical lenses and/or gradans are antireflection coated.

In another special case, the input and/or output elements are made as input and/or output waveguides. As a rule, a cylindrical lens and/or parabolic lens and/or conic lens is formed and/or gradan is mounted on the output and/or input face of the said input and/or output optical waveguide. As a rule, the input and/or output faces of the optical waveguides and/or gradans are antireflection coated.

In special cases, the semiconductor laser is connected to at least one nonlinear-optical waveguide by means of an input element with formation of a united optical waveguide.

The object is also achieved in a method for assembly of a nonlinear-optical module comprising positioning, mounting and connection of at least one nonlinear-optical waveguide, made on the basis of a layered nonlinear-optical semiconductor structure such as MQW with alternating layers containing at least two hetero-transition, and input and/or output elements for the input and/or output of optical radiation, the method comprising mounting and positioning input and/or output elements relative to the nonlinear-optical waveguide, and mounting and positioning the input and/or output elements relative to the nonlinear-optical waveguide, provided by contacts for the flow of an electrical current through the nonlinear-optical waveguide, are carried out by luminescent radiation of the nonlinear-optical waveguide, occurring when electric current flows through it. The nonlinear-optical module comprises at least one nonlinear-optical waveguide and input/output elements.

In special cases, the semiconductor laser or the laser module is additionally mounted at least one input of the nonlinear-optical module, the laser or the laser module with the nonlinear-optical module is positioned and connected, and thus the positioning of the laser or the laser module is carried out by changing the mutual position of the laser or laser module and the nonlinear-optical module until there is coincidence of the laser or of the laser module radiation beam and the luminescent radiation beam of the nonlinear-optical waveguide. When the luminescent radiation beam occurs by passing electric current across the nonlinear-optical waveguide; the coincidence must take place before and/or after the nonlinear-optical module.

When carrying out the positioning (adjustment) a current of, as a rule, more than 30 mA flows across the nonlinear-optical waveguide.

As a rule, the precision of positioning the laser or laser module relative to the nonlinear-optical module is additionally controlled by comparing the power of the optical radiation of the laser, or of the laser module, transmitted through the nonlinear-optical module in the absence of the electric current across the nonlinear-optical waveguide and when there is current across it. For this control current of an order of magnitude less than the current providing the aforesaid luminescent radiation of the nonlinear-optical waveguide is usually used.

Wherewith, the current, across the nonlinear-optical waveguide is, as a rule, from 1 up to 10 mA.

In the case of association of several optical modules (so called (<<cloning>>) another other (i.e. the second) similar nonlinear-optical module is additionally positioned and mounted at the output of the first nonlinear-optical module, wherewith the second similar nonlinear-optical module is adjusted relative to the first nonlinear-optical module by means of luminescent radiation of the nonlinear-optical waveguide of the first and/or the second nonlinear-optical module, occurring when an electric current flows across the nonlinear-optical waveguide.

Wherewith, the precision of positioning and mounting the second nonlinear-optical module relative to the first nonlinear-optical module is additionally checked by comparing the power of optical radiation of the laser and/or of the laser module and/or of the first nonlinear-optical module transmitted through the second nonlinear-optical module in the absence of electric current flowing across the nonlinear-optical waveguide of the second nonlinear-optical module and when current flows across it.

During the assembly, as a rule, the optical elements of the nonlinear-optical module and the nonlinear-optical modules are connected by means of fiber-optic connectors with physical. contact, optical fiber sockets, connecting sockets, splices. Optical isolators in the form of optical waveguides, usually as fiber-optic isolators, can be placed between the optical elements and/or before the nonlinear-optical module input and/or after its output and/or between the nonlinear-optical modules.

The object is also achieved in a device for processing optical signals, including at least two optical modules, each of which contains one or two nonlinear-optical waveguide(s) made on the basis of a layered semiconductor MQW-type structure with alternating layers containing at least two hetero-transitions, and a nonlinear-optical waveguide made with the possibility of propagation of two UDCWs in it, and the outputs and inputs of the optical modules are connected to each other in a circuit appropriate to the function of processing the optical signal, wherewith the nonlinear-optical waveguide is supplied with electrical contacts for passage of electric current through them, the outputs and inputs of the preceding and subsequent optical modules are mounted relative to each other with a precision provided by positioning them with use of the luminescent radiation of the nonlinear-optical waveguide of the preceding and/or subsequent nonlinear-optical module, occurring when electric current flows through the nonlinear-optical waveguide.

As a rule, the output/input elements of optical modules, appropriate outputs and inputs of which are optically connected, are made as optical waveguides and are connected by splice or by optical connectors.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

The present inventions are illustrated by the following drawings, wherein.

MODES FOR CARRYING OUT THE INVENTION

Unidirectional distributively coupled waves (UDCWs) are the whole class of waves in optics. We can divide UDCWs into two groups: with linear coupling and nonlinear coupling. The UDCWs of the first (larger) group are: waves in TCOWs, waves with different (usually mutually orthogonal) polarization in a birefringent, or magnito-active, or optically active optical waveguide, different waveguide modes in an in-homogeneous optical waveguide, transmitted and diffracted waves in a periodic structure, etc. In a linear regime when the wave intensities are low and the nonlinearity of the medium in which they are travelling can be ignored, a periodic exchange of power takes place between such waves as they propagate. Thus, if in the linear regime one of the identical ($\alpha \equiv \beta_1 - \beta_0$) UDCWs (with index (<<0>>)) is fed into the input (z=0), then at the output (z=l) there is $I_{01}(L)=I_{00} \cos^2 (L/2)$, $I_{11}(L)=I_{00} \cos^2 (L/2)$, where $L=2\pi Kl/\lambda\beta$, and the parameter L/$\pi$ shows, roughly speaking, how many times the waves exchange power, K is the coefficient of linear distributed coupling, l—the length of distributed coupling of the waves, $\beta$—the average effective refractive index of a wave in the optical waveguide, $\lambda$—the wavelength.

The power transfer coefficient of radiation from one of the UDCWs to another (by a certain length z=l) and therefore the transmission power coefficient $T_k=P_{kl}/\Sigma_k P_{k0}$ through the optical waveguide (or through TCOW) by one of the UDCWs depends on the difference between the effective refractive indices of the waves (so called parameter $\alpha=\beta_1-\beta_0$) The index <<k>> (k=0,1..) in the formula denotes the number of the coupled wave and is explained below in detail.

So if the refractive index of an optical waveguide or TCOWs, in which such waves propagate depends on intensity, i.e. the optical waveguide or the TCOWs is/are optically nonlinear, then the optical power transfer coefficient of radiation from one of the UDCWs to another (by a certain length) and hence $T_k$ as well depend on the input optical radiation power (intensity). This means that nonlinear transmission of optical radiation power through the nonlinear-optical waveguide or nonlinear TCOWs takes place. In other words, nonlinear-optical power transfer between the UDCWs occurs.

Figure 5:
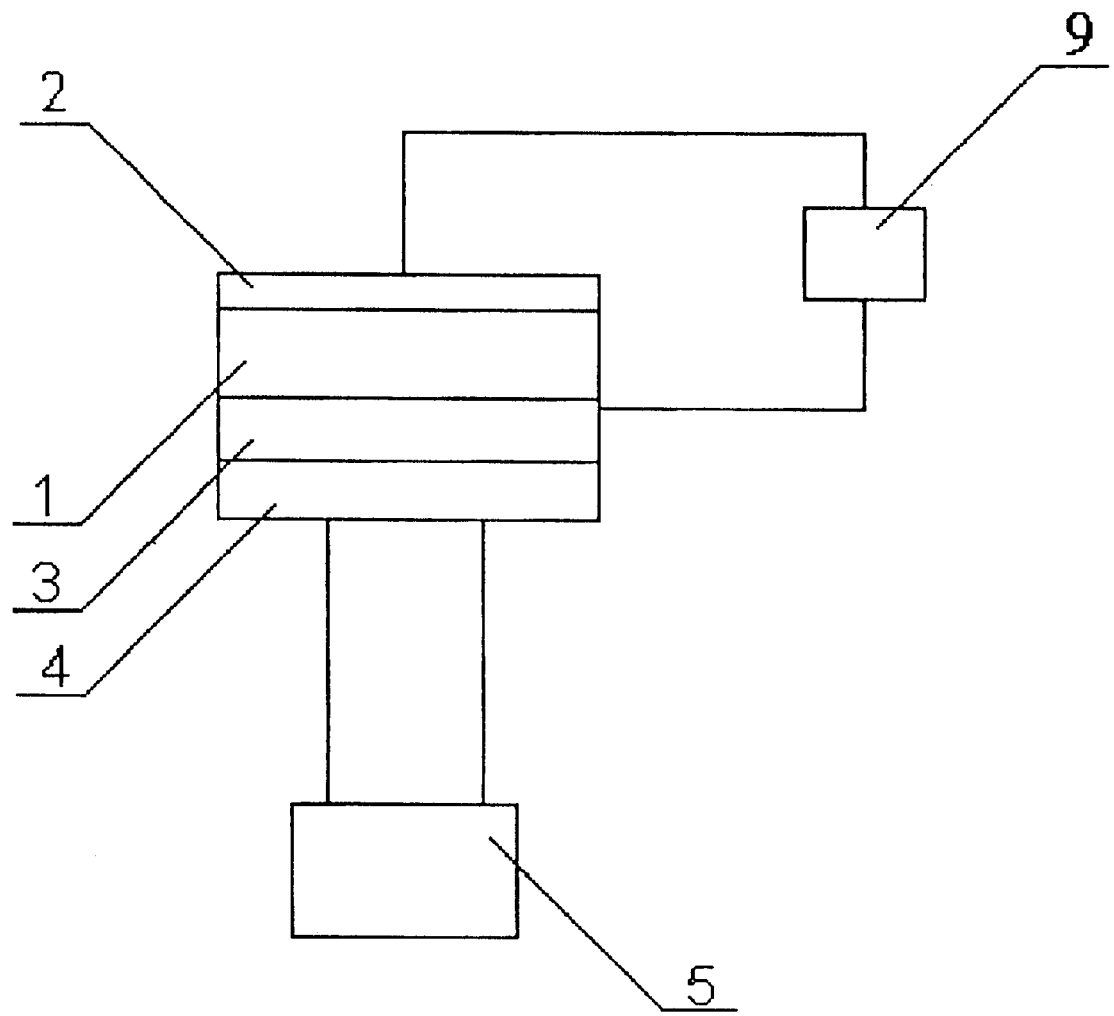
FIG. 5 is a schematic view of a device for implementing the proposed method of switching optical radiation, based on nonlinear-optical waveguide(s) (1).

Theoretical estimations confirmed by experiments shows that not only simple nonlinear-optical power transmission, but a very interesting phenomenon of self-switching of UDCWs can occur if the input intensities of waves are large enough and certain conditions are fulfilled. Under this phenomenon, a slight change in input intensity, phase or polarization causes a much larger change in output intensity, so it can be amplified many times (as shown in FIG. 5), e.g. a hundred times, without distortion. Therefore optical transistors may be created on the basis of such waves (A. A.Maier, "Optical transistors and bistable elements on the basis of nonlinear transmission of light in systems with unidirectional coupled waves", Kvantovaya Elektron. 9, pp.2296–2302 (1982). [Sov. J. Quantum Electron. v.12, 1490 (1982)]).

Figure 1:
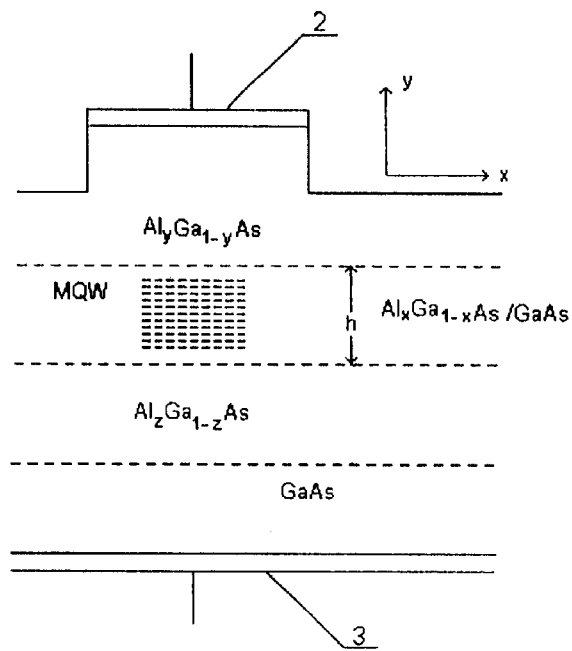
FIG. 1 shows a cross-sectional view of a strip birefringent nonlinear-optical waveguide (1) of ridge-type made on the basis of a semiconductor layered MQW-type structure, e.g., such as $GaAs/Al_xGa_{1-x}As$, with electrical contacts (2,3).

A semiconductor layered MQW-type structure, containing at least two hetero-transitions, can be used as a nonlinear medium (FIG. 1). In the case of two hetero-transitions the semiconductor layered structure is also called a SQW (single quantum well) structure.

The second group of UDCWs includes waves of different frequencies in a quadratic and cubic nonlinear-optical waveguide. If the waves of different frequencies in a cubic-nonlinear-optical waveguide are considered, then what is meant are waves in unidirectional four-wave interaction or waves in a unidirectional third harmonic generation. If the waves of different frequencies in a quadratic-nonlinear-optical waveguide are considered, then what is meant are unidirectional coupled waves under three-wave interaction when $\omega_1+\omega_2=\omega_3$; in the first place what is meant are unidirectional coupled waves under second harmonic generation, when $\omega_3=2\omega$, $\omega_1=\omega_2=\omega$.

UDCWs of orthogonal polarization and UDCWs of different waveguide modes can have both linear and nonlinear distributed coupling.

Another class of coupled waves are the opposite-directional coupled waves including: waves in a Fabry-Perot resonator; transmitted and reflected waves in an optical waveguide with distributed coupling by periodic structure, e.g. in the form of the grating; waves of different frequencies in opposite-directional four-frequency interaction. Under interaction of such waves in a cubic-nonlinear medium, optical bistable elements are realized.

The method of switching in the most interesting and perspective variants is based on nonlinear interaction of UDCWs (with linear and/or nonlinear coupling, including interaction of the waves of different frequencies and polarizations).

Besides, it includes a variant, based on interaction of opposite-directional coupled waves, namely based on an optical bistability of the nonlinear-optical waveguide(s) with: a distributed feedback, or a Fabry-Perot resonator, or an opposite-directional four-wave interaction. In the case of opposite-directional coupled waves, power switching between counter directional coupled waves takes place.

The method is carried into effect by sharp redistribution of power between the coupled waves in a nonlinear-optical waveguide or in nonlinear TCOWs. In one of the variants of the method pump optical radiation and signal optical radiation are fed into the input of the nonlinear-optical waveguide. The signal optical radiation is a controlling and informative signal; the pump optical radiation is launched into at least one of the nonlinear-optical waveguide(s) in order to achieve a nonlinear mode of operation, i.e. to achieve a differential coefficient of amplification (gain) essentially more than unity. As a rule, a pump optical radiation power is larger than a signal optical radiation power by at least an order of magnitude. As a rule a signal optical radiation power is at least an order of magnitude less than a pump optical radiation power. However, sometimes the optical radiation power may have values of the same order of magnitude.

For UDCWs with a linear distributed coupling coefficient K, the length of a nonlinear-optical waveguide (or nonlinear TCOWs) satisfies the $1 \geq l_c \geq l_a$, $1 \geq l_n \geq l_a$, where $l_c \approx \lambda \beta/2K$—a length, at which optical radiation power is transferred from one of the UDCWs to another one in a linear regime; $l_a \approx \lambda/\delta$—a length of attenuation (absorption), $\delta$—attenuation coefficient of the most attenuated wave of the UDCWs; $l_n$—typical (characteristic) scale of nonlinear interaction, the so-called <<nonlinear>> length, at which a nonlinear addition to the refractive index causes a phase change of $\pi/2$ (under K=0). E.g. for TCOWs K—is the coefficient of tunnel coupling between the optical waveguides. For UDCWs of orthogonal polarizations in a birefringent optical waveguide $K/\beta_e-\beta_o/\sin(2\theta)$, where $\theta$ is an angle between a vector of the electric field of radiation, fed into the optical waveguide and <<fast>> and/or <<slow>> axis of the waveguide, $\beta_e\kappa\beta_o$ are effective refractive indexes of waves polarized along <<fast>> and <<slow>> axes of the optical waveguide (in other words of ordinary and extraordinary waves).

For UDCWs having orthogonal polarizations in a birefringent optical waveguide, if the electric field vector of fed radiation is oriented at an angle of 45° to the <<fast>> and/or <<slow>> axis of the optical waveguide, then $l_c \approx \lambda/(4|\beta_o-\beta_e|)$ is a length at which radiation power is transferred from a wave of one polarization to another wave of orthogonal polarization in linear regime. $l_a \approx \lambda/\delta$ is a length of the UDCWs attenuation, $\delta$ is the maximum attenuation coefficient of the most attenuated wave from the UDCWs having orthogonal polarizations. As a rule, the attenuation is caused by absorption.

For a cubic-nonlinear-optical waveguide, $l_n \approx \lambda/(|\theta|I_p)$, where $\theta$ is the cubic-nonlinear coefficient of the nonlinear-optical waveguide. For a quadratic-nonlinear-optical waveguide, $l_n \approx \lambda/(X\sqrt{I_p})$, where X is the quadratic-nonlinear coefficient of the nonlinear-optical waveguide. If $l_c << l_n$, then there is a linear mode. If $l_c >> l_n$, then the power radiation transfer from a wave of one polarization to UDCWs of different (orthogonal) polarization is negligible and almost all the power at the output remains in the wave of initial polarization. In the most interesting case when the switching takes place, the <<nonlinear>> length $l_n \approx \lambda/(|\theta|I_p)$ is equal to the length $l_c$ of an energy transfer in the linear regime; to realize this case the input radiation power is close or equal to the so-called critical intensity $I_M \approx (4|\beta_o-\beta_e|)/|\theta|$. In particular, if the wave with Y-polarization is the most attenuated, then $I_y(z) \cong I_y(z=0)\exp(-z\,\delta/\lambda)$. If the fed optical radiation intensity is close to the critical intensity into the nonlinear-optical waveguide, then $1 \geq l_c \cong l_n \geq l_a$.

Let it be emphasized that in a laser and/or a <<laser>> amplifier, the inverse inequality: $1 \leq l_c \leq l_a$ takes place. This is one of the principle features distinguishing the present invention over the <<laser>> amplifiers.

For UDCWs with a nonlinear coupling coefficient, linear transfer may be absent. In this case <<nonlinear>> length is also a typical length scale of power exchange between the UDCWs, so a length of the nonlinear-optical waveguide has to satisfy the inequality: $1 \geq l_n \geq l_a$.

In other words, to carry out the proposed method, it is necessary that in the nonlinear-optical waveguide or nonlinear TCOWs at least two coupled waves have the possibility to propagate. As one of the coupled waves can have an attenuation coefficient larger than the other, the following condition must be fulfilled: the length of the nonlinear-optical waveguide or nonlinear TCOWs, necessary for effective switching, must not exceed the length at which the power of the most attenuated wave from the interacting coupled waves (e.g., having orthogonal polarizations) is attenuated by $e^2$ times. In this case a difference in attenuation for UDCWs, e.g. having different polarizations, may be caused not only by absorption anisotropy of the nonlinear-optical waveguide, but also by absorption anisotropy of the metal film coating the surface of the semiconductor wafer in which the nonlinear-optical waveguide is, and thereby absorption anisotropy of the semiconductor structure layers having higher conductivity than the other ones and adjoining the nonlinear-optical waveguide.

As experiments show, for a noticeable differential gain it is necessary to switch or transfer at least 10% of the radiation power from one coupled wave to another, as a result of which with a small amplitude of signal optical radiation even a transfer of 10% of the power between the UDCWs can result in achievement of a noticeable increase of the differential gain of signal optical radiation at the output, and the power of the most attenuated wave among the interacting coupled waves (e.g. having orthogonal polarizations) is attenuated by 20 times or less.

This value is by an order of magnitude less than the ratio of powers of two waves having mutually orthogonal polarization in a semiconductor laser or laser module, where interaction of the waves having different orthogonal polarization does not take place, and power exchange between these waves is absent.

In a more preferable embodiment of the proposed method and device, the length of the nonlinear-optical waveguide is not less than the length, which is necessary to switch and/or transfer at least 50% of the power of one of the aforesaid unidirectional distributively coupled waves to the other one of the unidirectional distributively coupled waves, and the length of the nonlinear-optical waveguide, which is necessary to switch and/or transfer at least 50% of the power of the one of the aforesaid unidirectional distributively coupled waves to the other one of the unidirectional distributively coupled waves, does not exceed the length at which the power of the most attenuated wave among the unidirectional distributively coupled waves is attenuated by a factor of 10.

In an even more preferable embodiment of the proposed method and device, the length of the nonlinear-optical waveguide is not less than the length, which is necessary to switch and/or transfer at least 80% of the power of one of the aforesaid unidirectional distributively coupled waves to the other one of the unidirectional distributively coupled waves, and the length of the nonlinear-optical waveguide, which is necessary to switch and/or transfer at least 80% of the power of the one of the aforesaid unidirectional distributively coupled waves to the other one of the unidirectional distributively coupled waves, does not exceed the length at which the power of the most attenuated wave among the unidirectional distributively coupled waves is attenuated by 10 times.

The optical radiation switching, amplification, controlling and modulation are achieved by changing the power transfer coefficient from one coupled wave to another in a nonlinear-optical waveguide(s), first, due to a nonlinear change of the refractive index as a result of a change of the radiation intensity in the nonlinear-optical waveguide, and second, due to dependence of the coefficient of power transfer between the UDCWs on the difference in the effective refractive indexes of the coupled waves. The greater the cubic- and/or quadratic-nonlinear coefficients of the nonlinear-optical waveguide (or waveguides), the less the input intensity (power) necessary to reach the operation mode of the optical radiation switching, amplification, controlling and modulation.

Figure 2:
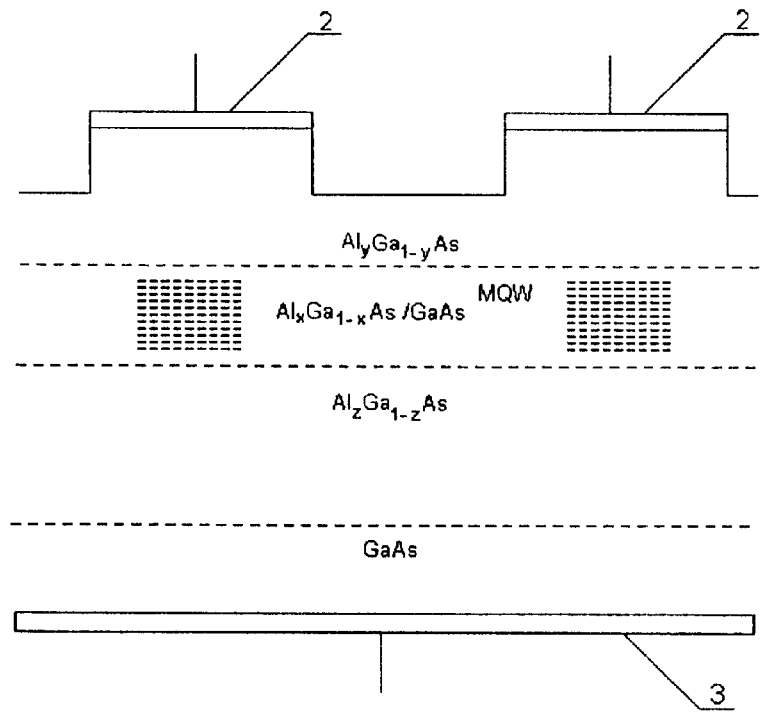
FIG. 2 is a cross-sectional view of a nonlinear tunnel coupled optical waveguide of ridge-type made on the basis of a semiconductor layered MQW-type structure, e.g. such as $GaAs/Al_xGa_{1-x}As$, with electrical contacts (2,3).

So, in order to decrease the input power needed for the switching and amplification, the nonlinear-optical waveguide should be made on the basis of a wafer semiconductor structure of the type of multiplicity of quantum wells (MQW) (as shown in FIGS. 1, 2), and the wavelength of at least one optical radiation fed into the nonlinear-optical waveguide should be close to the wavelength $\lambda_r$ of the resonance in the aforesaid MQW-type structure.

Figure 3:
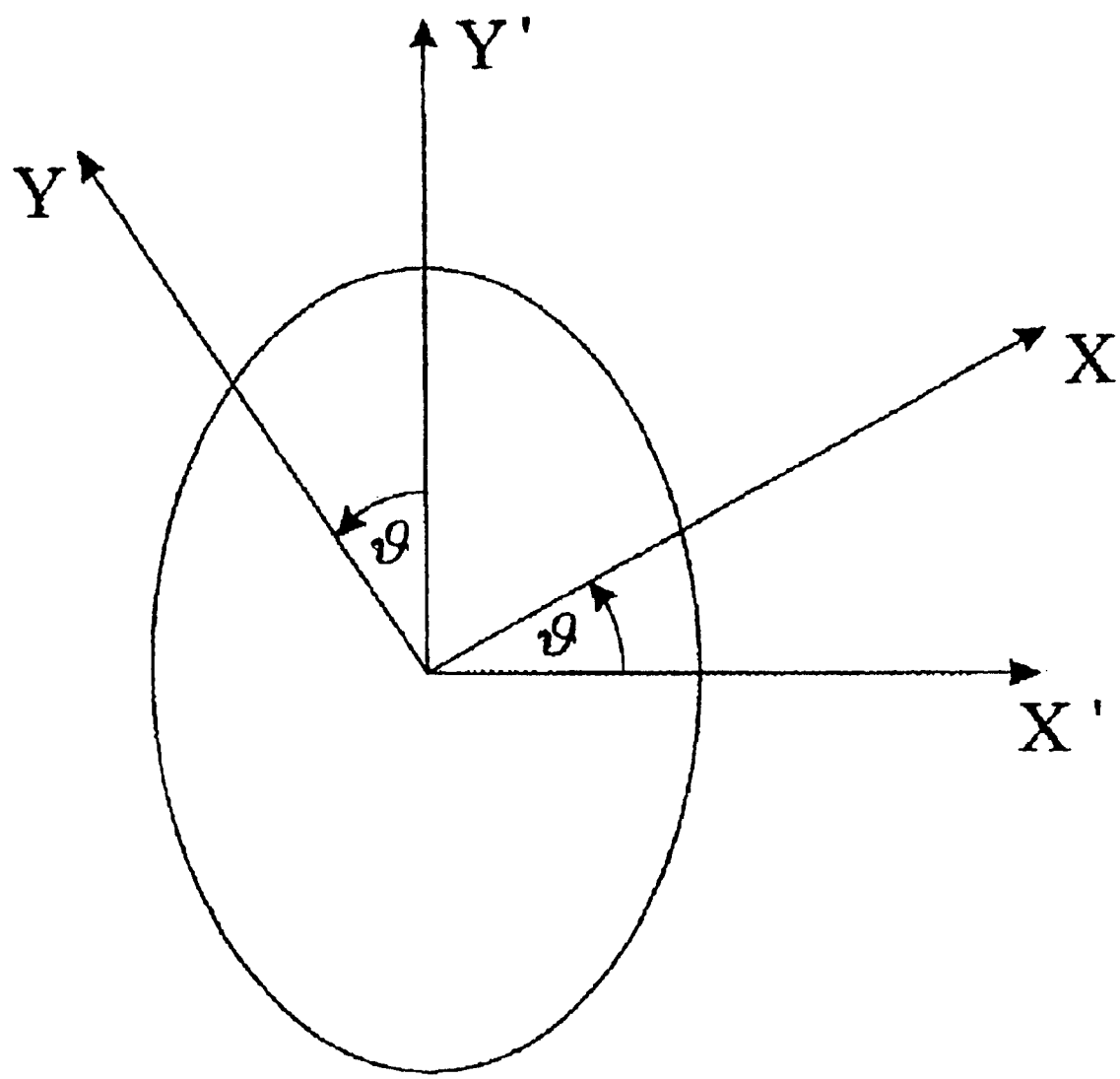
FIG. 3 shows a distribution of the effective refractive index in a cross section of a birefringent nonlinear-optical waveguide and orientation of vectors of polarization X,Y relative to the <<fast>> and <<slow>> axes X', Y' of the bireftingent nonlinear-optical waveguide.

This structure as a rule has birefringence, that is <<fast>> and <<slow>> axes exist and there is an ellipsoid of effective refractive index in its cross section (FIG. 3). The birefringence of this structure is another key factor (besides high nonlinear coefficient) of such a structure which makes it possible to realize an effective all-optical transistor on the basis of the aforesaid structure, using self-switching of the UDCWs having orthogonal polarization.

To avoid terminology confusion, it is emphasized that the resonance in the aforesaid MQW-type structure is meant to be one-photon exiton resonance or two-photon exiton resonance and/or band-gap resonance, or half-band-gap resonance in the MQW-type structure. It can also mean one-photon absorption resonance or two-photon absorption resonance.

The terms: one-photon exiton resonance or two-photon exiton resonance are sometimes used in the Claims, in the Disclosure of the Invention, and in the Modes for Carrying Out the Invention. But if there is no exiton resonance or it is not essential, then this can also mean that there is band-gap resonance and half-band-gap resonance in the MQW-type structure. It also means one-photon absorption resonance or two-photon absorption resonance.

In this case, maximum cubic- and/or quadratic-nonlinear coefficients of the waveguide are achieved. However, it is very difficult technically to make a semiconductor structure for a nonlinear-optical waveguide, which has the wavelength sufficiently equal to the predetermined wavelength.

Where the temperature of the semiconductor structure of the nonlinear-optical waveguide changes, the wavelength of exiton resonance in the structure changes, usually by 0.25–0.3 nm/grad. Thus, the required wavelength can be achieved by adjustment of the temperature; after this the temperature of the nonlinear-optical waveguide is stabilized to provide stable operation of the proposed nonlinear-optical device in time. By means of up-to-date devices it is possible to obtain a precision of temperature stabilization which is about 0.01°.

Besides achievement of a maximum nonlinear coefficient in the nonlinear-optical waveguide or waveguides, it is possible to obtain a larger sensitivity of the switch and modulator to a variation of the input power of signal optical radiation, than to a variation of the input power of pump optical radiation. I.e. the differential gain of signal optical radiation is higher than the differential amplification coefficient of pump optical radiation. For this, it is necessary to choose and set the difference between the signal optical radiation wavelength and the exiton resonance wavelength to be less than the difference between the pump optical radiation wavelength and the exiton resonance wavelength. Then the nonlinear coefficient for signal optical radiation will be larger than that for pump optical radiation and so a variation of signal optical radiation amplitude will cause a stronger influence on the ratio of powers of switched coupled waves at the output of the device than a variation of pump optical radiation amplitude will. I.e. the differential gain of signal optical radiation is larger than the differential amplification factor of pump optical radiation.

To provide a nonlinear regime of operation, the power (or intensity) of optical radiation fed into the nonlinear-optical waveguide or the pump optical radiation power must exceed the threshold power $P_{thr}=I_{thr}S_{eff}$, where $S_{eff}$ is an area of an effective section of the nonlinear-optical waveguide, $I_{thr}$ is the threshold intensity. The threshold power is the power of optical radiation, fed into the nonlinear-optical waveguide or into the nonlinear TCOWs, under the effect of which at least one absolute value of at least one differential gain $\delta P_{k1}/\delta P_{00}$, $\delta P_{k1}/\delta P_{10}$, $\delta P_{k1}/\delta P_{S0}$ exceeding 1.05 exists, where:

index κ=0,1 . . . —number of one of the coupled waves participating in the switching, i.e. the waves between which optical power redistribution occurs in the nonlinear-optical waveguide or in the nonlinear TCOWs; in the case of switching UDCWs having different polarizations, the index "κ" is a number of the polarization, e.g. in the case of UDCWs with mutually orthogonal polarization, the index <<0>> denotes one linear polarization, and the index <<1>> denotes another linear polarization orthogonal to the first one. In the case of UDCWs with circular polarization, the index "κ" is a number of the clockwise and counter-clockwise polarization. In the case of power switching between UDCWs having different frequencies, index "κ" is a number of a frequency; in the case of nonlinear TCOWs, the index "κ" is a number of the nonlinear-optical waveguide because each wave among the interacting UDCWs propagates in its own waveguide. In the case of an optical bistable element based on a Fabry-Perot resonator and in the case of an optical bistable element based on distributed feedback, the index "κ" is a number of a wave traveling in direct (k=0) and opposite (k=1) directions. In the case of UDCWs with Bragg diffraction in the periodical structure or grating (in a planar optical waveguide), the index <<k>> is a number of a transmitted wave (k=0) and diffracted wave (k=1). In the case of UDCWs with different optical waveguide modes, k is a number of an optical waveguide mode;

l is an index, taking into account that the intensity (or power) relates to the radiation at the output of the nonlinear-optical waveguide; and the letter l denotes a length of the nonlinear-optical waveguide or a length of nonlinear TCOWs, i.e. a value of the power (intensity) at z=l is considered;

the second index 0 of $I_{00}$ and $I_{10}$ indicates that the intensity is taken at the input of a nonlinear-optical waveguide (or nonlinear TCOWs), i.e. at z=0;

the index s denotes signal optical radiation at the input of the device, and $\delta P_{kl}/\delta P_{S0}$—the differential gain of signal optical radiation.

Figure 4:
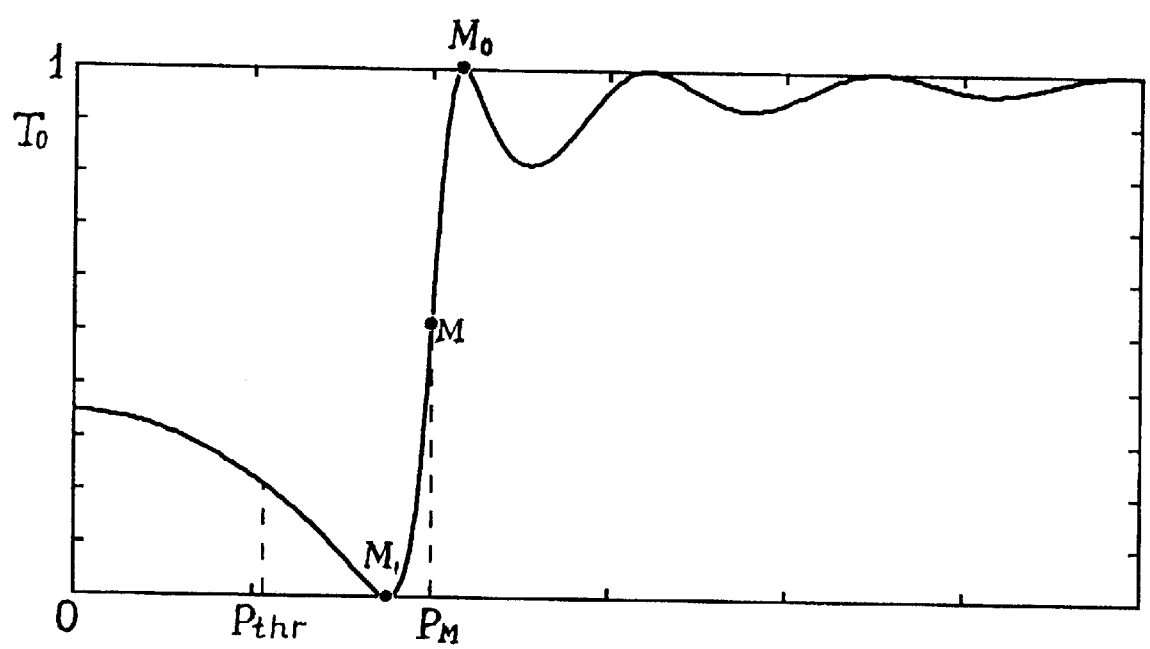
FIG. 4 shows a typical dependence of the radiation power transmission coefficient of UDCW (with linear distributive coupling) through the nonlinear-optical waveguide (or nonlinear TCOW) on the input power. Vertical lines correspond to the threshold power and the critical power.

If phase and/or frequency modulation takes place, then $P_{thr}$ can be defined from the condition $(\delta T_k/\delta \omega_{k0})_{nl}=1.05$ $(\delta T_k/\delta \omega_{k0})_{lin}$, $(\delta T_k/\delta \Phi_{k0})_{nl}=1.05$ $(\delta T_k/\Phi_{k0})_{lin}$, where the indexes <<nl>>and <<lin>> denote nonlinear and linear modes of operation. As a rule, the aforesaid definitions are almost equivalent. For particular case, $P_{thr}$ is shown in FIG. 4.

Let it be assumed that the input optical radiation power is predetermined and consideration is being given to the proposed device for implementing the proposed method. Then to achieve effective operation of the proposed device with rather small predetermined input power, a sufficiently large nonlinear coefficient of the nonlinear-optical waveguide is needed. To implement the proposed device in the case of a certain, sufficiently small input radiation power, the nonlinear factor of the nonlinear-optical waveguide must be larger than the threshold value. This value depends on the linear wave-coupling coefficient and the input optical power fed into the nonlinear-optical waveguide. Usually it is proportional to the linear wave-coupling coefficient and to the input power fed into the nonlinear-optical waveguide. The threshold value of the nonlinear-optical coefficient can be defined as the value of the nonlinear coefficient of the nonlinear-optical waveguide, where, when exceeded, at least one absolute value of at least one differential gain $\delta P_{kl}/\delta P_{00}$, $\delta P_{kl}/\delta P_{10}$, $\delta P_{kl}/\delta P_{S0}$, exceeding 1.05 exists, where: k=0,1 . . . —the number of one of the coupled waves (defined above).

If the device comprises nonlinear tunnel-coupled optical waveguides and its operation is based on them, then the nonlinear-optical coefficient of the nonlinear tunnel-coupled optical waveguides is meant to be the arithmetic average of nonlinear-optical coefficients of these nonlinear tunnel-coupled optical waveguides. So, if two nonlinear tunnel-coupled optical waveguides having nonlinear coefficients $\theta_0$, $\theta_1$ are used, then the nonlinear-optical coefficient of these nonlinear tunnel-coupled optical waveguides is $\theta=(\theta_0+\theta_1)/2$. The definition of the threshold value of the nonlinear-optical coefficient given above is applied both to quadratic and cubic nonlinear-optical coefficients.

Although the method may be carried into effect with a power exceeding the threshold power, the method is of the most interest in the vicinity of the critical intensity $I_M$. corresponding to the so-called middle point M of the optical self-switching. The critical intensity $I_m$ may be defined as the intensity at the nearest region where the greatest differential gain is achieved and there is linearity of signal amplification. I.e. amplification of the signal occurs without distortion of the signal form (as shown in FIG. 4). Thus an all-optical transistor based on the proposed method of switching and amplifying can be created.

E.g. in the simplest case when radiation is fed into one of identical cubic-nonlinear TCOWs, the critical intensity $I_m$ is calculated from the equation $I_M=4K/|\theta|$, and the differential gain at the middle point M is calculated from $\delta P_{01}/\delta P_{00} \approx -\delta P_{11}/\delta P_{00} \approx \exp(L)/8$. For example, for FIG. 4, L=1.4π and at the point M we have $\delta I_0/\delta I_{00} \approx 10.16$. Similar equations and characteristics describe the optical switching of other UDCWs in a cubic nonlinear-optical waveguide, e.g. switching UDCWs of orthogonal or circular polarization in a birefringent or magnito-optical nonlinear-optical waveguide.

Effective switching is observed when linear polarized radiation is fed into a birefringent nonlinear-optical waveguide based on a semiconductor layered MQW-type structure, if at the input a vector of the electric field of the fed radiation makes an angle of approximately 45 degrees with the <<fast>> and/or <<slow>> axis of the nonlinear-optical waveguide.

In the general case, critical intensity (power) may be determined from the condition r=1, where r is a module of elliptical functions, through which powers of UDCWs are expressed at the output of the device (as shown in the aforesaid papers).

As a rule, the largest differential gain is achieved when the input power is close to the critical power. In particular, this situation occurs when only one of the UDCWs is at the input of the nonlinear-optic waveguide, or the input power of one of the UDCWs is much greater than the input power of another, wherewith linear coupling between the UDCWs is essential.

In some important cases, effective switching and a large gain are possible when the under input radiation powers are essentially larger or essentially smaller than the critical power.

E.g. when there are two UDCWs with close input powers ($P_{00} \approx P_{10}$) and close phases at the input of the nonlinear-optical waveguide or at the input of TCOWs, then sharp switching between the UDCW powers (at the output) takes place not only if the input power is close to the critical power, but also if the input power $P_{00}>0.25P_M$; wherewith the differential gain increases when $P_{00}$ increases, even if $P_{00}>P_M$. Note that in this case, with $P_{00}>0.25P_M$ the condition r=1 is also fulfilled, where r is a module of elliptical functions, through which the powers of the UDCWs are expressed at the output of the device (as shown in the aforesaid papers).

In another special case when $P_{00} \approx 3P_M$, $P_{10} \approx P_M$ at the input and the difference in input phases of the UDCWs is equal to $\pm\pi/2$, effective switching can also take place and the differential gain is much larger than unity.

Thus in some cases, values of input optical radiation power which are essentially larger and essentially smaller than critical power can be also of practical interest for the proposed switch and amplifier.

For UDCWs in a cubic-nonlinear-optical waveguide or TCOWs, $I_{thr}$ and $I_M$ are usually proportional to $K^2/|\theta|$, where $\theta$ is a cubic-nonlinear coefficient of the nonlinear-optical waveguide. E.g. in the case of UDCWs having different polarizations in the birefringent nonlinear-optical waveguide, $I_{thr}$ and $I_M$ are proportional to $|\beta_e-\beta_o|/|\theta|$, wherewith the critical intensity is larger than the threshold intensity (as shown in FIG. 5).

For UDCWs in a quadratic-nonlinear waveguide or TCOWs, $I_{thr}$ and $I_M$ are usually proportional to $K^2/|X|^2$, where X is a quadratic-nonlinear coefficient of the nonlinear-optical waveguide.

Together with the intensity I, it is possible to operate with a power P, which is associated with the intensity by a single-value ratio: $P=IS_{eff}$, where $S_{eff}$ is an area of effective section of a nonlinear-optical waveguide. So it can be indicated once more, that the threshold intensity $I_{thr}$ corresponds to threshold power $P_{thr}$ and critical intensity $I_M$ corresponds to critical power $P_m=I_M S_{eff}$.

Estimations and experiments show that when the pump optical radiation power achieves a value larger than the threshold power and a signal optical radiation parameter (e.g. power or phase or polarization) slightly varies, optical power switching occurs from one UDCW to another one (i.e. a major change in the ratio between the power of different UDCWs at the output of a nonlinear waveguide or nonlinear TCOWs takes place) and amplified optical signal information appears at the output of the device. Due to the aforesaid change in the ratio of intensities of the waves modulation of the waves is possible, i.e. some information is transferred into coherent optical radiation. Wherewith the pump optical radiation and the signal optical radiation can both have the same frequencies and polarizations and different frequencies (wavelengths) and polarizations.

Besides, the signal optical radiation and the pump optical radiation can be in the form of solitons or other ultrashort pulses (e.g. with a shape close to rectangular).

In the case when the frequency of the signal optical radiation differs from the frequency of the pump optical radiation in a cubic-nonlinear-optical waveguide or TCOWs, pump optical radiation switching (at the output, from one of the UDCWs to another) is caused by a slight change in the signal optical radiation power at the input. Thus, a major transfer of high power radiation (of given frequency) at the output of a nonlinear device can be made from one of the UDCWs to another one (say, from one of the TCOWs to another, or from a wave of one polarization to another coupled wave of different polarization), as a result of a small change in the power of weak radiation of a different frequency. Wherewith filtration of the radiation is needed after output from the nonlinear-optical waveguide or nonlinear TCOWs for separation from the amplified controlling or information signal at the pump frequency. This filtration can be done where the remote receiver is placed.

Due to the interaction of three frequencies ($\omega_1=\omega_2+\omega_2$) in a quadratic-nonlinear waveguide or TCOWs and under certain conditions, a small variation of input signal power gives rise to an abrupt switching of radiation from one frequency to another frequency. Pump optical radiation has one of the aforesaid frequencies. In the wide-spread case of doubling and/or the pump optical radiation as a rule has a frequency $\omega$ or $2\omega$ whereas the signal optical radiation has frequency $2\omega$ or $\omega$ correspondingly.

Phase-matching between waves at the base ($\omega$) and double ($2\omega$) frequencies can be achieved by using so-called <<coupled waves>> or synchronism <<coupled modes>> in TCOWs and in other systems with UDCWs (A. A. Maier <<Coupled modes>> phase matching and synchronous nonlinear wave interaction in coupled waveguides>>, Kvantovaya Electron. vol.7, No.7, 1980, pp.1596–1598; *Sov. J. Quantum. Electron.* v.10, p.925;1980) and/or partially by birefringence of the nonlinear-optical waveguide. So quadratic-nonlinear TCOWs or one quadratic-nonlinear-optical waveguide with UDCWs provides good possibilities for switching optical radiation power from one frequency to another.

Besides, in quadratic-nonlinear TCOWs (or in one quadratic-nonlinear-optical waveguide with UDCWs) under certain conditions, optical radiation switching from one waveguide to another one (at the output of TCOWs) can take place, with high differential gain.

Thus, if TCOWs posses sufficiently large quadratic nonlinearity, then the UDCWs may be both coupled waves in adjacent waveguides and coupled waves of different frequencies.

Similar switching and amplifying are also possible for other UDCWs with a linear distributed coupling coefficient if the UDCWs propagate in a quadratic-nonlinear-optical waveguide. For example, under certain conditions optical radiation power switching from a wave of one polarization to another of UDCWs of different polarization can take place. Under another condition, optical radiation power switching from one frequency to another frequency can occur.

The speed of response characterizing switching devices based on a quadratic nonlinear waveguide or TCOWs is significantly higher (at least by an order of magnitude) than that for analogous devices using cubic nonlinearity of the optical waveguide(s) due to the response time of quadratic nonlinearity is significantly less.

In order to increase birefringence of the layered structure with the aim of increasing the efficiency of frequency conversion and switching due to improvement of the phase matching between waves of different frequencies it is possible to use the layered structure GaAs/AlAs; wherewith in order increase birefringence of the structure AlAs may be transformed (converted) to an oxide having a significantly less refractive index.

Synchronism can be achieved by periodical modulation of the nonlinearity and/or effective refractive index of a nonlinear-optical waveguide. Synchronism can also be achieved by interaction of modes of different orders having different frequencies.

Temperature, electrooptical or mechanical adjustment (tuning) into a phase-matching condition can be also applied. In a particular case, temperature tuning into a phase-matching condition is done by a Peltier element and/or a temperature sensor, which is electrically connected to a controller and/or stabilizer of the temperature.

To put the method into effect, separation of UDCWs after the output of the nonlinear-optical waveguide or TCOWs is needed. TCOWs themselves usually separate the waves at their output. In one nonlinear-optical waveguide, the separation is done by a separator of the waves. For UDCWs of different polarizations, the separation is usually done by a polarizer. Sometimes the nonlinear-optical waveguide can operate as the separator, if attenuation of the wave of one polarization is much more than that of another polarization.

As a rule, optical radiation switching and modulation are implemented by variation of the input signal optical radiation power or phase.

Besides, the optical radiation switching and modulation can be implemented by variation of input signal optical radiation polarization or frequency. It is revealed by estimations and experiments and, in particular, may be explained by the following.

The coefficient of power transfer from one of the UDCWs to another depends on the distributed coupling coefficient of the UDCWs. The distributed coupling coefficient usually depends on the frequency and polarization of the UDCWs. For instance, as a result of a change of the polarization of the input optical radiation, the angle between a field vector and the axis of refractive index ellipse in a cross section of the nonlinear-optical waveguide (i.e. fast or <<slow>> axis, which as a rule, coincides with plane of layers of the MQW-type structure or is perpendicular to it) a change of the refractive index of the nonlinear-optical waveguide takes place and this in turn gives rise to a change of the tunnel-coupling coefficient.

Besides, the optical radiation switching and modulation can be implemented by changing the electrical or magnetic field applied to the nonlinear-optical waveguide as a result of a change in the difference of refractive indexes of the nonlinear-optical waveguide (or TCOWs).

Optical radiation can be switched, amplified and modulated by modulation of the input signal polarization caused by variable electric current due to the Faradey effect.

Switching, amplifying and modulating optical radiation is also possible by modulation of a vector of polarization under the action of an electrical current. For this the Faraday effect is used. When a variable electrical current, a change of which corresponds to a useful variable signal (analog or digital), is passed through the solenoid surrounding the input waveguide, the orientation of a vector of an electrical field relative to layers of the MQW-type structure at the output of the Faraday cell changes. So the vector of the electrical field changes accordingly at the input of the nonlinear-optical waveguide made on a basis of the MQW-type structure. These changes of the vector of an electrical field result in a change of input amplitudes of UDCWs at the input of the nonlinear-optical waveguide (and sometimes in the coefficient of distributed coupling between the UDCWs in the nonlinear-optical waveguide). According to estimations and an experiment (FIG. 16), this gives rise to a sharp switching of the UDCWs and amplification of the signal at the output of the device.

As a rule, a semiconductor laser (laser diode) or semiconductor laser module is used as a source of the optical radiation fed into the nonlinear-optical waveguide. It is possible to change the wavelength of the laser radiation by changing the temperature of the radiating semiconductor structure of the laser with the help of a change of the current through an Peltier element, which is in thermal contact with the semiconductor structure of the laser. Thus, it is possible to precisely to adjust the wavelength of an exiton resonance of the semiconductor structure of the nonlinear-optical waveguide or nonlinear TCOWs, thus reaching record high nonlinear factors of the waveguide and, hence, of record small threshold powers; or choosing the required threshold and critical power. Another way of changing the wavelength of radiation of the laser is by mechanically compressing and stretching the fiber-optic waveguide (optically connected to the laser), in which a mirror of the external resonator of the laser is made in the form of a periodically varied refractive index of the waveguide.

Analytical, numerical calculations and experiments show that switching the radiation power between UDCWs at the output of the nonlinear-optical waveguide or nonlinear TCOWs can also be achieved by changing the phase of signal optical radiation (for brevity sometimes named signal) at the input of the nonlinear-optical waveguide (or phase of pump optical radiation). In this case the signal power as a rule does not vary. The strong influence of phase on the redistribution of power between UDCWs is caused by the interference of the signal and pump optical radiations at the input and by the dependence of the resulting intensity on the input difference in the phases of the signal and the pump optical radiation.

The method of switching, amplifying and modulating can also be carried by small modulation of one beam of sufficiently powerful radiation (with the average power above the threshold power). In this case, the modulating parameter is the intensity of radiation or the frequency of radiation, or its polarization. In the case of a change of intensity, the switching is achieved by changing the effective refractive index of a wave in the nonlinear-optical waveguide; in the case of modulation of frequency or polarization of the radiation—due to a change of the factor of the distributed coupling of the UDCWs in the nonlinear-optical waveguide or nonlinear TCOWs, and also due to a change of the difference of the effective refractive indexes of the UDCWs.

By changing the temperature of the semiconductor layered structure of the nonlinear-optical waveguide, it is possible to adjust it at any predetermined section of the characteristic (FIG. 4), and thus, to choose the required mode of operation (switching, amplifying, controlling or modulating). For example, it is possible to adjust it to the middle of the linear section of the characteristic corresponding to critical intensity. For logic devices or other elements controlling another section of the characteristic, for example, point $M_0$, $M_1$ (FIG. 4) can be chosen, where the differential factor is equal to zero, but the feeding of small logic signals can change transmission coefficient of each of UDCWs from a value close to zero up to a value close to unit (logic "0"к"1"). In order to maintain a steady mode of operation of the device, the temperature of the nonlinear-optical waveguide or nonlinear TCOWs is stabilized (as a rule, with a precision of about 0.01° C.; in some cases this precision can be less or it may be necessary to increase it) by a Peltier element (FIGS. 5, 13) or by a thermostat.

Figure 17:
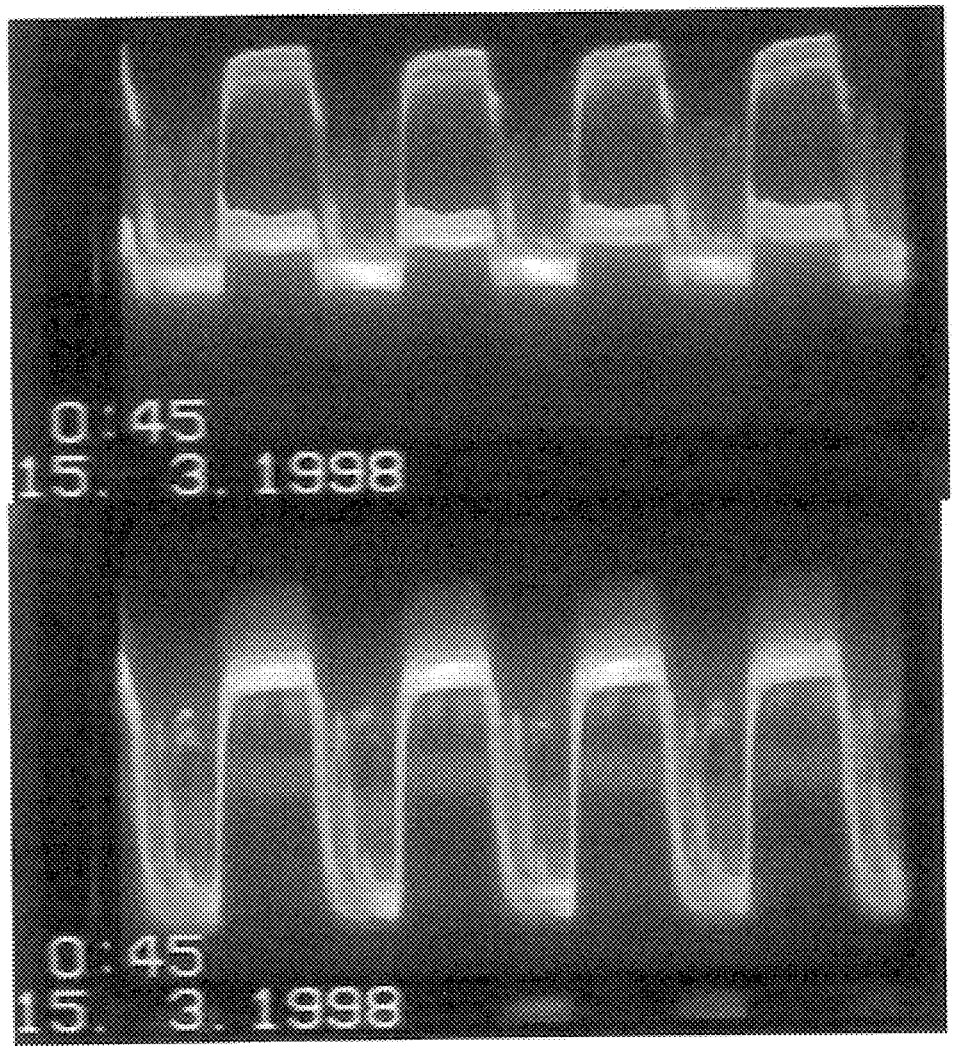
FIG. 17 shows control of the differential gain by adjustment of the level of the average input power of optical radiation fed into the nonlinear-optical waveguide, having low modulation before the input of the nonlinear-optical waveguide.

The same adjustment in the predetermined mode of operation (with a predetermined differential gain FIG. 17) can be attained by a choice of the average power of continuous optical radiation or peak power of pulse radiation fed into the nonlinear-optical waveguide, and in case of feeding signal optical radiation and pump optical radiation into the nonlinear-optical waveguide(s)—by choice of the power of the pump optical radiation.

The switching can also be carried out with the use of several independent signal optical radiations, in each of which the same parameter is changeable. The choice of the ratio between the powers $P_{s0}$ of the signal optical radiations and the width of a section of amplification of a characteristic $T_k(P_{s0})$ (FIG. 4) determines the mode of switching ("AND" or "OR"). This choice can be carried out by choosing the temperature of the semiconductor structure of the nonlinear waveguide or the nonlinear TCOWs and/or the temperature of the radiating semiconductor structure of the laser or laser module. For an "AND" logic element the peak power of signal optical radiations and the width of a section of amplification (FIG. 4) are chosen in such a way that the switching occurs only in case of the presence of several signal optical radiations at the input of nonlinear-optical waveguide(s) simultaneously. Switching in an "OR" mode is carried out for each of the signal optical radiations which have arrived at the input of the nonlinear-optical waveguide (s), this also being achieved by a choice of the ratio between the power of signal optical radiations and the width of the section of amplification.

The control element can also carry out functions of the stabilizer, i.e. a device reducing noise at an input. Thus the section of the characteristic at which the differential factor of amplification is close to zero is removed (points MO and M, shown in FIG. 4).

As a rule, the wavelength of the radiation is chosen to be close to the wavelength of one photon exiton and/or at two-photon exiton resonance in the aforesaid semiconductor structure, wherewith the cubic and qaudratic nonlinear factor of the nonlinear waveguide is maximal, and, hence, the switching of the coupled waves is provided at the least threshold and critical powers. The choice of the value of deviation of the optical radiation wavelength from the exiton resonance wavelength is related to the predetermined value of the nonlinear-optical waveguide coefficient. However, absorption of radiation at the exiton resonance wavelength is very large. Therefore electric current is passed across the nonlinear-optical waveguide, the current decreasing the absorption near the resonance area. Due to the flow of current, the top and bottom energy levels in the semiconductor structure of the nonlinear-optical waveguide approach to each other, and the absorption decreases, and, thus, the critical intensity and the threshold intensity in the nonlinear-optical waveguide are sharply reduced.

In the method of switching, amplifying, controlling and modulating, stabilization of the critical power and differential gain is carried out by adjusting and stabilizing the temperature of the nonlinear-optical waveguide(s).

The method can also provide greater sensitivity of the switch and modulator to a power change of the signal optical radiation than to a power change of the pump optical radiation. For this purpose it is necessary to set the difference between the wavelengths of radiation of a signal and of the exiton resonance, smaller than the difference between the wavelengths of the pump optical radiation and of the exiton resonance. Then the nonlinear coefficient for signal optical radiation will be more than for pump optical radiation, and a change of power of the signal optical radiation will have a stronger influence on the output power than a change of power of the pump optical radiation.

At a certain input optical radiation power and certain value of the current it is possible to have two modes of operation of the switch: in the absence of current, switching and amplification are not present or are very small, and when current flows there are effective switching and amplification of the signal (at the same values of input radiation power). This creates an opportunity for controlling switching modes. Such controlling can occur by a predetermined program or by a special (service) signal, which is separated from the information signal optical radiation and sets the limits of a temporary interval, during which the signal is subject to amplification. Thus noise, jamming and false signals are cut off.

Figure 14:
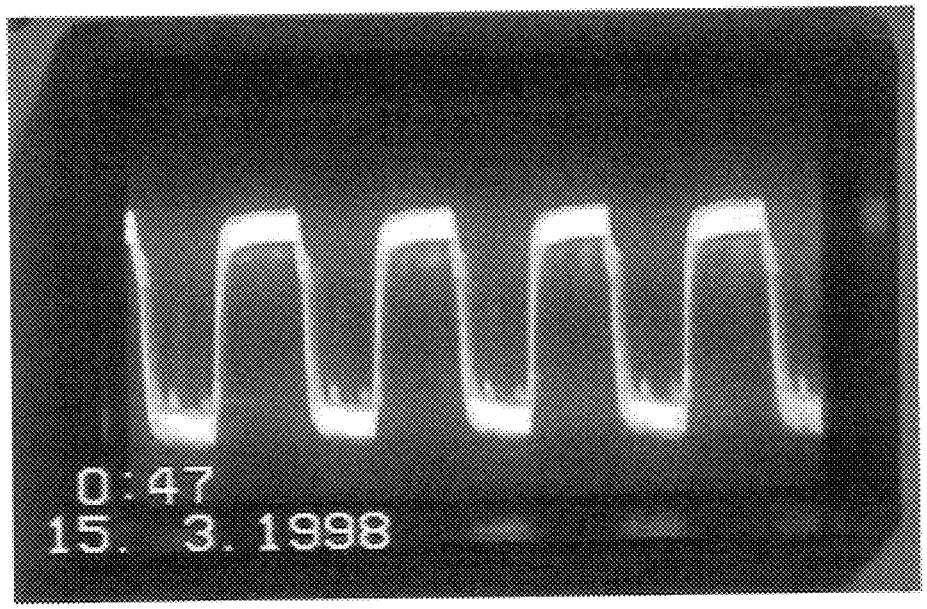
FIG. 14 shows photos of an oscilloscope screen, on which an amplified signal is presented. The gain is about 100. An initial signal, having a form of square pulses (meander), because of its small amplitude, merges with a stream of a beam of the oscilloscope and so is not shown. (Supplementarity)) between UDCWs having orthogonal polarizations is seen: the amplified signal meanders (at top and below) have different <<polarities>>; i.e. they are amplified in opposite phase.
Figure 14:
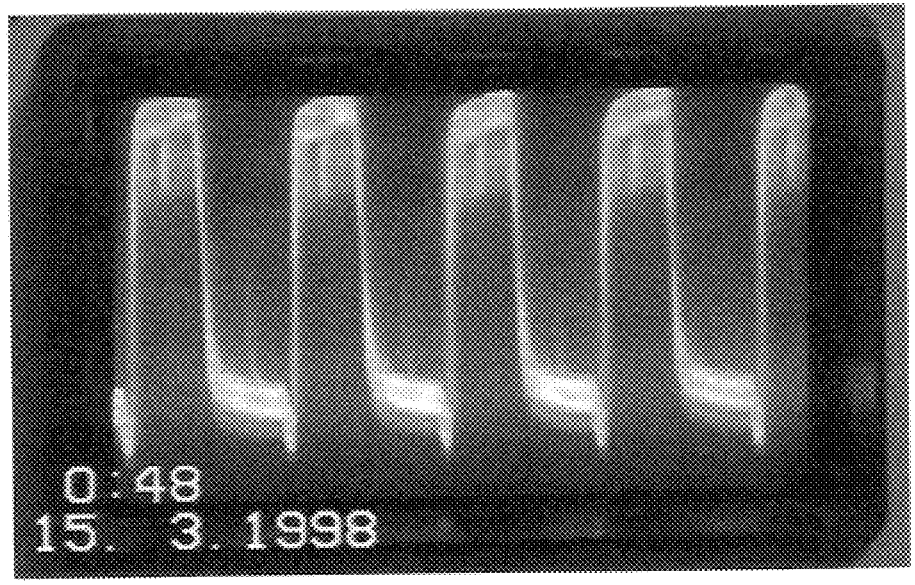

During switching and amplification, the powers of the separated UCDs change in opposite phase at the output of the nonlinear-optical waveguide or nonlinear TCOWs, but the forms of their change (kind of their dependence on time) are correlated: the power dip in one wave is accompanied by power ejection (spike) in another, i.e. a peak or flat-top peak downwards in one is accompanied by a peak or flat-top peak upwards in another and to vice versa (FIG. 14). Thus a so-called supplementary change of the powers of the separated UDCWs is observed at the output of the device. In other words, their amplified opposite-modulation in power takes place. Wherewith the amplitudes of changes of powers of these waves can slightly differ.

Therefore to reduce the noise the form of power change of one of the UDCWs is inverted; then the signals (optical or electrical after a photo-receiver), each of which corresponds to its UDCWs, are fed to the correlator. In another case, the separated optical signal is directly fed to photo-receivers and then to the inputs of a differential amplifier, in which the difference between the powers of the amplified opposite-modulated signal is singled out.

Thus, there is an additional opportunity to clear the amplified information signal of noise, jamming, atmospheric fluctuations and casual distortions, which usually cause sin-phase distortions.

The separator of the UDCWs can be placed not only at the output of the nonlinear-optical waveguide immediately after (in close proximity to) the output of the waveguide, but can be set apart from the output together with the optical receiver. In some cases such a removed separator is preferred.

Firstly, it provides the additional possibility for secret transmission of information by optical communications, e.g. by air-path optical communications. The total power of all the waves leaving the nonlinear-optical waveguide does not change in time and is not modulated. But when the separated aforesaid UDCWs at the end of the optical communication line are removed by means of the separator, a modulated and amplified signal is obtained before the receivers.

Secondly, it provides the additional opportunity to clear the amplified information signal of noise, jamming and casual distortions. In order to reduce noise, the signals from the output of the separator can be fed to a correlator and/or differential amplifier, in which the common part of the amplified signals (taking into account their opposite phases in modulation) is separated and thus, the noise is cut off.

The following should be explained. When the separation of the UDCWs after the nonlinear-optical waveguide by a removed separator is indicated hereinafter and in the claims, what is meant is that the distributed coupling of these UDCWs is in the nonlinear-optical waveguide. Just this distribution coupling between the waves within the nonlinear-optical waveguide is meant when UDCWs are given consideration. And without the nonlinear-optical waveguide, especially in air-path communications, these waves are of course not coupled.

The dependences of the power on time of the unidirectional distributively coupled waves, separated after the output of the nonlinear tunnel-coupled optical waveguides, are compared, and their common part (taking into account that the changes of the UDCWs occur in opposite phases as shown in FIG. 14) is selected by means of a correlator and/or differential amplifier. In other words the <<supplementary>> in the dependences of the output UDCW powers on time is taken into account by a differential amplifier.

The jamming causes sin-phase changing in powers of UDCWs transmitted through the atmosphere, whereas in the proposed device for modulation of optical radiation and transmitting the information the changing of the power of the UDCWs occurs in opposite phases. So the difference in powers can be selected by means of a correlator and/or differential (also called <<operation>>) amplifier. Wherewith atmospheric fluctuations and jamming are eliminated. The achievement of the required wavelength of exiton resonance can be checked by observation of the output parameters, in particular, by the value of the differential gain and/or by the depth of the switching.

The method is implemented by means of the following device (described below)—a nonlinear-optical module (see FIGS. 1, 5, 13, 19, 20, 21). The nonlinear-optical waveguide is fabricated on the basis of semiconductor layered MQW-type structure, containing at least two hetero-transitions.

Figure 13:
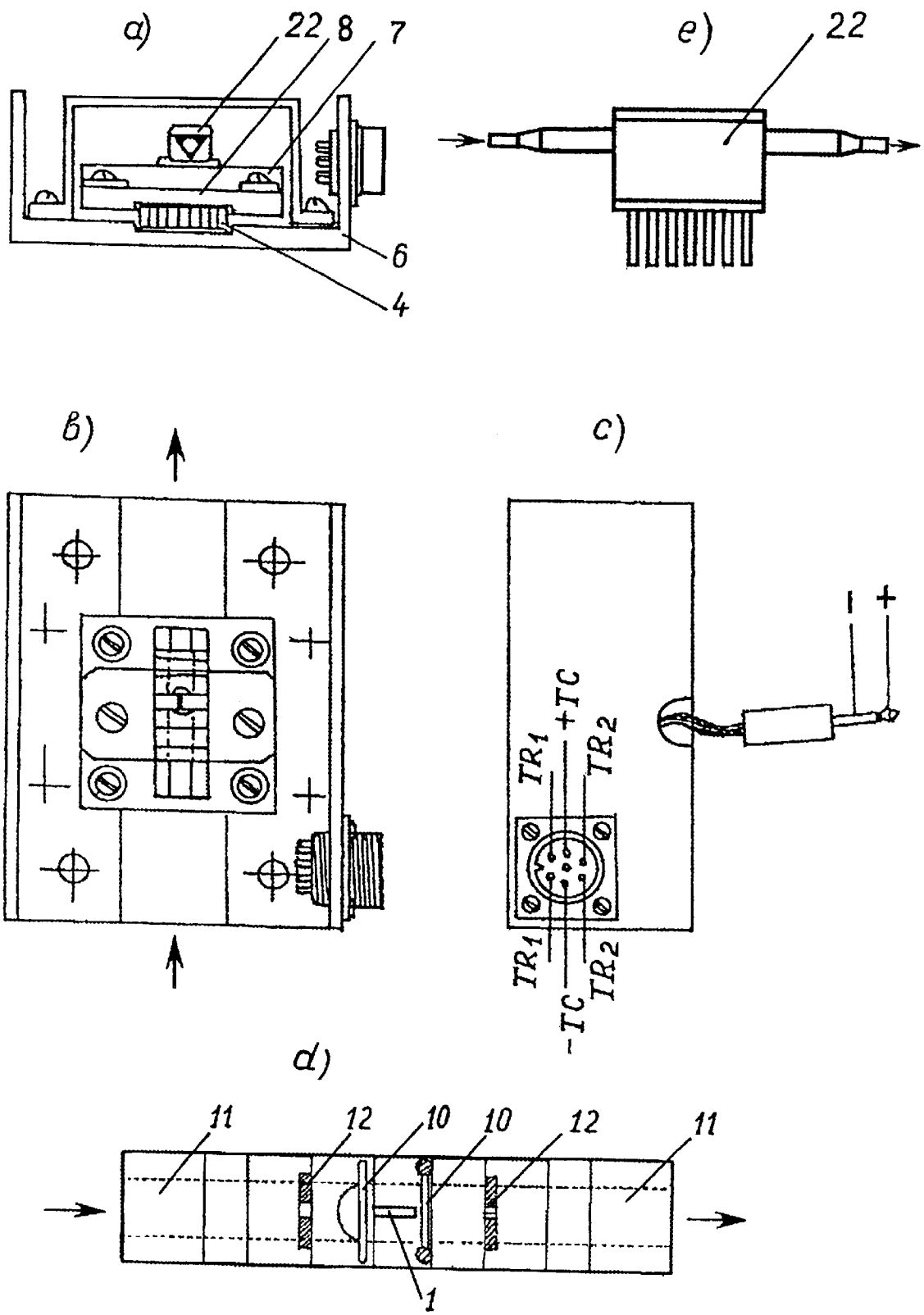
FIG. 13 shows constructive execution of a device in the form of an air-path nonlinear-optical module (a, b, c, d) and an all-waveguide nonlinear-optical module (e). Arrows show the direction of propagation of input and output optical radiation.

Tiny contact metal plates 2 and 3 are made on the top and under surfaces of the semiconductor wafer in which the nonlinear-optical waveguide 1 is formed, (as shown in FIGS. 1, 5, 19, 20). Plates 2 and 3 are made to carry electric current across the nonlinear-optical waveguide 1 in a direction perpendicular to the layers of the structure. The lower contact plate (side) is mounted (directly or through intermediate elements) on at least one thermoelectric Peltier element (also called thermoelectric cooler) 4 (FIGS. 5, 13), electrically connected to a temperature controller 4 (FIG. 5), which can operate as a temperature stabilizer as well. (instead of a temperature controller a temperature stabilizer may be used.) So the nonlinear-optical waveguide is in thermal contact with one side of the thermoelectric Peltier element 4. Besides, the nonlinear-optical waveguide and the side of the Peltier element 4 are also in thermal contact with at least one temperature sensor. Adjustment of the temperature of the nonlinear-optical waveguide may be effected by means of the sensor and the Peltier element 4. The temperature sensor may be made as a thermistor and/or a thermoelectric couple and/or a sensor in the form of an integrated circuit, e.g. AD 590 or LMT 335. A radiator 6 may be used to dissipate surplus heat. As a rule, for convenient (comfortable) work, the device is provided with indicators of the current and temperature, which may be figure voltmeters. They show the values of current and temperature on their liquid-crystal screens. Mounting details 7 and 8 made from metal are shown in FIG. 13a.

Electric current, flowing across the nonlinear-optical waveguide, is regulated by means of a current driver (also called a precision current source) 9 (FIG. 5), which is usually made with the possibility of stabilizing the current value. Up-to-date precision current source can set the current value with a precision of about 0.1 mA.

Nonlinear TCOWs may be used in the device (FIG. 2). In this case, temperature controlling and/or stabilization and current controlling and/or stabilization can be done simultaneously for the said nonlinear-optical waveguides. To eliminate or diminish reflection from the ends of the nonlinear-optical waveguide or TCOWs, antireflection interference coatings are made on the ends.

To provide optimal conditions for feeding optical radiation into the nonlinear-optical waveguide and feeding the optical radiation out of the nonlinear-optical waveguide, an input objective and an output objective or an input waveguide and an output waveguide are used. The input objective usually consists of a cylindrical lens 10 and gradan 11 (FIGS. 6, 9, 10); a diaphragm 12 may be placed between them. In another case, effective feeding of radiation into the nonlinear-optical waveguide and feeding radiation out of the nonlinear-optical waveguide may be achieved by means of an additional input waveguide 13 (FIGS. 7–9) or output optical waveguide 14 (FIGS. 7–9), having a lens 15 (FIGS. 7–9), formed at the end of the waveguide adjoining the input or output end of the nonlinear-optical waveguide 1, respectively. In experiments, the diameter of the input cylindrical lens was about 20 μm; the diameter of the output cylindrical lens was about 100 μm.

Figure 6:
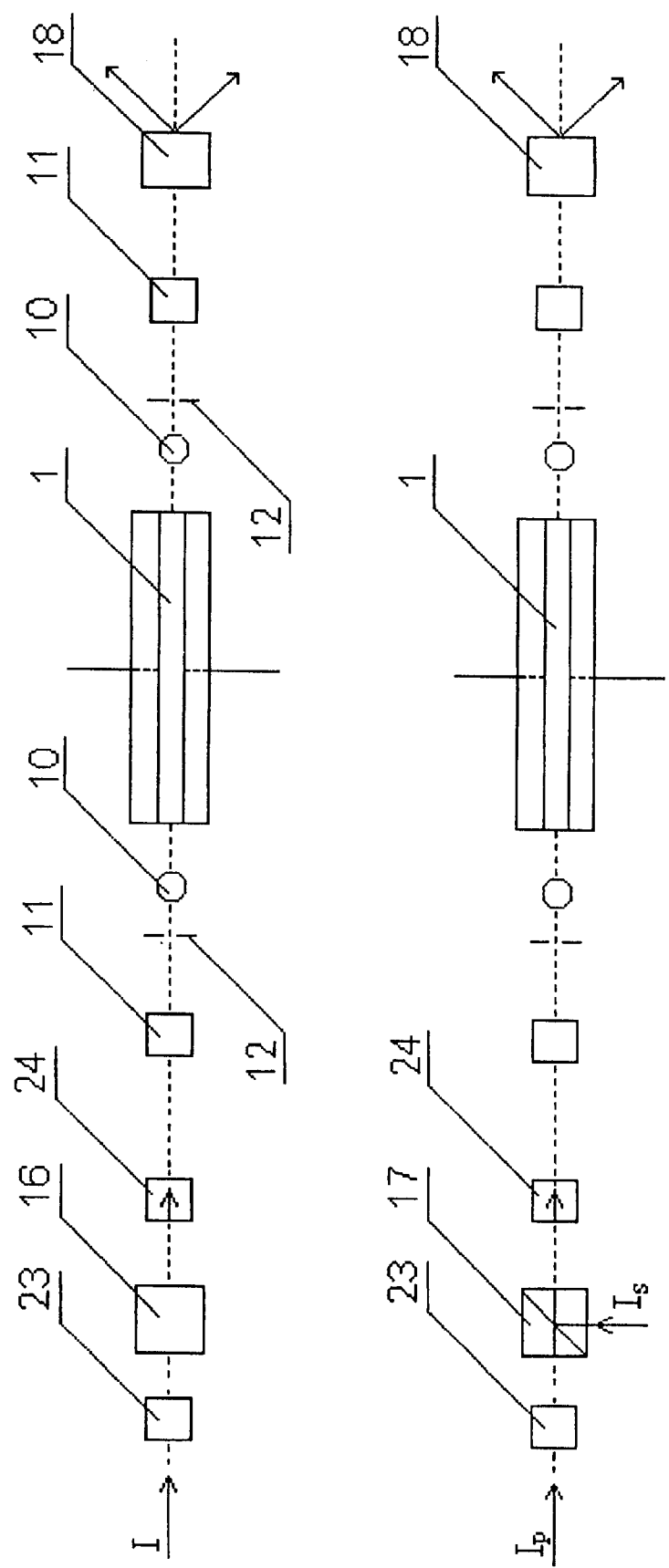
FIG. 6 shows schematic views of variants of the device with a single nonlinear-optical waveguide and objectives made as a cylindrical lens (10) and a gradan (11).
Figure 7:
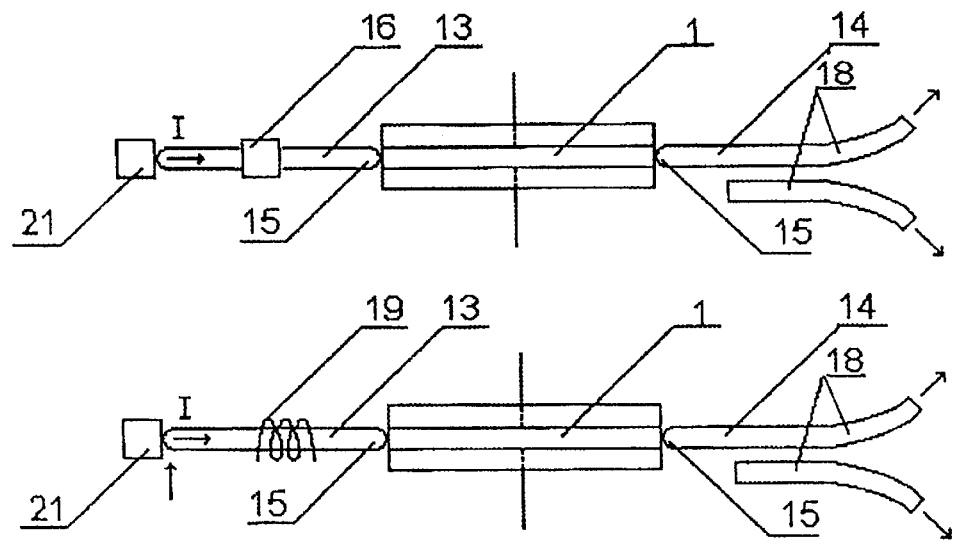
FIG. 7 shows schematically a device with use of a Faradey optical cell.
Figure 11:
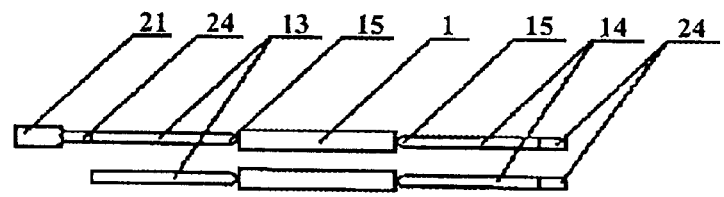
FIG. 11 shows schematic views of variants of the device on the basis of nonlinear TCOWs with input and output optical waveguides. It can operate as small signal amplifier (e.g. as a retranslator in fiber-optic communications), or as a device processing optical signals (e.g. as an optic logical scheme).
Figure 11:
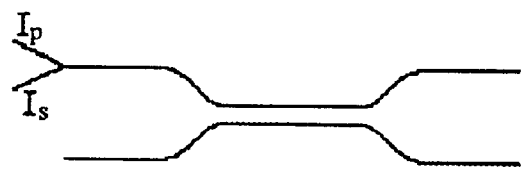
Figure 11:
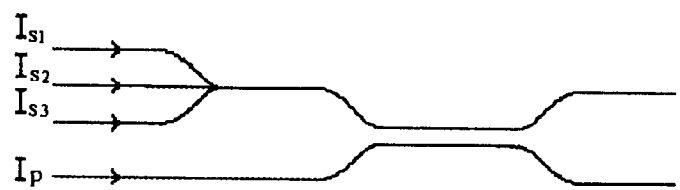
Figure 11:
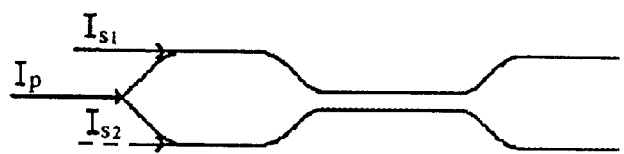
Figure 11:
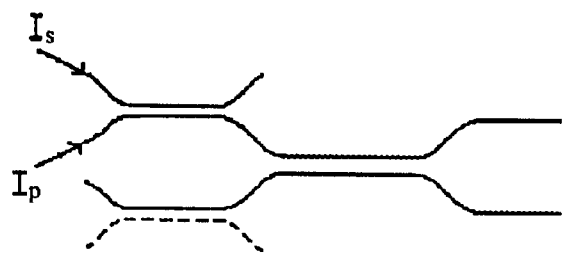
Figure 11:
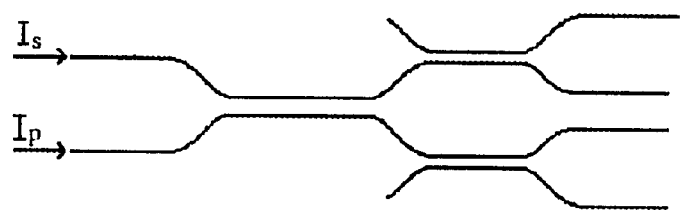

Modulation of such radiation by one of its parameters (a power or a polarization direction) can be done by a modulator 16 (FIGS. 6, 7). In a simpler case, the modulator 16 is absent and a semiconductor laser module 21 (FIGS. 7, 11) is a source of modulated continuous waves optical radiation which can be small (e.g. 1% or 0.1% of average power), but this modulation is amplified to a high degree (e.g. by 100 times, as shown in FIGS. 14–18) after transmission of the optical radiation through the nonlinear-optical waveguide and the separator.

FIGS. 6, 7 show a variant of the device in which optical radiation is fed to the input of the device. Modulation or switching are achieved by variation of some parameter of the optical radiation.

In the case of using signal optical radiation and pump optical radiation (FIGS. 6, 8, 9, 10, 11), an optical mixer 17 may be used to mix and join them.

In the case of using optical radiation of different frequencies and/or polarizations and/or waveguide modes, a separator 18 of radiations is mounted at the output of the nonlinear-optical waveguide or nonlinear TCOWs. In different variants of the device, the separator 18 is made differently. E.g. in a device in which separation of UDCWs with different polarizations is required, the separator 18 is a polaroid or a polarizing prism or a birefringent prism. In the case of use of an output waveguide 14, an optical separator of UDCWs with different polarizations may be made in the form of a directional coupler (as shown in FIGS. 7–9), or as an optical waveguide, absorbing and/or attenuating a wave of one polarization.

In a device in which separation of UDCWs of different wavelengths is required, the separator 18 is a dispersive element, e.g. a diffraction grating or a prism, or a filter, e.g. an interference filter. The optical separator 18 may be made as a directional coupler (as shown in FIGS. 7, 8, 9). It can be united with the output waveguide 14 (as shown in FIGS. 7, 8, 9).

Figure 8:
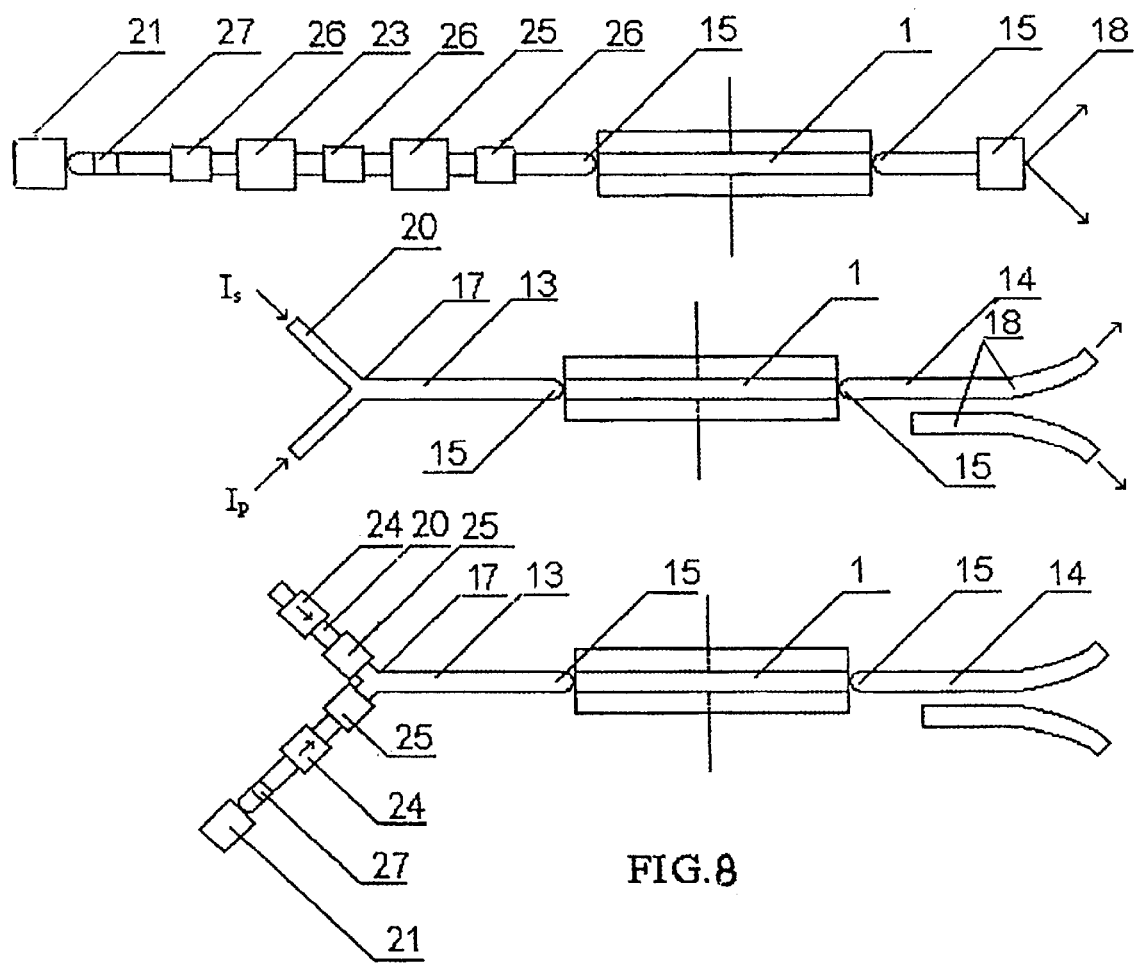
FIG. 8 shows schematic views of variants of the device as a united module comprising a single nonli near-optical waveguide and input and output optical waveguides.
Figure 9:
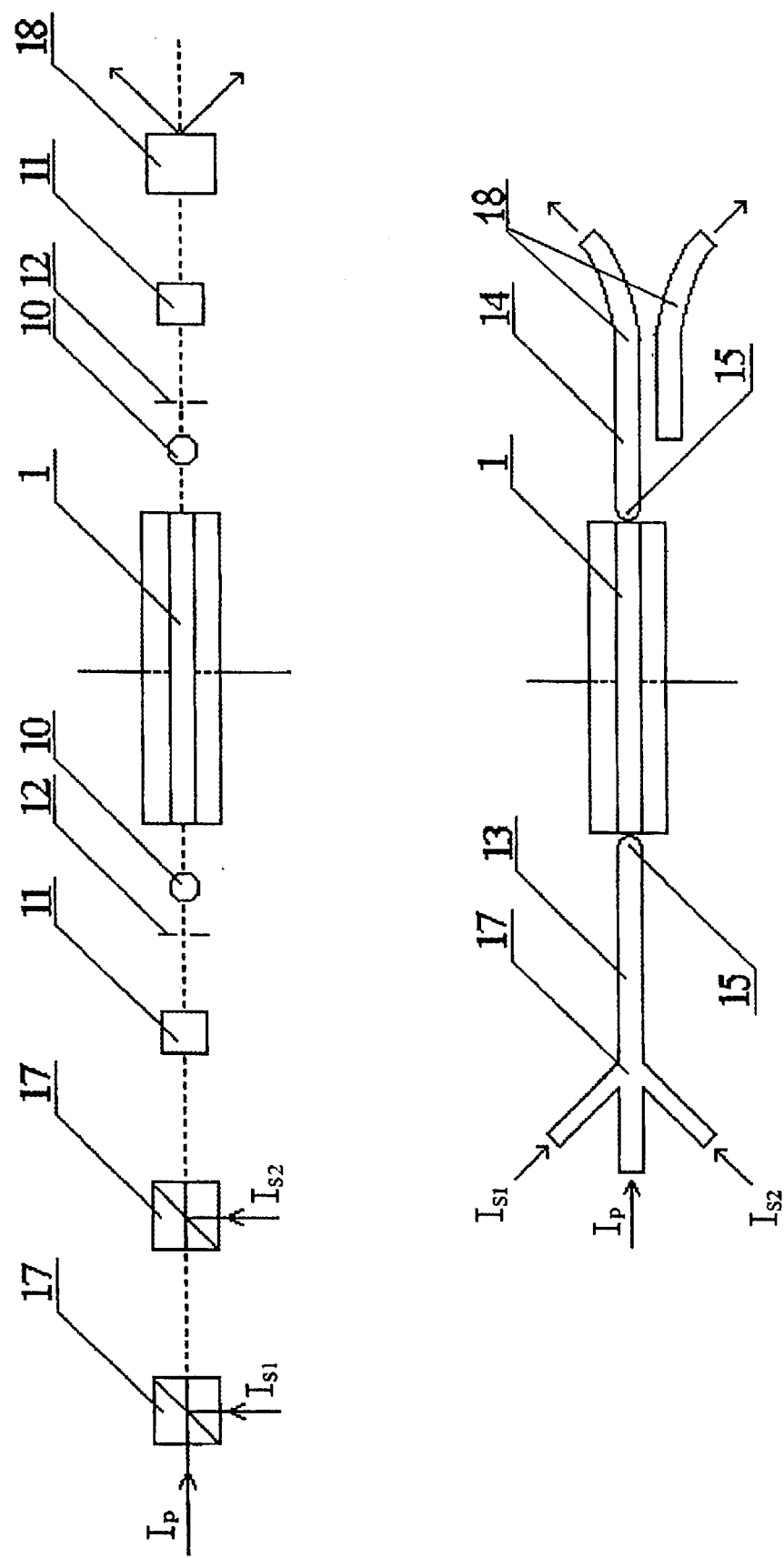
FIG. 9 shows schematic views of variants of the device with inputs for two signal optical radiations.
Figure 10:
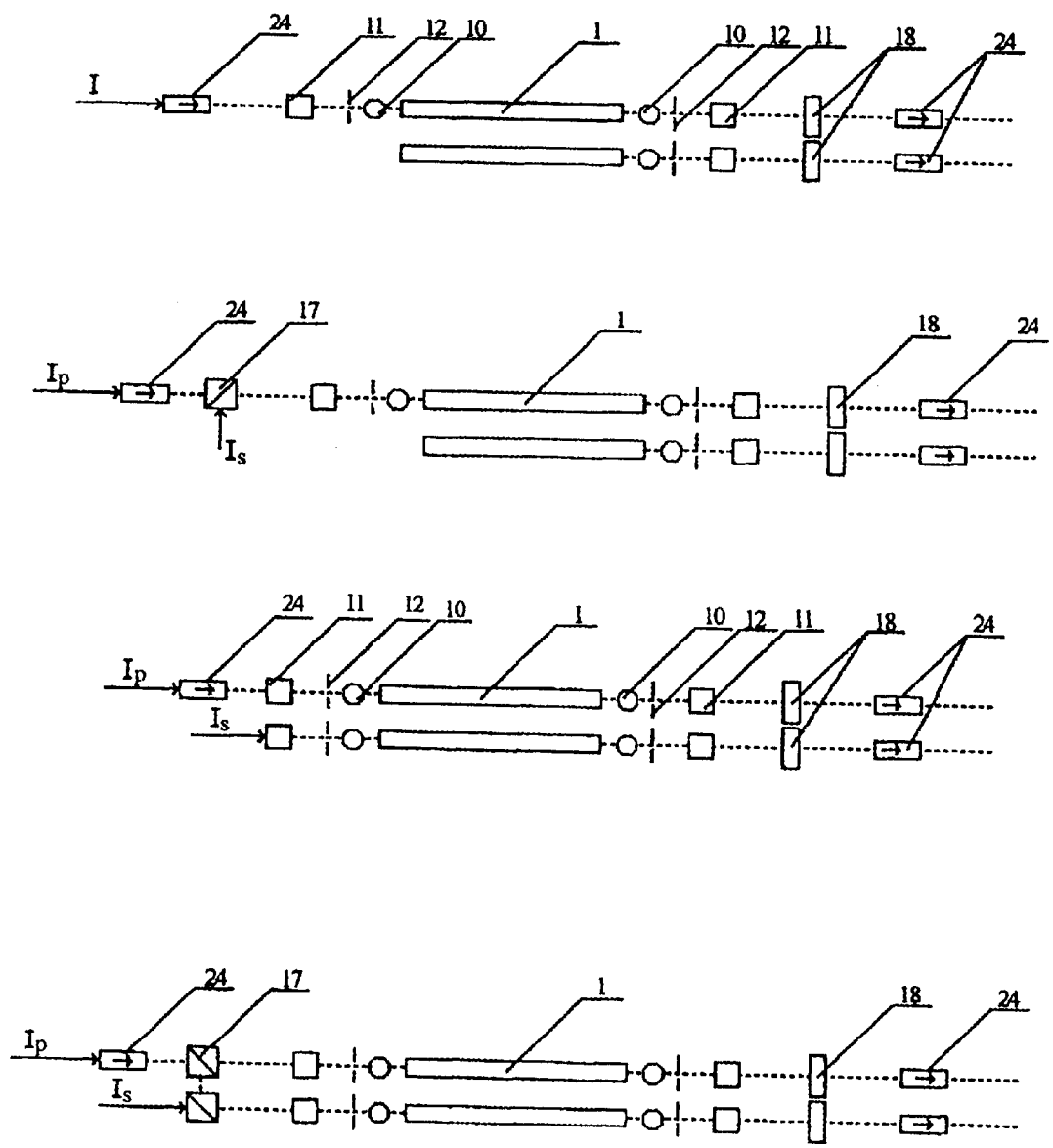
FIG. 10 shows schematic views of variants of the device on the basis of nonlinear TCOWs with objectives made as a cylindrical lens and a gradan.

In a device in which there is separation of UDCWs of different waveguide modes, the optical separator 18 may be a device of selection of waveguide modes, e.g. made in the form of a diaphragm or in the form of an optical waveguide separator (output waveguide 14, FIGS. 7, 8, 9).

When the Faradey effect is used in the device, the input waveguide 13 is made of magnitiooptic glass and is placed in a solenoid 19 (as shown in FIG. 7).

The optical mixer 17 can be made as a Y- type waveguide mixer (as shown in FIG. 8), where the output branch of the mixer is united with the input waveguide 13. And the signal optical radiation is fed through one input branch 20 of the waveguide mixer 17 (FIG. 8). The pump optical radiation with a power larger than threshold ($I_p > I_{thr}$) is fed through another branch of the mixer 17 (FIG. 8).

In a particular case, the solenoid envelopes one input branch 20 of the Y-type waveguide mixer (this is not shown in FIG. 8). The solenoid is electrically connected to a modulating current source. In ordinary Faradey elements using magnitiooptic glass, only a small level of modulation or a small speed of modulation is achieved. In the proposed devices these parameters are many times higher. To reach the amplification mode of the suggested device, pump optical radiation with power larger than threshold ($I_p > I_{thr}$) is fed through another branch of waveguide mixer 17.

The input waveguide 13 may be connected to a laser or laser module 21, wherewith all elements of the device and a laser form a united (single) module. The devices shown in FIGS. 6–8 makes it possible to achieve a high level of modulation together with a high speed of the modulation.

Variants of the device, shown in FIG. 9 (below), represent optic logic elements (<<AND>> or <<OR>>).

The device can be made as a united (single) construction—air-path nonlinear-optical module 22 (shown in FIGS. 13a–d, 21), containing a nonlinear-optical waveguide 1 (FIGS. 1, 2, 5–13, 19) and input and output objectives, comprising cylindrical lenses 10 and gradans 11 and also s diaphragm 12 (shown in FIGS. 6, 9, 10, 13); or as an all-waveguide nonlinear-optical module 22 (shown in FIG. 13e) with input waveguide 13 (FIGS. 7–9, 11) and output waveguide 14 (FIGS. 7–9, 11), (e.g. made in the form of fiber-optic waveguides), connected to the ends of the nonlinear-optical waveguide and semiconductor laser and/or laser module 21 (FIGS. 7, 8, 11, 12), operating as the pump optical radiation source or the signal optical radiation source. In the latter case, the laser or laser module can be made with modulation of its output power.

The input waveguide can be made as a Y-connector (i.e. mixer, rather say Y-type waveguide mixer), into the second branch of which a signal optical radiation can be fed. Output optical waveguide can be made as a Y-connector or TCOWs. Lenses 15 (FIGS. 7–9, 1 1) are usually made at the ends of the input/output waveguides.

A united nonlinear-optical module can also comprise a polarizer 23 (FIGS. 6, 8) and/or an optical isolator 24 (FIGS. 6, 8, 10, 11) and a phase compensator 25 (FIGS. 8, 12) which is used to provide the necessary phase difference between UDCWs at the input of the nonlinear-optical waveguide. The phase compensator can be made as an optical waveguide. The optical isolator can be made as a waveguide optical isolator, e.g. fiber-optic isolator.

The polarizer, mounted before the nonlinear-optical waveguide, or the optical isolator 24 is used to reduce ellipticity of the optical radiation fed into the nonlinear-optical waveguide and to provide a possibility for rotation of the polarization vector of the radiation fed into the waveguide. The optical isolator besides reducing the ellipticity of the radiation (due to its input polarizer) eliminates or attenuates to a high degree transmission of reflected (from the optical elements and/or face and/or end of the nonlinear-optical waveguide) optical radiation in the opposite direction (i.e. to the laser).

If UDCWs of different (usually, orthogonal) polarizations are under consideration, then the following important fact should be mentioned.

Rotation of the electrical field vector in the optical radiation, fed into the nonlinear-optical waveguide, and the output polarizer relative to the <<fast>> and <<slow>> axes of the nonlinear-optical waveguide, provides the possibility to control the process of optical switching and/or amplifying and/or modulation by means of adjustment of the amplitudes of UDCWs of different polarizations at the input of the nonlinear-optical waveguide and/or the ratio a I K, where $\alpha=|\beta_e-\beta_0|\cos(2\theta)$, $K=|\beta_e-\beta_0|\sin(2\theta)$, $\theta$ is an angle between the <<fast>> or <<slow>> axis and the electric vector of one of the considered UDCWs.

The rotation of the electric field vector in the optical radiation, fed into the nonlinear-optical waveguide, relative to the <<fast>> and <<slow>> axes of the nonlinear-optical waveguide is conveniently done by azimuth rotation or a turn of the fiber-optic waveguide in optic-fiber connector 26 (FIG. 8) with physical contact, and/or by a relative turn of two optical connectors (e.g. FC/PC-type) in a connecting socket, or in a similar fiber-optic connection. It is also convenient to turn and rotate in a similar way the polarizer placed after the nonlinear-optical waveguide and operating as the separator 18.

The possibility is provided in the device for rotation of the input polarizer 23, and this also provides the possibility for controlling the process of switching by adjustment of input amplitudes of the UDCWs with different polarizations and the ratio $\alpha/K$. However, the rotation of the polarizer should be accompanied by a corresponding rotation of the electrical field vector in input optical radiation, i.e. it should be accompanied by rotation of the laser and/or laser module. Otherwise, the rotation of the input polarizer may cause change in the input power fed into the nonlinear-optical waveguide.

The nonlinear-optical module can be optically connected to a semiconductor laser and/or laser module 21, which can be done with an external resonator, one mirror of which is made in the form of a Bragg reflector 27 (FIG. 8). The Bragg reflector can be made as a periodic grating of refractive index in a fiber-optic waveguide adjoined to the laser. It can also be made as a corrugation in an optical waveguide. An external resonator provides stability of the wavelength of the laser radiation in time and sufficiently narrow spectrum-line width of the laser radiation (not more than 3A).

The radiating semiconductor structure of the laser 21 may be in thermal contact with at least one thermoelectric Peltier element (with one side of it), electrically connected to a temperature controller and/or stabilizer. This provides the additional possibility to choose and/or adjust and/or stabilize a regime of operation of the device, i.e. to choose the threshold power and the critical power, the differential gain, the ratio between powers of the coupled waves at the output of the device and the difference of phase between them by adjustment of the temperature controller. This is possible due to adjustment and stabilization of the wavelength of the pump and/or signal optical radiation from the laser or/and laser module.

On the basis of observations, the conclusion may be made that the used nonlinear-optical waveguide based on the semiconductor MQW-type structure transmits radiation of one polarization better than that of another polarization. So the nonlinear-optical waveguide itself even without a polarizer at the output mainly selects out the radiation of a certain polarization at the output, thus it operates partially as a polarizer.

A polarizer, mounted at the input of the nonlinear-optical waveguide, optical isolator and phase compensator may be made in the form of an optical waveguide.

Fabrication of the device in the form of a united waveguide module is achieved due to method of fabrication, comprising positioning and controlling the nonlinear-optical waveguides with the use of luminescent radiation, occurring when electrical current is passed across it. Thus, the electrical contacts for carrying electrical current across the nonlinear-optical waveguide also make it possible to carry out the positioning and to increase by a high degree the precision of the positioning. When there is a sufficiently large current (>30 mA) in the nonlinear layered semiconductor radiation-carrying MQW-type at the face and the end of the nonlinear-optical waveguide, the structure begins to emit luminescent radiation. This makes it possible, using the luminescent radiation emitting from the ends of the nonlinear-optical waveguide, to mount cylindrical lenses and gradans at the input and/or output ends of the nonlinear-optical waveguide. The mounting of input and/or output elements, made as cylindrical lenses and gradans, relative to the nonlinear-optical waveguide is effected until formation of a collimated optical radiation beam outside the gradans. As a rule, a cylindrically symmetrical optical radiation beam is achieved.

In the other <<waveguide>> variant, this makes it possible, using the luminescent radiation emitting from the ends of the nonlinear-optical waveguide, to mount the end of an additional so-called <<input waveguide>> at the input of the nonlinear-optical waveguide and/or to mount the end of the additional so-called output waveguide at the output end of the nonlinear-optical waveguide.

In both variants, the efficiency of feeding the radiation into/out of the nonlinear-optical waveguide is increased to a high degree. Wherewith, the all-optical switching, amplifying, modulating, controlling device (optical transistor, modulator, logical element) is made as a single fabricated module. The input and/or output waveguide is usually made in the form of a fiber-optic waveguide(s).

The value of the current, flowing across the nonlinear-optical waveguide to provide its luminescence, is by an order of magnitude larger than the current flowing across the nonlinear-optical waveguide during operation of the device: when mounting a cylindrical lens and/or gradan and/or input/output optical waveguide the current is usually 20–40 mA and larger, whereas during operation of the device, the current is of the order of 1 mA.

Besides the possibility of precision mounting of input/output elements and other elements of the module relative to the nonlinear-optical waveguide, the method of constructing the nonlinear-optic (waveguide) module also comprises controlling the efficiency of feeding radiation into the nonlinear-optical waveguide by means of changing the power transmission coefficient of the nonlinear-optical waveguide when switching the electric current across the nonlinear-optical waveguide on and off. I.e. a magnitude (value) of the power change of radiation, transmitted (transferred) through the nonlinear-optical waveguide with the electric current switched on and switched off is the criterion of the efficiency of feeding optical (signal and/or pump) radiation into the nonlinear-optical waveguide.

The criterion of the efficiency of feeding the radiation beam of a laser module into the nonlinear-optical waveguide (i.e. the criterion of the precision of mounting a laser module relative to the nonlinear-optical module) can be controlled by means of effecting coincidence of the laser module radiation beam and the nonlinear-optical module radiation beam at the input and/or at the output of the nonlinear optic module.

The technologies mentioned above make it possible to realize compact, small optical radiation power supplies, fast and reliable optical integrated circuits of the required architecture. The device for processing optical signals comprises several nonlinear-optic modules, and each of them contains a nonlinear-optical waveguide or nonlinear TCOWs. The input and output of the nonlinear-optic modules are connected to each other by a circuit, corresponding to the function of processing the signal. Input/output elements of such nonlinear-optic modules, as a rule, are made as input/output waveguides and connected by splice, glue, welding or connectors.

About Optical Radiation Sources

A laser can be used as the source of optical radiation and/or pump optical radiation and/or signal optical radiation fed into the nonlinear-optical waveguide. It is preferable to use a tunable by wavelength, single-mode laser (i.e. with cross-single-mode), with a narrow spectrum-line width (usually not larger than 20 A). One of the best variants is the single-frequency laser. In another case, a mode-locked laser can be used. In particular, a soliton laser can be used. E.g. the dye laser can be used. The wavelength of optical radiation of the laser should be close to the wavelength of exiton resonance of the semiconductor structure of the nonlinear-optical waveguide(s). Compactness of the laser is also important.

So the most preferable source of optical radiation and/or pump optical radiation and/or signal optical radiation fed into the aforesaid nonlinear-optical waveguide(s) is a semiconductor laser or, even better, a semiconductor laser module. The semiconductor laser module can be made first as an air-path module with use of a cylindrical lens and a gradan to obtain a collimated optical radiation beam. Secondly, the semiconductor laser module can be made as a waveguide laser module, usually as a fiber-optic source module. In this case, an output of optical radiation from a laser diode is made through a fiber-optic waveguide adjoined to the laser diode. Usually a lens is made at the end of the fiber-optic waveguide adjoined to the laser diode. Usually the lens is made parabolic, conic, or cylindrical. A gradan can be mounted at the other end of the fiber-optic waveguide, which provides a collimated beam. The laser module in the form of a fiber-optic source module can include a fiber-optic amplifier, e.g. an erbium doped fiber amplifier.

In both cases the semiconductor laser module is additionally supplied with at least one thermoelectric Peltier element (i.e. thermoelectric cooler), a side of which is in thermal contact with the radiating semiconductor structure of the laser (i.e. laser diode) and with at least one temperature sensor, wherewith at least one temperature sensor and at least one thermoelectric Peltier element are electrically connected to a controller and/or stabilizer of the temperature. It is also preferable to supply the laser module with a precision current source for passing electric current through the laser diode; usually the current source is made as a controller (driver) and/or stabilizer of the current. The optical power of the semiconductor laser or laser module is controlled and/or stabilized. This is done by controlling and stabilizing the electric current passing through the laser diode and/or by measuring and taking into account the output power of the laser diode, with use of an electrical feedback circuit and with use of a precision current source made as a controller and stabilizer of the current through the laser diode, and hence the output power is controlled and stabilized. Measuring the output power of the optical radiation of the laser diode is done by measuring the current of a monitoring photodiode.

The semiconductor laser or more preferably the semiconductor laser module can be included in the proposed device for switching, amplifying, controlling and modulating optical radiation.

The semiconductor laser or laser module can operate in different regimes: its output radiation can be both in the form of pulses and in the form of continuous waves. It can operate both as a mode-locked and continuous waves laser or laser module. If it provides optical pulses, say ultrashort pulses, then the controller (driver) and stabilizer of current through the laser diode controls and stabilizes the average output power of the laser or laser module in time. In particular, the laser or laser module can provide a continuous sequence of solitons or soliton-like supershort pulses with constant peak power.

One of the most preferable regimes of operation of the semiconductor laser or laser module in the proposed device is the continuous waves regime.

As a rule, the semiconductor laser and/or laser module is used with a spectrum-line width of radiation, which is not more than 20 A. The semiconductor laser or the laser module should be single-moded, i.e. its output optical radiation has one cross mode. In one of the most preferable variants the semiconductor laser and/or the laser module is made as a single-frequency laser module, say a single-frequency waveguide laser module, e.g. as a single-frequency and single-mode fiber-optic source module.

To obtain a narrow spectral line width and a stable frequency in time, the semiconductor laser or the laser module is made with an external resonator and/or includes a dispersive element. The dispersive element can be made in the form of a diffraction grating. As a rule, at least one mirror of the external resonator is made as a periodical grating, representing a partially or fully reflecting Bragg reflector. In particular, the mirror of the external resonator of the semiconductor laser and/or the laser module, including the semiconductor laser and an optical waveguide, is made in the form of a periodical grating of refractive index in the optical waveguide adjacent to the laser, or as a corrugation on a surface of the optical waveguide adjacent to the laser. E.g. the mirror of the aforesaid external resonator is made as a refractive index periodical grating in the fiber-optic waveguide adjoined to the laser diode, wherewith the laser diode end closest to the aforesaid fiber-optic waveguide has an antireflection coating and the other end of the laser diode has a reflection coating. A semiconductor laser and/or laser module with distributed feedback can also be used.

The power of optical radiation of the laser or laser module included in the device is chosen in the range from 0.5 $P_M$ up to 1.5 $P_M$, where $P_M$ is the critical power. In a more preferable case, the power of optical radiation of the laser or laser module included in the device is chosen in the range from 0.9 $P_M$ up to 1.1 $P_M$.

In another preferable case, the power of the laser or laser module should be larger than $3|\beta_o-\beta_e|/|\theta|$, e.g. $5|\beta_o-\beta_e|/|\theta|$. This case, in particular, corresponds to orientation of the electric vector when $E_y >> E_x$, and $E_y$ is directed along the <<fast>> or <<slow>> axis of the birefringent nonlinear-optical waveguide, i.e. $\theta=0$ (see FIG. 1). In this special case the linear wave-coupling between the UDCWs is close to zero, but nonlinear coupling between the waves is essential.

Estimations show that the cases when the power of the laser or laser module optical radiation is larger than 0.5 $P_M$ can also be of interest. Sometimes a power larger than 1.5$P_M$ can also be of interest. But laser powers ten times larger than $P_M$ are of hardly any interest, because almost all the power is in one of the UDCWs only, and an increase of transfer power between the UDCWs is almost absent, and so they hardly obtain a substantial increase in modulation. A detailed explanation and definition of the critical power is done in A. A. Maier. All-optical switching of unidirectional distributedly coupled waves. UFN 1995, v. 165, N9, pp. 1037–1075, [Physics-Uspekhi v.38, N9, pp.991–1029, 1995].

About Initial Modulation

In one of the most preferable embodiments, the laser or laser module provides output optical radiation of constant power exceeding the threshold power, wherewith the power spread in time does not exceed 1%. In this case the initial (i.e. before the nonlinear-optical waveguide(s)) modulation is achieved by an external modulator, placed between the laser or laser module and the nonlinear-optical waveguide(s), wherewith the modulator is optically connected to the output of the laser or laser module, and the modulator is optically connected to the input of the nonlinear-optical waveguide(s) through the aforesaid input element. In one of the most preferable embodiments, the modulator is an amplitude modulator, i.e. it modulates the power of optical radiation passing through it. In another preferable embodiment, it is a phase modulator, which modulates the phase difference of the UDCWs at the input of the nonlinear-optical waveguide(s). It can also modulate the phase difference of signal and pump optical radiations. It can also be made as a frequency modulator, modulating the frequency of optical radiation transmitted through it.

In another case, modulation of optical radiation before the input of the nonlinear-optical waveguide(s) is achieved by modulation of the output optical radiation of the laser or laser module. The modulation is achieved by modulation of the electric current flowing through the laser diode. For this purpose, the current source is made with the possibility of modulation of the current through the laser diode. Wherewith the average value of the current in time and hence the average power of output radiation of the laser or laser module in time is usually stabilized.

In both cases of the modulation, the initial modulation can be small (i.e. its percentage modulation can be small) due to the amplification of the modulation after the nonlinear-optical waveguide(s) and separation of the UDCWs. So the frequency band and speed of the modulation can be much more than that without the nonlinear-optical waveguide(s). For example, the amplitude of the variation of modulated current passing through the laser diode can be small, and hence, the time of its variation can be small. Hence, the frequency band and speed of the modulation can be much more than that without the nonlinear-optical waveguide(s). In the case of external modulation, say, by an electrical field applied to an electrooptical modulator, an amplitude of this electrical field can be small, and therefor the speed of modulation can be much higher than that without nonlinear-optical waveguide(s) as well.

EXAMPLE 1

Figure 18:
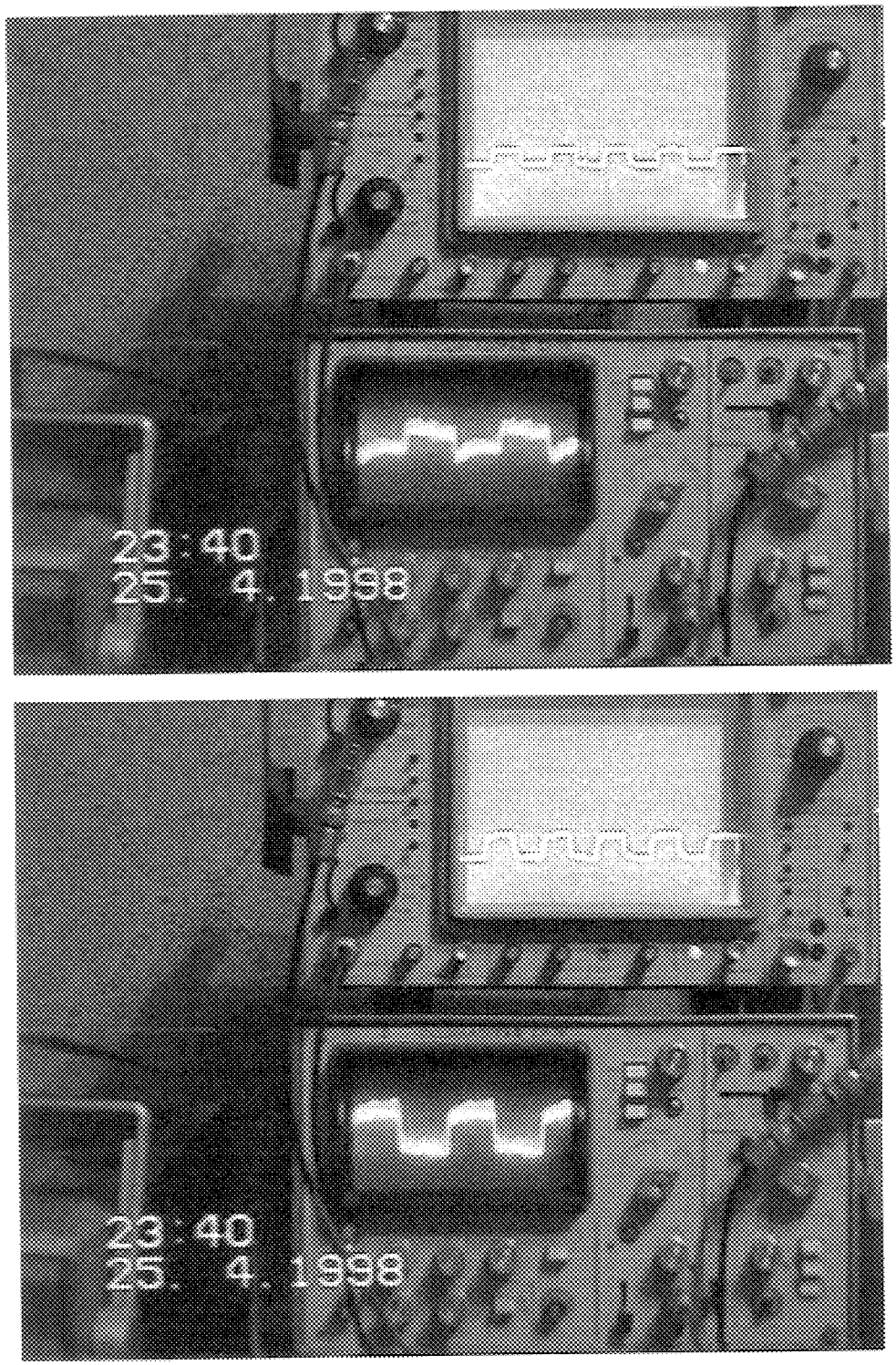
FIG. 18 shows switching and controlling of the ratio between UDCWs (after separation) having mutually orthogonal polarization by adjusting the average input power of optical radiation fed into the nonlinear-optical waveguide, having low modulation before the input of the nonlinear-optical waveguide. <<Polarity>> (phase) of the meander is inverted (a, b), whereas the initial laser optical signal (amplified by electronic means and seen at the above oscilloscope) does not invert the <<polarity>> (phase).

An all-optical compact nonlinear-optical waveguide module has been created (FIG. 21, FIG. 13), amplifying with a gain of 100 the small modulation of continuous waves semiconductor air-path laser module radiation. In essence, an all-optical transistor and all-optical switch has been created (FIGS. 14–17). Its operation is based on the nonlinear-optical phenomenon of self-switching of UDCWs of different mutually orthogonal polarizations (FIGS. 14–17), which implies that a small variation of the input intensity for one of the UDCWs gives rise to abrupt change in the UDCWs intensities ratio at the device output. The phenomenon takes place under a certain choice of input intensities and input phases of the UDCWs. Amplified differentially by 100 times, mutually orthogonal waves, separated at the output of the device, change in opposite phases (FIG. 14). An all-optical switching of levels of output power between <<0>> and <<1>> is obtained by adjusting the input average power of the laser module (FIG. 18).

Differential gain (FIG. 17) is also adjusting by adjusting the average power of the laser module or by nonlinear waveguide temperature controlling.

Previously the phenomenon was observed in a pulse regime under powers of the order of hundreds of watts and more, and a differential gain of not more than 3–5 was obtained. Even in nonlinear waveguides based on semiconductor MQW structures, the powers at which the phenomenon was observed were of the order of hundreds of watts, and a differential gain only slightly larger than unity was achieved (see, e.g., H. K.Tsang et.al. *ELECTRONICS LETTERS* Vol.27, No22, p.1993, October 1991).

A continuous waves radiation with λ=0.86 from a semiconductor laser module (with an average power equal to approximately 10 mW) in the form of a collimated beam (with axial symmetry) was passed through a polaroid and phase plate (which was used as a phase compensator, but may be absent), and further through a nonlinear-optical waveguide module. The module comprises a nonlinear-optical waveguide (based on the semiconductor wafer MQW-type structure GaAs/Ga$_y$Al$_{1-y}$As) (FIGS. 1, 19), supplied with input and output cylindrical lenses and gradans, by means of which the collimated beam was fed into the nonlinear-optical waveguide and further fed out from the nonlinear-optical waveguide, without microobjectives. Asymmetry of the cross section was taken into account by means of cylindrical lenses. Further (at the output of the device), the radiation of a certain polarization was selected by means of the polaroid. Before it a phase plate may be placed. Optical radiation, transmitted through the polaroid, was fed to an input of a photodiode, an electric signal from which was applied to the input of an oscilloscope.

The laser module was single-moded. The laser module was supplied with a precision current source for passing electric current through the laser diode. Wherewith it was supplied with a thermoelectric Peltier element and two temperature sensors, which were connected to a temperature controller. The temperature controller also operated as a temperature stabilizer.

Figure 19:
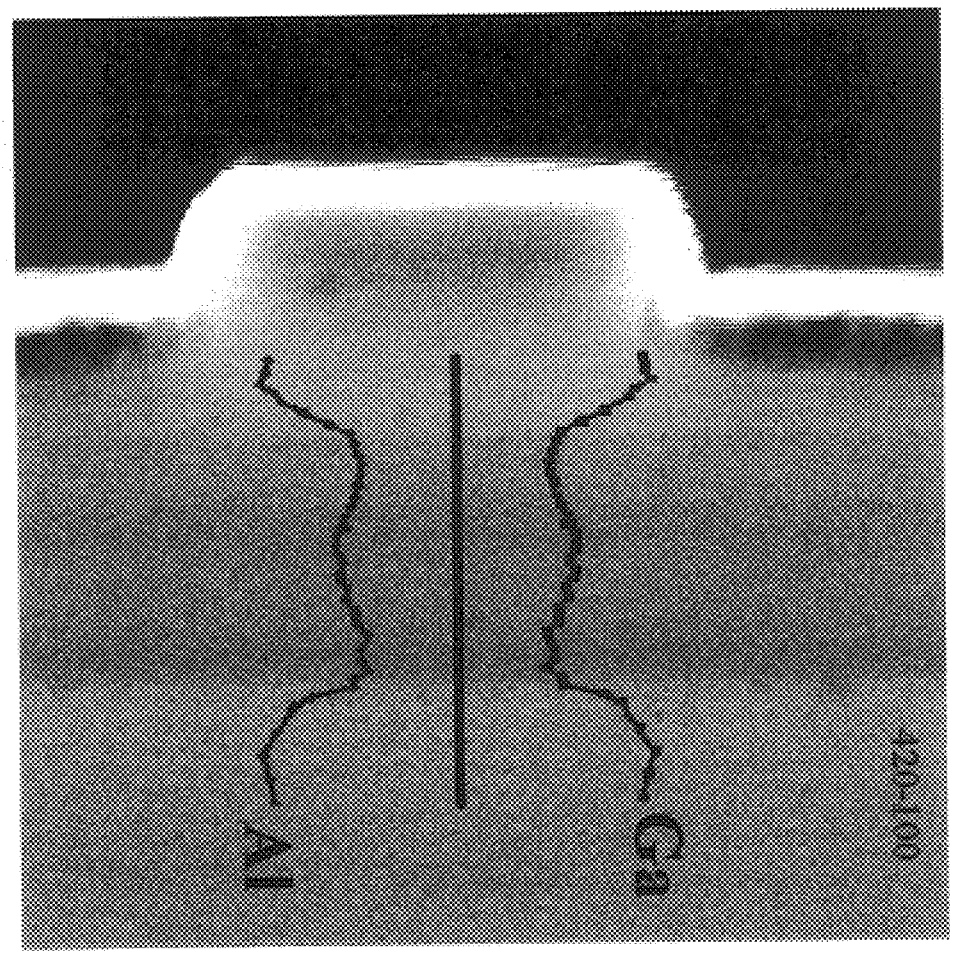
FIG. 19 is a photo of a cross sectional view of the nonlinear-optical waveguide 1. The photo is made by a scanner electronic microscope, and the distribution of Ga and Al in the direction perpendicular to the layers of the structure is shown. There is a slight localized peak of Ga in the area of the radiation-carrying layer, grown as the MQW structure such as $GaAs/Al_xGa_{1-x}As$. The nonlinear-optical waveguide 1 is made as a ridge waveguide. The top surface of the waveguide is coated by a thin layer of Au, representing the electric contact (electrode) (2), shown on FIG. 1. For comparison of sizes there is solid vertical line whose size is equal to 10 $\mu$m.
Figure 20:
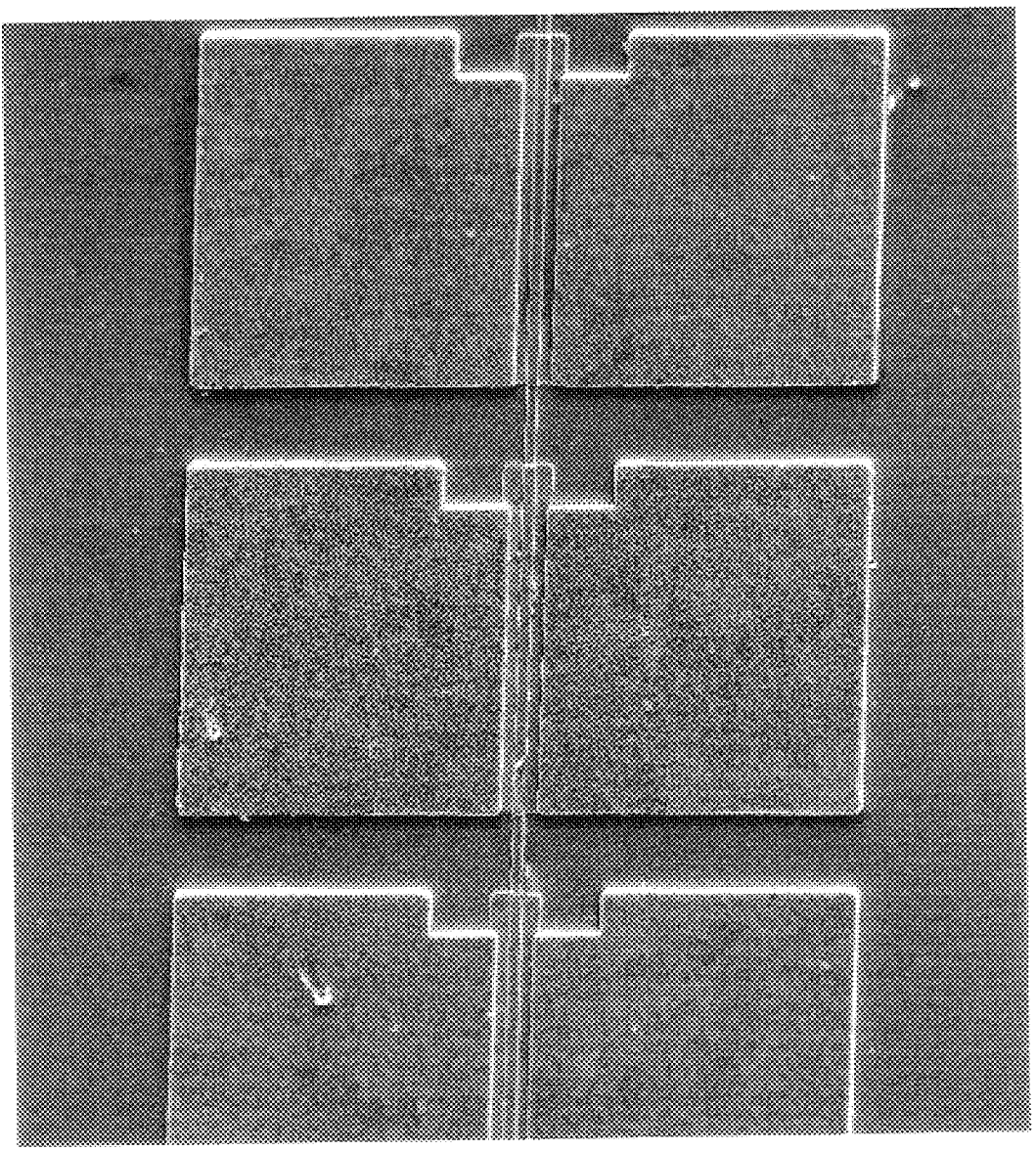
FIG. 20 is a view from above on the nonlinear-optical waveguide; electrical contact plates for soldering tiny wires (for carrying electrical current) are seen.
Figure 21:
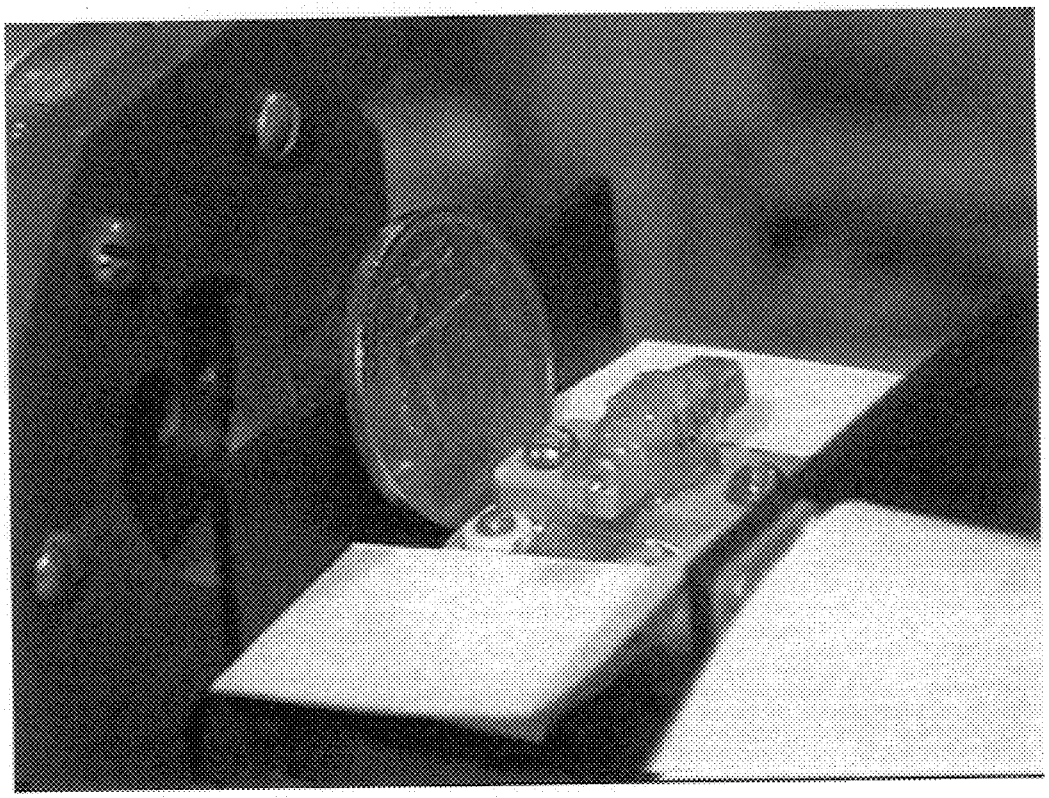
FIG. 21 represents a photo of a manufactured nonlinear-optical module operating as an optical transistor. For comparison of size, the Switzerland coin 5 Francs is shown.

The nonlinear-optical waveguide was made as a ridge optical waveguide (FIGS. 1, 19). The width of the ridge nonlinear-optical waveguide was 4 μm(FIG. 19). The nonlinear-optical waveguide was single-moded. The length of the nonlinear-optical waveguide was approximately 1 mm.

The MQW-type structure was a multiplicity of quantum wells. The period of the structure—200 A. A thickness h (FIG. 1) of a light-carrying (radiation-carrying) layer of the nonlinear-optical waveguide was 0.5 μm; it comprises approximately 25 periods of the structure. Above the MQW-type structure and below the MQW-type structure, horizontal layers GA$_y$Al$_{yy}$As with y=0.23 and a thickness of 1 μm were grown and further (for the better waveguide restriction)—layers Ga$_y$Al$_{yy}$As with y=0.35 and thickness 0.5 μm were grown. Thus, the area of the cross section of the nonlinear-optical waveguide is of the order of $10^{-7}$ cm$^2$. The nonlinear-optical waveguide was singlemoded.

A small electric current of the order of I–10 mA flowed across the nonlinear-optical waveguide in the direction perpendicular to the layers of the MQW structure. For this, an Au-film electrode was coated on top of the semiconductor wafer (FIGS. 1, 19, 20), to which electrode tiny metal (Au) wires were welded by thermocompression.

The top layer (with a thickness of 0.35 μm) of the semiconductor wafer structure, directly adjoined to the film electrode, was a highly doped GaAs p$^+$-type with a concentration of electrons of $10^{19}$ cm$^{-3}$ Four main aims were achieved by passing electric current across the nonlinear-optical waveguide.

First, decreasing radiation absorption (at small currents: 1–10 mA), there is the possibility to <<operate>> in the vicinity of the exiton resonance, where the most nonlinearity is achieved, and, therefore threshold and critical intensities are the least. Experiments reveal the very interesting fact that current with a small value of only 1–2 mA across the nonlinear-optical waveguide results in an increase of the differential gain of the modulation of the optical radiation and the power of optical radiation going through the nonlinear-optical waveguide by an order of magnitude compared with the case of absence of the current.

Secondly, there is the possibility to mount (at an essentially larger current than during operation of the device, usually larger than 30–40 mA ) cylindrical lenses 10 and gradans 11 at the ends (faces) of the nonlinear-optical waveguide with high precision. The gradans had AR coatings. The cylindrical lenses can also have AR coatings. In mounting during the construction of the nonlinear-optical waveguide module (FIG. 13, FIG. 21) diaphragm 12 and cubes from quartz and mountings rings were also used. Input/output elements (comprising the cylindrical lenses 10 and gradans 11) were mounted at the input/output ends of the nonlinear-optical waveguide in such a way that the nonlinear-optical waveguide together with the optical input/output elements make up a nonlinear-optical module.

Thirdly, when a semiconductor laser module is mounted before the nonlinear-optical module, the semiconductor laser module is positioned relative to the nonlinear-optical module by changing their relative positions until there is coincidence of the laser or laser module optical radiation beam with the nonlinear-optical module luminescence beam before the input and/or after the output of the nonlinear-optical module, wherewith the luminescence beam appears when electric current flow through the nonlinear-optical waveguide, and then the semiconductor laser or laser module is mounted relative to the nonlinear-optical module. Wherewith a current of more than 20 mA flows across the nonlinear-optical waveguide.

Fourthly, the precision of positioning the semiconductor laser module relative to the nonlinear-optical module is additionally controlled by means of comparison of the power of the laser module optical radiation transmitted through the nonlinear-optical module in the case of the absence of electric current through the nonlinear-optical waveguide and in the case of current flowing through the nonlinear-optical waveguide. Wherewith a current of 0.5 mA up to 10 mA flows across the nonlinear-optical waveguide. If laser module optical radiation is transmitted through the nonlinear-optical waveguide, then switching the electric current on and off caused an accordingly larger increase and decrease of the output power and the differential gain of modulation of the optical radiation.

If the laser module optical radiation did not pass through the nonlinear-optical waveguide then switching the electric current flowing across the nonlinear-optical waveguide on and off did not cause any change in the gain and power of the optical radiation received by the photodiode.

From below the semiconductor wafer was welded to a metal plate, mounted on the thermo-electrical Peltier element 4 (FIG. 13, FIG. 5). According to estimations, in close vicinity of exiton resonance at the used wavelength the nonlinear coefficient θ of the waveguide is of the order of $10^{-4}$ e.s.u. It depends on λ$_r$ and λ to a high degree. The wavelength corresponding to the exiton resonance in the structure is approximately equal to λ$_r$=0.86 μm. This λ$_r$ was adjusted gradually from an estimate 0.25 nm/grad and then set as stable (it was stabilized), adjusting and setting the temperature by adjusting the current through the Peltier element 4. Wherewith θ is adjusted and hence critical power and gain are adjusted, i.e. mode of operation of the device, by means of an ordinary temperature controller.

Adjustment was smoothly made into an area of exiton resonance (where θ is maximal) and a degree of closeness to it adjusted (and then fixed). As the exiton resonance was approached, the critical power, near which there was the phenomenon of self-switching of the UDCWs, decreased. Varying and setting the temperature of the Peltier element with the controller (regulator), it was possible to vary, to choose and to stabilize the critical power and the differential gain and the ratio of powers and phases between UDCWs at the output of the device. The tuning to the exiton resonance (or rather to the given closeness to it) was carried out by adjustment and subsequent stabilization of the temperature of both the nonlinear-optical waveguide and the laser diode. In the latter case the wavelength of the laser module was adjusted and stabilized by the temperature controller (driver) for the laser.

The used layered MQW- structure and the nonlinear-optical waveguide on its base have not only a large nonlinearity, but they also have a significant birefringence due to the different refractive indexes for waves having polarization along and across the layers of the structure. By theoretical estimations the difference between them is approximately $4 \times 10^{-3}$. The birefringence provides linear distributed coupling between the waves of different (orthogonal) polarization in the nonlinear-optical waveguide. The laser field was oriented approximately at an angle of 45° to the <<fast>> and/or <<slow>> axis of the MQW-structure and the nonlinear-optical waveguide; i.e. it was oriented approximately at an angle 45° to the axis of ellipse of the effective refractive index in cross section of the nonlinear-optical waveguide (FIG. 3), which was directed perpendicular to the layers of the MQW-structure (in a particular case—vertically). To obtain a sufficient value of the birefringence the value of x in the formula $GaAs/Ga_{1-x}Al_xAs$ of the layered MQW-type structure should be sufficiently large. In the case under consideration, it was 0.2. Besides, the attenuation of both UDCWs of mutually orthogonal polarization (mainly due to their absorption) should be sufficiently small. This means that the radiation-carrying layer of the nonlinear-optical waveguide should be sufficiently optically isolated from any metal coating on the surfaces of the semiconductor wafer. In other words, a sufficiently large waveguide limitation of the nonlinear-optical waveguide should be made. At the same time, the nonlinear-optical waveguide should be made single-moded for radiation fed into it.

In accordance with theory, the phenomenon of self-switching of UDCWs with different polarizations, separated by a polaroid at the output of the device, took place: the amplitude of the initial modulation (in the form of meander) was abruptly amplified approximately by a factor of a hundred times (FIGS. 14–17.). There were ejections of power. The rotation of external polaroid 18 caused a change of polarity of the amplified meander (and ejection of power: ejection upwards was replaced by ejection downwards, and <<polarity>>of the meander varied in opposite directions (FIG. 14), i.e. the so-called („supplementary,, between UDCWs of orthogonal polarizations was observed. It is explained by a sharp redistribution of energy between UDCWs of various polarizations: the ejection of radiation power of one polarization was replaced by ejection of radiation power of another (orthogonal to it) polarization. The ejection downwards is possible to treat as a dip in power. This dip and ejection were reached at two mutually perpendicular angular positions of polaroid 18 at the output. Let it be noted that <<supplementary>> shown in FIG. 14, and sharp (by two orders of magnitude) differential amplification of a signal cannot be explained by linear effects and linear theory.

The strong influence of the value of a small angle between a laser beam and a normal to a surface of a phase plate on the form and amplitude of a signal on the oscilloscope screen is also revealed. Slightly varying this angle, the difference in phases between orthogonal polarized waves at an input of the nonlinear-optical waveguide is varied, which strongly influences the process of switching, and, thus, the output power. This means there is an opportunity of effectively controlling the intensity at the output of the device by changing the difference in the phases of the UDCWs and/or of the signal and the pump optical radiations. For example, instead of a phase plate (e.g. a quarter-wave plate) 25 it is possible to mount an electrooptical crystal or optical waveguide and to apply a variable electric voltage signal to it.

At the same time, amplification of weak input modulation and <<supplementary in polarizations at output >> were observed and without the phase compensator (as a plate wave plate) 25, i.e. when the linearly polarized radiation is fed to the input of the nonlinear-optic module.

Further, after mounting the polarizer and/or the optical isolator before the nonlinear-optical waveguide and reducing the noise of the stabilizers of temperature and current of the laser at least by an order of magnitude, it was possible to observe the effects described above(including transistor amplification of weak modulation) in purer (cleaner) form: the amplified regular modulation had a large amplitude (depth), almost over the whole screen, and small noise, and there was no so-called <<base" line, corresponding to a modulation close to initial on the oscilloscope screen.

By varying the level of the average input power and/or the temperature of the nonlinear-optical waveguide, the increase of differential amplification can be changed (FIG. 17) and the mode of operation of the device changed and chosen.

Thus, a large differential factor of amplification (i.e. gain) of a signal can be attained with a small current through the nonlinear-optical waveguide.

As compared with known optical bistable elements based on a Fabry-Perot resonator, the proposed device is much more stable against instability of the frequency of the laser and consequently its operation is much more stable in the course of time.

The device being considered, used as the amplifier, has an important advantage as compared with semiconductor quantum amplifiers based on inverse population and requiring the flow of large currents (about 100 mA and higher), necessary for the creation of an essential inverse population. In the invented switches the amplification is differential and it is reached, not due to the inverse population, but due to the sharp redistribution of power between the coupled waves, in the first place, between UDCWs, and consequently the current through the structure is by one-two orders of magnitude less than that in the "inverse" amplifiers. This creates additional prospects for association of the proposed switches in the logic circuits.

As the powers of UDCWs at the output of the separator 18 change in opposite phase (FIG. 14), then, having inverted the form of change of power of one of the waves, signals (optical or electrical), each of which corresponds to one of the UDCWs, can be fed from the output of the device to the correlator and/or differential amplifier in which the common part in opposite phase is separated out; this opposite phase common part can be separated out, and, thus, noise reduced. Thus, there is the additional possibility to separate out the amplified information signal, cleared of noise, jamming, atmosphere fluctuation and casual distortions.

EXAMPLE 2

A nonlinear-optical waveguide is on a contact plate of oxygenless copper, mounted on a copper cylinder, which with the help of fixing flange 7 was mounted on a cooling bar 8, which is a metal plate (for example, of aluminum, copper, brass, duralumin, steel, etc.), 2 mm thick with a hole in the middle through which tiny electrical wires are passed (FIG. 13(*a*)). With the help of these wires, an electrical current of about 1–2 mA was passed across the nonlinear-optical waveguide. Sensors (sensor controls) of temperatures, which are formed by thermal contact with a cooling bar 8, were attached to it. Thermistors, and/or thermocouples (RTD) and/or sensors executed on the base of integrated circuits, e.g. such as AD 590 and or LMT 335 can be used as the temperature sensors (sensor controls). The cooling bar 8 was in thermal contact with both the nonlinear waveguide and with one of the plates (sides) of thermoelectric Peltier elements, for example, with a top (conditionally speaking, "cold") plate (FIGS. 5, 13). For improvement of the thermal contact between various contacting elements (say, flange 7 and cooling bar 8) the contacting surfaces were greased with a heat-conducting paste, for example, such as organo-silicon heat-conducting paste. In the considered example two Peltier elements were used, and as temperature sensors— two thermistors (having a resistance of 15 kilo-ohms at C). One of these sensors was used in the feedback circuit of the controller and stabilizer of temperature, and the second one was used as the temperature sensor in the circuit for indication of temperature. Another (conditionally—"hot") plate (side) of the Peltier element was in thermal contact with a heat radiator and was mounted on a little positioning (adjustment) table of steel. The thickness of the Peltier elements was 2 mm. For heat insulation, electroisolation and isolation from vibrations of the "hot" side of the Peltier element from the "cold" side, teflon shock-absorbers were used as washers. The current through the Peltier element was about 100 mA, the removed heat was less that 1W. Due to the radiator, the temperature of the Peltier elements was much less than the maximum allowable temperature of 160° C. The considered device made it possible to adjust and to stabilize the temperature of the birefringent nonlinear-optical waveguide with a degree of precision within 0.005° C. At a change of temperature of the nonlinear-optical waveguide the wavelength of the exiton resonance in the MQW—structure (containing not less than two heterotransitions) changed approximately at the rate of 0.3 nm/°C.

EXAMPLE 3

Optical radiation with a wavelength $\lambda=0.86$ $\mu$m from the single-mode semiconductor laser module linearly polarized along the vertical axis was passed through a Glan prism (to improve the degree of the radiation polarization), then— through a magneto-optical element made from magneto-optic glass doped with terbium (that is diamagnetic Faraday glass) and placed in a solenoid, and then the optical radiation was fed into a nonlinear-optical waveguide, the radiation-carrying layer of which was made of a layered structure such as $GaAs/Al_xGa_{1-x}As$, with x=0.2, representing a multiplicity of quantum wells (MQW) and having birefringence. The laser module was supplied with a precision current source. The optical axis of this birefringent structure was oriented along a vertical axis. The period of the structure was 200 A. The thickness h of the radiation-carrying layer was 0.5 $\mu$m, and within it approximately 25 periods of the MQW structure were stacked. The wavelength corresponding to the exiton resonance in the aforesaid structure was approximately equal to 0.859 $\mu$m. From above and from below the MQW structure, the symmetrically horizontal layers $GaAs/Al_yGa_{1-y}As$, with y=0.22, thickness 1 $\mu$m, and further (for best waveguide restriction)—layers $Al_yGa_{1-y}As$, thickness 0.5 $\mu$m, with y=0.35 settled down. The width of the strip ridge-type waveguide was 4 $\mu$m. The difference of refractive indices of two irthogonal-polarized waves was $\Delta n \approx 4 * 10^{-3}$. The cross section area was approximately $10^{-7}$ cm$^2$. The nonlinear-optical waveguide was single-moded. A weak electrical current about 1–2 mA was passed across the nonlinear-optical waveguide. For this purpose, a film electrode from above was coated on the waveguide, to which thin metal wires were soldered by thermocompression. The top layer of the semiconductor structure directly adjoining the film electrode and ensuring electrical contact was strongly doped GaAs such as p+ with a concentration of carriers $10^{19}$ cm$^{-3}$ and had a thickness of 0.35 $\mu$m. From below, the waveguide was soldered to a metal plate which was mounted on the Peltier element. So it was in thermal contact with one side of a Peltier element and with temperature one or two sensors. The sensor was made as a thermoresistor. By means of a temperature controller electrically connected to the Peltier element, the temperature of the nonlinear-optical waveguide was controlled and stabilized. The temperature of the nonlinear-optical waveguide was set to achieve a maximum depth of the modulation at the output of the modulator. In the vicinity of the exiton resonance, the used wavelength nonlinear factor of the nonlinear-optical waveguide was $\theta \approx 10^{-4}$esu. The length of the nonlinear-optical waveguide was 1.6 mm. Input and output of radiation was carried out by means of cylindrical lenses and clarified gradans, mounted at an input and output of the nonlinear-optical waveguide. The whole device containing an input gradan, input cylindrical lens, nonlinear-optical waveguide, output cylindrical lens and output gradan, looked like a united nonlinear-optical module.

If the electrical current through the solenoid is equal to zero, then the linear polarization is directed along the vertical (y) axis both at the output and at the input of the solenoid.

A variable electric current was passed through the solenoid. The change of the current corresponds to the useful (modulating) variable signal (analog or digital). The value and sign of an angle of a deviation (turn) of the polarization plane of the optical radiation from the vertical axis at the output of the magneto-optical element corresponds to the value and sign of the electrical current passing through the solenoid, and, hence, corresponds to the value and sign of the useful signal. The horizontal component of the electric field vector at small angles of deviation (turn) from the vertical axis is proportional to the angle of the deviation (turn); and at the same time the vertical component of the electrical field vector hardly varies. So it is possible to consider, that a weak variable optical signal with a vertical of polarization directed along a horizontal axis x, and carrying the useful information was fed into the input of the nonlinear optical waveguide (made on the basis of MQW structure) having birefringence (i.e. the axes of a refractive index ellipse in cross-section of the nonlinear-optical waveguide [FIG. 3] are directed along axes x and y). According to theory, in this case the phenomenon of optical self-switching of UDCWs of orthogonal polarizations with nonlinear coupling took place.

At an output of a polarizer positioned after the output of the nonlinear-optical waveguide, a useful signal amplified by $10-10^2$ times was received, and the powers of the orthogonal polarized waves at the output of the system ( i.e.

device) changed in opposite phase and the change of each of them by 10–10² times exceeded the change of signal amplitude at the input of the nonlinear-optical waveguide.

Figure 16:
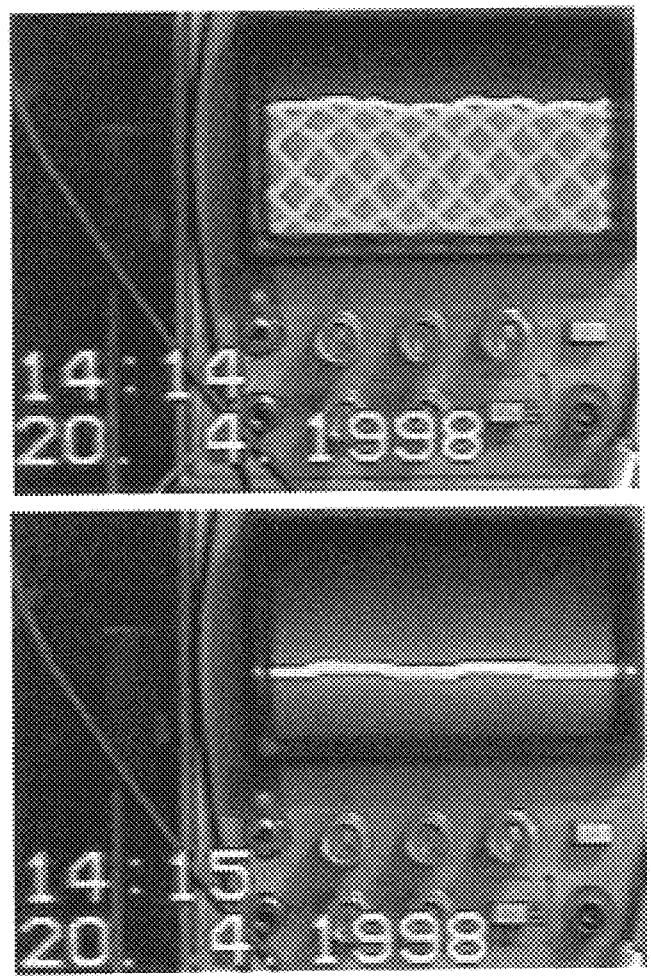
FIG. 16 shows gain in percentage modulation due to self-switching of the UDCWs having orthogonal polarization in the nonlinear-optical waveguide (on the top,), and absence of modulation without said nonlinear phenomenon (below). In both cases the Faraday effect is used.

At the output of the polarizer positioned after the output of the nonlinear-optical waveguide, a useful signal amplified by 10 10² times was received, the powers of the orthogonal polarized waves at the output of the device changed in opposite phase, and the change of each of them by 10–10² times exceeded the change of the signal amplitude at the input of the nonlinear-optical waveguide (as shown in FIG. 16).

If the threshold power is exceeded by the input optical power, then switching on a sinusoidal electric current through the solenoid, creating a magnetic field in the optical element, caused the initiation of polarization modulation at the input of the nonlinear-optical waveguide, which resulted in the appearance of a much higher, observable (sinusoidal) modulation at the output of the device (FIG. 16a). If the input power is less than the threshold optical power, then switching on the same electric current through the solenoid does not cause any observable magneto-optical modulation (FIG. 16b). The threshold power was of the order of the critical power.

Let it be noted that slight modulation in the form of a meander seen in FIG. 16 is due to modulation of the used laser module optical radiation by a slight modulation of the current through the laser diode. This is the initial signal modulation at the input of the nonlinear-optical module in FIG. 15.

The current of that used laser module monitoring photo-diode (proportional to the input optical radiation power) for the photo 16a is about 120–130 $\mu$A, whereas for photo 16a it is about 45–50 $\mu$A. Thus, the input optical radiation power in FIG. 16a is not more than three times greater than that in FIG. 16b. I.e. the amplified signal in FIG. 15 should be compared with initial signal in FIG. 16b.

If the input power is considered to be predetermined, then in FIG. 16a the threshold power is exceeded due to the nonlinear coefficient of the nonlinear-optical waveguide, and in FIG. 16b it is not exceeded.

In essence, an all-optical transistor operating as an amplifier of the Faraday effect is created for the first time, and the result of its operation is shown in FIG. 16. This all-optical transistor is made in the form of a compact nonlinear-optical module.

Under these conditions, the depth of modulation at the output of the device was 10² times more than in the case of the absence of the nonlinear-optical waveguide in the modulator.

The powers of the orthogonal polarized waves at the output of the device changed in opposite phase. Therefore, in order to reduce the noise, it is possible, after inverting the form of change of the power of one of the waves, to feed output information signals (optical or electrical) from an output of the device, each of which corresponds to its UDCWs, to a correlator with an electrical differential amplifier in which the common part of the change of the output signals is separated out, and, thus, noise is cut. Thus it is possible to separate out the amplified information signal cleared of noise, jamming and casual distortions.

EXAMPLE 4

A sequence of super-short pulses with a duration of 10 ps, with a wavelength $\lambda$=1.55 $\mu$m was pumped from a mode-locked NaCl:OH laser polarized along a vertical axis, passed through a Glan prism, then passed through a Faraday cell, which is a ferromagnetic crystal garnet (YIG, yttrium-ferrous garnet) placed in a solenoid, and then entered into a nonlinear-optical waveguide, the radiation-carrying layer of which was made on the basis of a layered MQW-type structure such as GaAs/Al$_y$Ga$_{1-y}$As, with x=0.2, which is a set of quantum wells. The period of one well was 200 A. The thickness of the radiation-carrying layer was 1am, and on it approximately 40 periods of the structure were stacked. The wavelength, corresponding to an exiton resonance in the MQW structure, was approximately equal to 0.78 $\mu$m. Strip waveguide width was 4 $\mu$m. The area of cross section was approximately of the order of $10^{-7}$ cm². The difference between the refractive indexes of two orthogonal-polarized waves was $\Delta$n=4*$10^{-3}$. A weak electric current of about 1–2 mA was passed. For this purpose, a film electrode was coated on the waveguide from above, to which thin metal wires were soldered with the aid of thermocompression. From below the waveguide was soldered to a metal plate which was mounted on a Peltier element. In the vicinity of the two-photon exiton resonance of the used wavelength, the nonlinear factor of the waveguide was of the order of $\theta$≅$10^{-11}$ esu. The waveguide length was 1 mm. The input of radiation into the nonlinear optic waveguide and output of radiation from the waveguide was carried out by means of cylindrical lenses and gradan, mounted at the input and output of the nonlinear-optical waveguide. The whole device containing an input gradan, input cylindrical lens, nonlinear-optical waveguide, output cylindrical lens and output gradan looked like a regular nonlinear-optical module. A variable electric current, whose change corresponded to a use passed through the solenoid variable signal (analog or digital). At an output of the polarizer, located after the output of the nonlinear-optical waveguide, a useful signal amplified by 10 times was obtained, and the powers of the orthogonal polarized waves at the output of the device were changed in opposite phase, and the change of each of them exceeded by 10 times the change of signal amplitude at the input of the nonlinear optical waveguide.

EXAMPLE 5

A wavelength $\lambda$=1.3 $\mu$m is pumped from a semiconductor laser polarized along a vertical axis, passed through a Glan prism, then—through a Faraday cell, which is a ferromagnetic crystal of garnet (YIG, yttrium-ferrous garnet), placed in a solenoid, and then entered into a nonlinear-optical waveguide, the radiation-carrying layer of which was made of a layered structure such as In$_{1-x}$Ga$_x$As$_y$P$_{1-y}$/InP, with x=0.2, y=2.2x, representing a set of quantum wells. The period of the structure was 200 Å. The thickness of the radiation-carrying core was 0.5 $\mu$m, and on it approximately 20 layers periods of the structure were stacked. The wavelength appropriate to the exiton resonance in the specified structure was approximately equal to 1.3 $\mu$m. The width strip of the waveguide was 4 $\mu$m. The length of the waveguide was approximately 1 mm. The difference of refractive indexes of two orthogonal-polarized waves was $\Delta$n≅4*$10^{-3}$. The area of cross section was approximately $10^{-7}$ cm². A weak electric current of about 1–10 mA was passed across the waveguide. For this purpose, a film electrode was put on the waveguide from above, to which by thermocompression thin metal wires were soldered. From below the waveguide was soldered to a metal plate which was mounted on a Peltier element. In the vicinity of the exiton resonance of the used wavelength, the nonlinear factor of the nonlinear-optical waveguide was about $\theta$≅$10^{-4}$ esu. The input and output of radiation from the waveguide was carried out by means of cylindrical lenses and gradan, mounted at the input and output of the nonlinear-optical waveguide. The whole device containing an input gradan, input cylindrical lens, nonlinear waveguide, output cylindrical lens and output gradan looked like a regular module. A variable electric current was passed through the solenoid, whose change corresponded to a useful variable signal (analog or digital). At an output of the polarizer, positioned at an output of the nonlinear-optical waveguide, a useful optical signal amplified by a 1000 times is obtained, and the powers of the orthogonal polarized waves at the output of the device changed in opposite phase and the change of each of them exceeded by 1000 times the change of signal strength at an input of the nonlinear waveguide.

As the powers of the orthogonal polarized waves at an output of the device changed in opposite phase, in order to reduce noise it is possible, after inverting the form of change of power of one of waves, to feed signals (optical or electrical) from an output of the device, each of which corresponds to UDCWs, to a correlator in which the common part of the change of signals is separated out, and, thus, noise is cut. Thus, it is possible to separate out an amplified information signal cleared of noise, jamming and casual distortions. For reduction of noise the signals from an output of the device can be fed to the correlator, in which the common part of amplified signals is allocated, and, thus, noise is cut.

EXAMPLE 6

The lasers and the nonlinear-optical waveguide from examples 1–3 were used, but at zero current through the solenoid the polarization of the field at an output and input of the solenoid, and also at an input of the nonlinear-optical waveguide was directed at an angle of 45° to the <<fast>> and/or to the <<slow>> axis of the nonlinear birefringent optical waveguide, which can be chosen as x and y axes.

The alternating current causes a deviation of a vector of a field from an initial angular position (without changing its size). This increases an x-component and reduces a y-component (or to the contrary), creating a small variable difference in intensities between waves polarized along axes y and x at an input of a nonlinear element. Wherewith, at an output of a nonlinear element this difference grows many times. The gain was due to the self-switching of UDCWs with orthogonal polarizations, which occurred in the nonlinear-optical waveguide.

EXAMPLE 7

A strip optical waveguide on the basis of a layered MQW-type structure $GaAs/Al_xGa_{1-x}As$ with x=0.2 was used. The period of the structure was 200 Å. The thickness of the GaAs layers was 100 A. The thickness of a layer of the light-carrying waveguide was 1 and on it 50 periods of MQW structure were stacked. The width of the strip waveguide was 4 $\mu$m. The length of the nonlinear-optical waveguide was approximately 1 mm. The wavelength adjacent to the edge of a zone of absorption, was approximately equal to 0.85 $\mu$m. The radiation with a wavelength $\lambda$=0.86 mu from the semiconductor laser module was weakly modulated by amplitude and was entered into the nonlinear-optical waveguide by means of a cylindrical lens and gradan. The maximum amplitude of modulation of power was a three—four order of magnitude less than the average power. Before input into the nonlinear-optical waveguide either linear or circular polarization was given to this radiation (for example, by transmission through a quarter-wave plate or through an optical waveguide to which an electrical voltage was applied). The output of radiation from the waveguide was also carried out by a cylindrical lens and gradan. Thus, the whole device consisting of a nonlinear-optical waveguide, input and output cylindrical lenses and gradan was made as a uniform nonlinear-optical module. Electrical current of about 1 mA was passed across the nonlinear-optical waveguide, whereby the absolute value of the difference of populations between the valent zone and the zone of conductivity decreased and accordingly the resonant absorption of radiation was sharply reduced. At the same time, due to closeness to resonance, a rather large nonlinear waveguide factor of about $10^{-4}$ esu was reached. The average threshold power, at which the differential factor of amplification significantly exceeded one, was 2–3 mW. The critical average pump power, near to which there was effective self-switching of radiation, was about 10 mW. A small change of entered input power of about 1 $\mu$W caused in a thousand times stronger change of power at an output of the nonlinear-optical waveguide of the order of 1 mW, and the powers of the coupled waves in orthogonal polarizations at an output of the waveguide changed in opposite phase, and these waves were separated by a polarizer. The complete power (in both polarizations) at an output and input of the nonlinear-optical waveguide was approximately identical, and that confirms the fact of a sharp reduction of the absorption of the nonlinear-optical waveguide. It should be noted, that used as a pump, the radiation of the semiconductor laser module was formed into a collimated axially symmetric beam by means of a cylindrical lens and gradan.

EXAMPLE 8

The same nonlinear-optical waveguide was used, through which an electric current of about 1 mA was passed in a cross direction. The radiation was fed to the waveguide by a fiber-optic waveguide, from which this radiation through optical contact (by means of a lens executed on the end of the waveguide) was entered into the nonlinear-optical waveguide. The input of the end fiber-optic waveguide had a Y-connection, to one branch of which a signal optical radiation of left circular polarization was fed, and into the other—optical pump radiation of right circular polarization. At the input the power pump was about 10 mW, and the signal power was about 1 mW, and the input power of the signal changed by a value of about 1 mW. The change of power at an output of the nonlinear-optical waveguide in a wave of one polarization was about 1 mW.

EXAMPLE 9

The same nonlinear-optical waveguide was used, through which an electric current of about 1–5 mA was passed in a cross direction. The radiation was fed to the nonlinear-optical waveguide by a fiber-optic waveguide (so called input waveguide), from which this radiation through an optical contact (by means of a lens formed on the waveguide end) entered the nonlinear-optical waveguide. An signal optical radiation of one linear polarization was fed into the input fiber-optic waveguide with the help of Y-type optical mixer, and a pump optical radiation of another linear polarization, orthogonal to the polarization of the signal optical radiation was fed (FIG. 8). The electric field vector of the pump optical radiation was directed approximately at an angle of 45° to planes of the layers of the MQW—structure of the nonlinear-optical waveguide. The entered pump power was about 10 mW, and the power of signal optical radiation was about 1 muW. The variation of power at the output of the nonlinear-optical waveguide in a wave of one linear polarization was about 1 mW.

Example 10. The same nonlinear-optical waveguide was used, through which an electrical current about 1 –10 mA was passed in a cross direction. The radiation to the nonlinear-optical waveguide was fed by a fiber-optic waveguide (with a Y-type mixer), from which this radiation through optical contact (by means of a lens on the end of the fiber-optic waveguide) was entered into the nonlinear-optical waveguide. Radiation of one circular polarization with a power of approximately 10 mW was fed into the waveguide, and its intensity was varied at an input by a value of about 1 mW. The maximum change of power at an output of the nonlinear-optical waveguide in left and right circular polarizations was about 1 mW and occurred in opposite phase.

EXAMPLE 11

The period of the structure was 400 Å. A strip optical waveguide on a MQW basis of layered structure $In_{0.47}Ga_{0.53}As/InP$ was used. The thickness of layers $In_{0.47}Ga_{0.53}As$ was grown to 200 A, and 20 periods of the structure were stacked within the whole thickness of the waveguide (on a vertical), equal to 1 $\mu$m. The strip waveguide width was 4 $\mu$m. The waveguide length was approximately 1 mm. The wavelength appropriate to the edge of a zone of absorption was approximately equal to 1.55 $\mu$m. Radiation with a wavelength $\lambda$=1.55 cm from the semiconductor laser module entered the waveguide by means of a cylindrical lens and gradan. The output of radiation from the waveguide was also carried out by a cylindrical lens and gradan. Thus, the whole device consisting of an optical waveguide, input and output cylindrical lenses and gradans was made as a uniform nonlinear-optical module. An electric current of about 1–2 mA was passed across the nonlinear-optical waveguide (e.g. in vertical direction), due to which the absolute value of a difference of populations between a valent zone and a zone of conductivity decreased, and accordingly the resonant absorption of the radiation was reduced by a high degree. At the same time, due to the closeness to resonance, a very large nonlinear waveguide factor (about $10^{-3}$ esu) was achieved. The entered power was poorly modulated by amplitude; the deviation of power from the average value and relative change of power did not exceed 0.1% of the average power of the laser module. Such a modulation was reached by weak modulation of current through the laser diode or by an external modulator, mounted after the laser module. The threshold power was approximately 2 mW. The critical power, near to which there was an effective self-switching of radiation was about 5 mW. The small change of power of a signal at an input was about 1 mW. And it caused a thousand times greater change in the power of the wave of each polarization at the output of the waveguide (about 10 mW), and the powers at the output of the nonlinear-optical waveguide in orthogonal polarizations changed in opposite phase. The whole power at the output and input of the nonlinear-optical waveguide was of one order, that confirming the fact of sharp reduction of absorption. It should be noted that, used as the pump, the radiation of the semiconductor laser module was formed into a collimated axially symmetric beam by means of the cylindrical lens and gradan mounted at the output of the nonlinear-optical waveguide.

EXAMPLE 12

The nonlinear-optical waveguide from example 2 was used, through which an electric current about 1 mA was passed in a cross direction. Pump optical radiation with a wavelength close to 1.7 $\mu$m of linear or circular polarization or elliptic polarization, and a signal of another or the same linear or circular polarization or elliptic polarization with a wavelength close to 0.85 $\mu$m were fed into the aforesaid waveguide. If radiation of linear polarization was fed, then the vector of the electrical field in it was directed at an angle from 10° up to 80° to the layers of the MWQ—structure of the nonlinear birefringent optical waveguide. The entered pump power was about 50 mW, and the power of a signal was about 1 mW, and the fed signal power changed by a value of about 1 mW. The output power change in a wave of one polarization at the output of the nonlinear-optical waveguide was about 5 mW.

EXAMPLE 13

Pump optical radiation with a power of about 60 mW with a wavelength $\lambda \approx 0.78$ $\mu$m from the semiconductor laser module polarized along an axis perpendicular to layers of the MWQ structures of the birefringent nonlinear-optical waveguide entered the nonlinear-optical waveguide, the radiation-carrying of which was made of layered structure such as $GaAs/Al_xGa_{1-x}As$, with x=0.3, representing a set (multiplicity) of quantum wells. The period of the structure was 200 Å. The thickness of the radiation-carrying layer was 0.5 $\mu$m and it comprised approximately 25 periods of the structure. The wavelength appropriate to the exiton resonance in the specified structure was approximately equal to 0.77 $\mu$m. The width of the strip waveguide was 4 $\mu$m. The length of the waveguide was approximately 1 mm. The difference of refractive indexes of two orthogonal polarized waves was $\Delta n \approx 4*10^{-3}$. The area of cross section was approximately 10 $\mu$m. A weak electric current of about 1–10 mA was passed across the aforesaid waveguide. For this purpose, a film electrode was mounted on the waveguide from above, to which thin metal wires were soldered by thermocompression. From below, the waveguide was soldered to a metal plate which was mounted on a thermoelectric Peltier element. In the vicinity of the exiton resonance of the used wavelength the quadratic-nonlinear factor waveguide was about $10^{-4}$ esu. The length of the nonlinear-optical waveguide was 1 mm. The input and output of radiation from the waveguide was carried out by means of cylindrical lenses and a gradan, mounted at the input and output of the nonlinear optical waveguide. The whole device containing an input gradan, input cylindrical lens, nonlinear-optical waveguide, output cylindrical lens and output gradan, looked like a regular nonlinear-optical module. If power modulated signal optical radiation with a wavelength $\lambda$=1.55 $\mu$m and maximum power of 0.5 mW, polarized orthogonal to the polarization of pump optical radiation, was fed simultaneously into the same nonlinear-optical waveguide by means of the optical mixer, then at the output of the waveguide an amplified radiation (with a power of about 50 mW) with a wavelength $\lambda$=155 $\mu$m appeared, which modulation almost without distortions repeated the modulation of the input signal optical radiation, but its maximum power was about 40 mW. In the absence of signal optical radiation at the input, output radiation with a wavelength $\lambda$=1.55 $\mu$m was not present. If signal optical radiation was also fed at an input (with power 0.5 mW), then the output power of the radiation with $\lambda$=1.55 $\mu$m was 40 mW.

In the given example the parametrical transformation of frequency downwards, i.e. separation of frequency, is considered. It is based on quadratic-nonlinearity of the nonlinear-optical waveguide, which as well as cubic-nonlinearity increases by a high degree when the radiation wavelength approaches $\lambda_r$, where $\lambda_r$ is the wavelength of the exiton resonance. And in the given example, the pump optical radiation is in the area of the one-photon exiton resonance, and the signal optical radiation—in the area of the two-photon exiton resonance.

In order to increase the birefringence of the layered structure with the purpose of increasing the efficiency of transformation of the frequency and switching due to improvement of the phase matching of waves on various frequencies ($\omega$ and $2\omega$), it is possible to use the structure GaAs/AlAs, in which the layers AlAs are transformed to oxide with a refractive index n≈1.6.

EXAMPLE 14

A nonlinear-optical waveguide, similar to the one considered in example 1 was used, but with the thickness of the radiation-carrying layer two times greater. Therefore, two cross modes could propogate in the nonlinear-optical waveguide. At the input of the nonlinear-optical waveguide, the pump optical radiation as a zero cross mode and the signal optical radiation in the form of a first cross mode were fed with the help of a Y-connection, i.e. mixer. At the output of the nonlinear-optical waveguide, radiations of the zero and the first modes were spatially separated. The linear distributed coupling between modes can be present (due to spatial heterogeneity of the nonlinear-optical waveguide), but it may be absent as well. In the second case, there was nonlinear distributed coupling. Both in the first and in the second case switching between modes occurred and amplification of the input modulation at excess pump power of threshold value took place.

EXAMPLE 15

A nonlinear semiconductor waveguide, similar to the one considered in example 1 was used. The signal optical radiation before being fed into the mixer was passed through a phase modulator, which is a waveguide, on the sides of which film electrodes were located. A modulating electric voltage varying the shift of phases between the signal and the pump radiation at the input of the nonlinear-optical waveguide was applied to these electrodes. (The specified phase modulator is shown, for example, in the book <<Guided-Wave Optoelectronics>>, Theodor Tamir (Ed.), Berlin, "Springer-Verlag", 1988.)

EXAMPLE 16

A nonlinear semiconductor waveguide, similar to the one considered in example 1 was used. The stationary electrical field formed by means of a periodic electrode structure (<<Guided-Wave Optoelectronics>>, Theodor Tamir (Ed.), Berlin, "Springer-Verlag", 1988, pp.256,257) was applied to this waveguide. There was rotation of the plane of polarization in a linear regime in such a structure. In the nonlinear regime (at an excess of pump optical radiation power over the threshold power) a small variation of the input signal resulted in a sharp switching of radiation from TE—polarization to TM-polarization or vice versa, accompanied by large amplification of the modulation.

EXAMPLE 17

Strip nonlinear TCOWs on a MQW base of layered structure GaAs/Al$_x$Ga$_{1-x}$As with x=0.2 was used. The period of the structure grew to 200 Å. The thickness of the GaAs layers was 100 Å. The width of the strip waveguide was 3 $\mu$m. The distance between the waveguides was approximately 2 $\mu$m. Radiation with a wavelength $\lambda$=0.86 mu from a semiconductor laser entered one of the waveguides by means of a cylindrical lens and gradan. The output of the radiation from every waveguide was also carried out by a cylindrical lens and gradan. Thus, the whole device consisting of TCOWs, input and output cylindrical lenses and gradans looked like a uniform module. The waveguides were singlemoded. An electric current of approximately 2 mA was passed across the nonlinear TCOWs. For this purpose, a film electrode 3 (FIG. 2) was coated from above on the waveguide, to which thin metal wires were soldered by means of thermocompression. The top layer of the semiconductor structure directly contiguous to the film electrode and ensuring electrical contact, was highly doped GaAs such as p+ with a concentration of carriers $10^{19}$ cm$^{-3}$ and a thickness 0.35 $\mu$m. From below the waveguide was soldered to a metal plate which was mounted on a Peltier element. The wavelength appropriate to the exiton resonance in the specified MQW—structure was approximately equal to 0.86 $\mu$m. This wavelength was smoothly adjusted (at the rate of: 0.25 nm/grad) and then set stable, adjusting and establishing the temperature of the structure by means of adjustment and stabilization of the current through the Peltier element, with one side of which the layered semiconductor structure was in thermal contact with. Thus, these parameters were smoothly adjusted in an area close to exiton resonance (where the nonlinearity is maximum) and a degree of vicinity to it adjusted (and then fixed). Closer to the exiton resonance the value of critical intensity, near to which there was the phenomenon of self-switching UDCWs decreased. Varying and establishing by means of a regulator, it was possible to vary the temperature of the side of the Peltier element, to choose, to set and to stabilize the critical intensity. The adjustment to the exiton resonance (or to the given degree of closeness to it) was carried out by adjustment and subsequent stabilization of the temperature of both the nonlinear-optical waveguides and the laser diode. In the latter case the wavelength of the laser was adjusted and stabilized. In the area of exiton resonance of the used wavelength, due to the closeness to resonance, a large nonlinear factor of the waveguide, according to estimations about $_{10}^{-4}$ esu was reached.

The critical pump power, near to which there was effective self-switching of radiation, was about 10 mW. The small change of the power of input radiation at an input of about 1 $\mu$m caused a one thousand time stronger change of power (about 1 mW) at an output of the waveguides, and the power at the output of the nonlinear waveguides changed in opposite phase. A calculation of the total power at the output of the device confirmed the fact of sufficient reduction of absorption due to the electric current. It should be noted that, when used as the pump the radiation of the semiconductor laser was formed into a collimated axially symmetric beam by means of a cylindrical lens and gradan.

EXAMPLE 18

The same TCOWs, through which an electric current of about 1–10 mA was passed in a cross direction were used. Radiation was fed to each of the TCOWs by an optical fiber waveguide, from which this radiation through optical contact was entered into one of the TCOWs. A signal optical radiation was fed into one of the TCOWs and a pump optical radiation with intensity close to critical, was fed into another or into the same waveguide. The carrying frequency of the signal could differ from the frequency of the pump, but could coincide with it. The pump power was set to a value of 10 mW, and the power of the signal was about 10 muW, wherewith the power of the signal changed by a value of about 10 muW. The change of power at the output of the waveguide was about 1 mW at concurrence of the frequencies (wavelengths) of the signal and pump, and approximately 0.1 mW at different wavelengths of the signal and the pump.

EXAMPLE 19

The same TCOWs as in examples 1 and 2 were used, and the frequency of the signal coincided with the pump frequency, and pump intensity was chosen close to critical. Wherewith, not the input signal power (amplitude), but its phase was changed. For this purpose, the signal before input into one of the TCOWs was passed through an electrooptical modulator—an optical waveguide from an electrooptical material, or an electrooptical crystal. The variable electric voltage signal modulating an input phase of a signal was applied to this optical waveguide or crystal by means of electrodes. Wherewith, a sharp redistribution of the radiation power at the output of the nonlinear TCOWs between waveguides took place, and, thus, the output radiation appeared as modulated in amplitude, i.e. the phase modulation at an input of the TCOWs, created in an electrooptical element, was transformed (with high efficiency) to amplitude modulation.

EXAMPLE 20

The same TCOWs, across which an electric current of about 5 mA was passed, were used. The radiation to each of TCOWs was fed by a fiber-optic waveguide, from which this radiation through optical contact was fed into one of the TCOWs. Pump optical radiation was fed into both waveguides. A controlling signal or signals were fed into both TCOWs or into one of them. The intensity of the signal (or signals) was varied in the range from zero to the maximum value. In another case, the phase of the signal (or signals) was changed, leaving the power of the signals constant. The pump power was about 10 mW. The maximum signal power signal was about I muW, and the power of the signal changed by a value of about 1 muW. The change of the power at the output of each nonlinear-optical waveguide was about 1 mW.

EXAMPLE 21

Strip TCOWs on the basis of the layered MQW structure $In_{0.47}Ga_{0.53}As/InP$ were used. The period of structure grown to about 200 Å. The thickness of the layers $In_{0.47}Ga_{0.53}As$ was grown to 200 Å. The width of the strip waveguide was 4 $\mu$m. The space (gap) between the waveguides was approximately 3 $\mu$m. The wavelength appropriate to the edge of a zone of absorption, was approximately equal to 1.55 $\mu$m. Radiation with a wavelength $\lambda=1.55$ mu from the semiconductor laser module entered into one of the waveguides by means of a cylindrical lens and gradan. The radiation output from each waveguide was also effected by a cylindrical lens and gradan. Thus, the whole device consisting of TCOWs, input and output cylindrical lenses and gradans was made as a uniform module. An electric current of about 1–10 mA was passed through the TCOWs in a cross direction (e.g. vertical), due to which the absolute magnitude of a difference of populations between a valent zone and zone of conductivity decreased and accordingly the resonant absorption of radiation was sharply reduced. The gradual temperature tuning to the exiton resonance was carried out by changing and stabilizing the of temperature both nonlinear TCOWs and laser diode. It was achieved by changing and subsequent stabilizing the current through the Peltier elements, on which the laser diode and nonlinear TCOWs were mounted. Due to the closeness to resonance, a large nonlinear waveguide factor of about $10^{-4}$ esu was achieved. The critical pump power, near to which there was an effective self-switching of radiation was about 10 mW. The small change of power of the signal at an input of the nonlinear TCOWs (about 1 muW) caused a one thousand times stronger change of power at the output of the waveguides (about 1 mW), and the power at the output of the TCOWs changed in opposite phase. The total power at an output and input of the waveguide was approximately identical, this confirming the fact of a sharp reduction of the absorption of the nonlinear-optical waveguide due to the electric current through it. It should be noted that, the radiation of the semiconductor laser used as the pump was formed into a collimated and axially symmetric beam by means of a cylindrical lens and gradan.

EXAMPLE 22

A pump radiation with a power of about 60 mW wavelength $\lambda=0.78$ $\mu$m from a semiconductor laser module polarized along a vertical axis entered into one of two cubic-nonlinear TCOWs, the radiation-carrying layer of which was made of a layered structure such as $GaAs/IA_xGa_{1-x}As$, with x=0.3, which is a set of quantum wells (multiple quantum wells). The period of the structure was 200 Å. The thickness of the radiation-carrying core was 0.5 $\mu$m and approximately 25 periods of structure were stacked on it. The wavelength appropriate to the exiton resonance in the specified structure was approximately equal to 0.78 $\mu$m. The width of the strip nonlinear-optical waveguide was 3 $\mu$m, and the gap between them about 1 $\mu$m. The length of tunnel coupled waveguides was approximately 3 mm. The factor of tunnel coupling of the waveguides was $K\approx2*10^{-3}$ at a wavelength $\lambda=0.78$ $\mu$m and $K\approx5*10^{-3}$ at a wavelength $\lambda=1.56$ $\mu$m. The difference between the refractive indexes of two orthogonal polarized waves in every waveguide was $\Delta n\approx4*10^{-4}$. The area of cross section of one waveguide was approximately $10^{-7}$ cm$^2$. A weak electric current of about 1–3 mA was passed across the nonlinear-optical waveguide. For this purpose, film electrodes were coated from above on the waveguide, to which thin metal wires were soldered by means of thermocompression. From below the waveguides were soldered to a metal plate mounted on a Peltier element. Close to the exiton resonance of the used wavelength, the nonlinear factor of the waveguide was approximately $2*10^{-5}$ esu. The input and output of radiation from the waveguide was carried out by means of cylindrical lenses and gradan, mounted at an input and output of the nonlinear-optical waveguide. The whole device containing input gradan, input cylindrical lens, nonlinear waveguide, output cylindrical lens and output gradan looked like a uniform module. If intensity modulated signal optical radiation with a wavelength $\lambda=1.56$ $\mu$m and maximum power 0.5 mW was simultaneously entered into the same or the next nonlinear-optical waveguide by means of a mixer, there was an amplified radiation (with a power of about 50 mW) with a wavelength $\lambda=1.56$ $\mu$m, polarized orthogonal to the pump optical radiation, at an output of the waveguide, which modulation almost without distortions repeated modulation of the signal optical radiation at the input, and the maximum power was 40 mW. With no signal optical radiation at an input, radiation with a wavelength $\lambda=1.56$ $\mu$m at an output is not present. If the signal optical radiation at an input was also present and its power was 0.5 mW, then at the output the radiation power with $\lambda=1.56$ $\mu$m was 40 mW. In the given example the parametric transformation of frequency downwards, i.e. division of frequency, was considered. It is based on quadratic nonlinearity of the waveguides, which as well as cubic nonlinearity grows by a high degree in the vicinity of the exiton resonance. And in the given example pump radiation is close to the exiton resonance, and signal optical radiation—into the two-photon area of the exiton resonance.

Synchronism between waves on basic ($\omega$) and double ($2\omega$) frequencies was achieved by use of synchronism of the coupled waves in TCOWs and partially taking into account the birefringence of each waveguide.

EXAMPLE 23

The same waveguides were used, but pump radiation (power of 10 mW) had a wavelength $\lambda=1.55$ $\mu$m, and the weak modulated signal—a wavelength $\lambda=0.78$ mu. A smaller factor of amplification of a signal was reached in this case than in example 22.

EXAMPLE 24

Planar TCOWs were used, each radiation-carrying layer of which was a layered MQW structure: $GaAs/Al_xGa_{1-x}As$, with x=0.22. The period of the structure was 200 Å. The thickness of the radiation-carrying layer (core) was about 1 $\mu$m and within it approximately 50 periods of structure were stacked. The wavelength corresponding to the exiton resonance in the specified structure was approximately equal to 0.78 $\mu$m. A flat layer $GaAs/Al_yGa_{1-y}As$ was grown with y≈0.25 and thickness 0.7 $\mu$m in the gap (space) between these two MQW-type waveguides. From above and from below the MQW-structures rather thick layers $Al_zGa_{1-z}As$ with z=0.27 and thickness of more than 2 $\mu$m were grown. Large factors of tunnel coupling: $K \approx 10^{-2}$ with the wavelength $\lambda \approx 0.78$, and $K \approx 4 * 10^{-2}$ with the wavelength $\lambda=1.56$ were achieved in such TCOWs. This made it possible under conditions of <<synchronism of the coupled waves>> to a greater degree than in previous examples to compensate frequency dispersion of the optical waveguides and achieve approximately by an order of magnitude greater gain of the signal optical radiation. Like in the previous examples, a current of about 20 mA was passed through the waveguides in the cross direction. The wavelengths and other parameters of signal and pump radiation approximately corresponded to examples 21 and 22.

EXAMPLE 25

Figure 12:
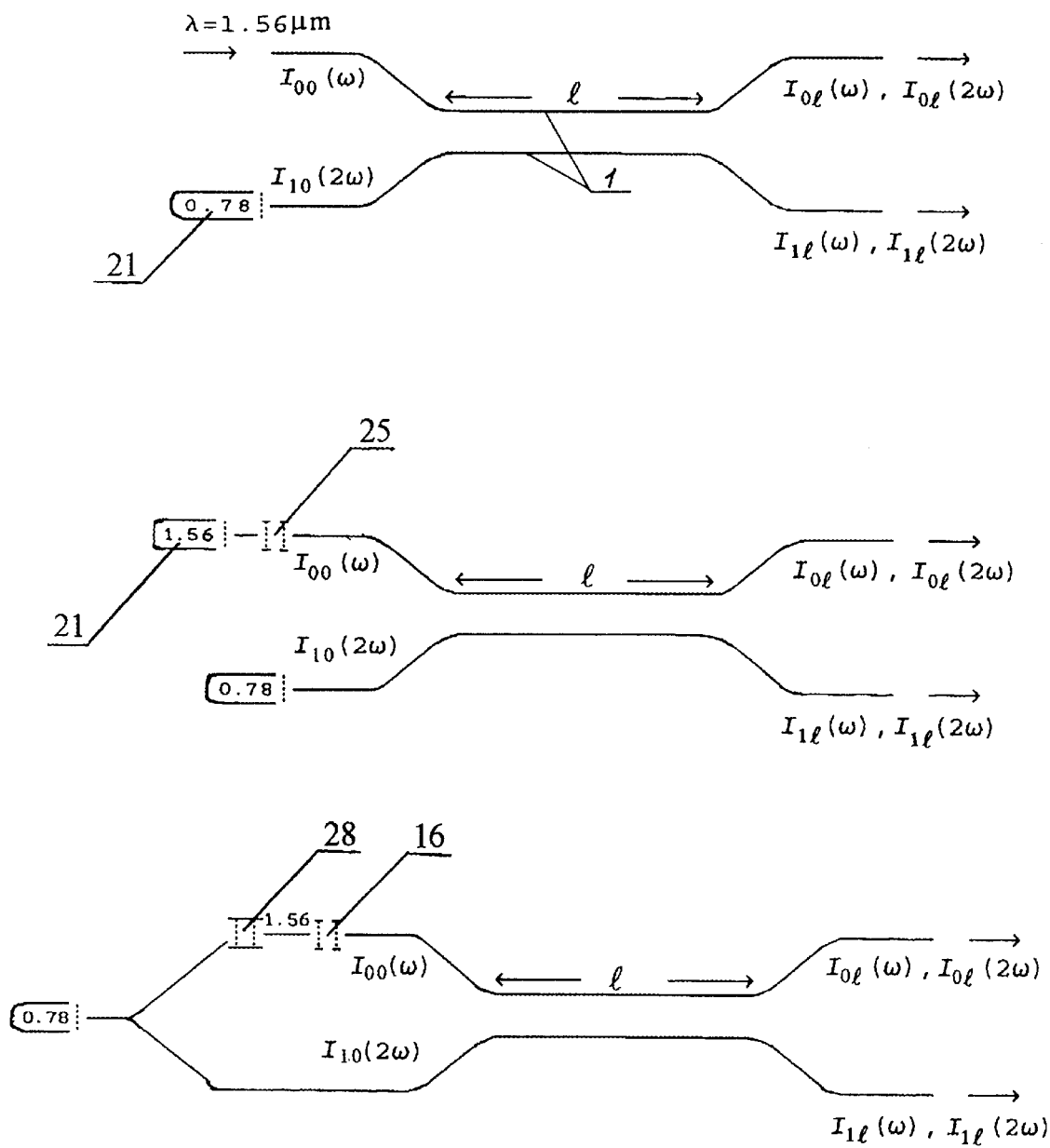
FIG. 12 shows schematic views of variants of the device on the basis of quadratic nonlinear TCOWs, in which switching, amplification and modulation of UDCWs at different frequencies can occur.

The same quadratic-nonlinear TCOWs as in examples 21 and 22 were used, the feeding of optical radiation into the nonlinear TCOWs was carried out with fiber-optic waveguides (FIG. 12). The semiconductor laser 21 for pump optical radiation with a wavelength $\lambda=0.78$ $\mu$m was joined to one of the fiber-optic waveguides, at the end (face) of which a parabolic or conic lens was formed, and the end (face), contiguous to it, of the waveguide of radiating semiconductor structure of the laser was clarified (i.e. an antireflection was coated), and the refractive index grating, an output mirror of the external resonator of the semiconductor laser module, is executed in the fiber-optic waveguide itself at a distance 2 mm from the lens. Such design of the laser module provided a frequency of radiation in itself fiber-optic waveguide by a distance 2 mm from the lens with the width of a line not more 0.3 nm. The signal optical radiation with the wavelength $\lambda=1.56$ $\mu$m was fed by a fiber-optic waveguide (line). Before the input into one of the nonlinear waveguides, the electrooptical element 25, in particular, made as a piece of a waveguide, can be mounted, which makes it possible to choose an optimum difference in phase between signal and pump optical radiations, at which maximum amplification of the signal is reached. At the output of the device there was an information signal, amplified by three orders of magnitude, with $\lambda=1.56$ $\mu$m, which could then be transferred further by the fiber-optic communication line.

The device can additionally contain a frequency conversion element 28, in which frequency conversion takes place. It can be made as a part of a quadratic-nonlinear-optical waveguide. It can operate as a frequency divider (as shown in FIG. 12), or a frequency doubling element or an element providing another predetermined conversion of frequency.

The given design is in essence a compact, effective, low-noise, super-high speed, all-optical, all-waveguide retranslator for a fiber-optic communication line.

EXAMPLE 26

The same waveguide was used as in example 24 (FIG. 12), but nonlinear TCOWs were used as cubic-nonlinear TCOWs on the basis of an MQW-structure with the exiton resonance near to the wavelength $\lambda=0.78$ $\mu$m. At the output of the system, an information signal amplified by two orders of magnitude and with a frequency corresponding to wavelength $\lambda=0.78$ $\mu$m arose. Wherewith, the transformation of the frequency of radiation in nonlinear TCOWs was absent.

EXAMPLE 27

The same quadratic-nonlinear TCOWs were used, as in previous examples, the transfer and input of optical radiation into nonlinear TCOWs were carried out with fiber-optic waveguides (FIG. 12). Radiation with a wavelength $\lambda=1.56$ $\mu$m was fed into the zero waveguide with the help of a fiber-optic waveguide, adjoined to a laser diode; wherewith a channel attenuator and optical isolator 24 can be placed in the waveguide. In another nonlinear-optical waveguide, joined (by means of a fiber-optic waveguide) to this laser and nonlinear-optical waveguide, the radiation from the semiconductor laser with wavelength $\lambda=0.78$ $\mu$m was entered. The electrooptical element 16 made as a part of a waveguide from an electrooptical material with a possibility of changing the difference in phases of pump and signal optical radiations at the input of the nonlinear TCOWs in one of the fiber-optic channels was mounted. When an electric signal is applied to the electrooptical element, amplitude modulation of radiation at the output of the device was achieved. In this case, the element 16 operates as a phase modulator, not as a phase compensator.

The device additionally contains a frequency conversion element 28, in which frequency conversion takes place. It can be made as a part of a quadratic-nonlinear-optical waveguide. It can operates as a frequency divider (as shown in FIG. 12) or frequency doubling element or element providing another predetermined conversion of frequency ($\omega_3=\omega_1+\omega_2$).

The semiconductor MQW-type structure, which is a radiation-carrying layer (core) (with a thickness of about 1 $\mu$m) and the basis of a nonlinear-optical waveguide, can be made as alternating thin layers (with a thickness of about 100 Å) of $GaAs/Al_xGa_{1-x}As$ or $In_xGa_{1-x}As/InP$ or $In_{1-x}Ga_xAs_yP_{1-y}/In_{1-x'}Ga_{x'}As_{y'}P_{1-y'}$, where x≠x' and/or y≠y' or $CdSe_{1-x}A_x/CdSe$ or $In_{1-x}Sb_x/InAs$ or $PbS_xSe_{1-x}/PbSe$ or $Ge_xSi_{1-x}/Si$ containing at least two hetero-transitions or alternating layers of other semiconductor materials.

As a rule, this MQW-type structure is grown on a substrate, made from a material, comprising a radiation-carrying layer in the composition of the MQW-type structure. But the combined variant, when the MQW-type structure, radiation-carrying layer is grown on a substrate wafer made from a different material, is also possible and sometimes can be favorable. For example, alternating thin layers $Ge_xSi_{1-x}/Si$ are cheap and durable, but poorly emit luminescent radiation. The latter circumstance restricts the use of the layers $Ge_xSi_{1-x}/Si$ for carrying out the suggested method and device into effect.

So, a combined variant can be favorable, when GaAs/$Al_xGa_{1-x}As$ layers are grown on a Ge-substrate. The Ge-wafer substrate is not only low-cost as compared with a GaAs-wafer substrate, but it is also lighter and more durable. This is important, e.g., for space devices. This combination is also possible for other materials, if it is possible to grow the MQW-type structure on the substrate material.

It should be noted that the case where the MWQ-type structure contains only two hetero-transitions is also under consideration, if at least two aforesaid UDCWs can propagate and interact in the nonlinear-optical waveguide based on this MWQ-type structure.

Industrial Applicability

An all-optical transistor, amplifying (approximately by a factor of a hundred times) a small amplitude of signal modulation of continuous wave radiation of a semiconductor laser (with an average power approximately equal to 10 mW) has been created. It looks like a compact waveguide module. The all-optical transistor has a linear amplitude characteristic (FIG. 15), i.e. it does not distort the form of an amplified signal. So it can be used as an ultra-fast super-effective compact modulator or all-optical small signal amplifier in optical communications and also as a transformer of modulation from one optical frequency to another. In the latter case, a modulated optical signal and optical pump radiation (with another frequency) are fed into an input of the all-optical transistor and the modulation of the optical signal is transferred (with large amplification) to the pump optical radiation.

It can also operate as an all-optical switch, a controlling element and a logic element and can serve as a base element for an optical computer. Many such elements are convenient to be joined into an optical integrated scheme.

In another regime of operation, the device can be used as a shortener and a reshaper of pulses. It can form, shorten and reshape super-short pulses. Obviously it can switch, control and amplify them as well.

Figure 15:
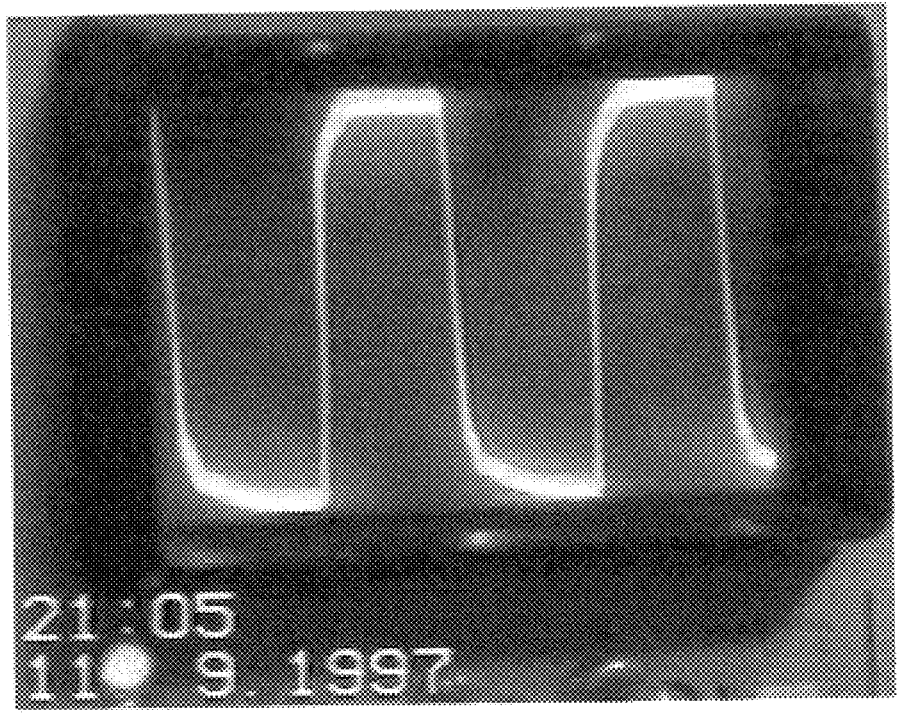
FIG. 15 also shows a photo of an oscilloscope screen, on which an amplified signal is presented. The gain is about 100. A low-noise precision current source and temperature controller and stabilizer (for the nonlinear-optical waveguide and laser) are used. Unlike FIG. 14, a polarizer and/or an optical isolator, mounted before the input of the nonlinear-optical waveguide, is used.

The invention provides the possibility to improve parameters drastically as compared with prior art: pump power was decreased by four orders of magnitude and amplification of the signal was increased by two orders of magnitude (FIG. 15). The technological reserves can improve already achieved record parameters.

What is claimed is:

1. A nonlinear-optical device for switching the power of optical radiation, comprising:
   a) a multilayer semiconductor structure having two outer layers and a plurality of inner layers, said outer layers having different chemical compositions determining the refractive index, wherein said outer layer on one side of said semiconductor structure has p-type conductivity, while said outer layer on an opposite side of said semiconductor structure has n-type conductivity;
   b) a nonlinear-optical waveguide formed from a part of said inner layers of said multilayer semiconductor structure, wherein a part of said inner layers form a core of said nonlinear-optical waveguide which has an MQW-type structure containing at least two hetero-transitions and providing propagation of at least one optical radiation consisting of at least two unidirectional distributively coupled waves,
      wherein said nonlinear-optical waveguide has a nonlinearity selected from the group consisting of cubic nonlinearity, quadratic nonlinearity and simultaneously cubic and quadratic nonlinearity,
      wherein said MQW-type structure has a resonance wavelength $\lambda_r$, said resonance wavelength selected from the group consisting of one-photon exiton resonance, two-photon exiton resonance, band-gap resonance and half-band-gap resonance, said wavelength being in the range of $0.5\,\lambda_r \leq \lambda \leq 1.5\,\lambda_r$, where $\lambda$ is the wavelength of said at least one optical radiation fed into the nonlinear-optical waveguide;
   c) a first electrical contact positioned on said p-type outer layer, said contact electrically connected to said nonlinear-optical waveguide and connecting to a positive pole of a power supply;
   d) a second electrical contact positioned on said n-type outer layer, said contact electrically connected to said nonlinear-optical waveguide connecting to a negative pole of said power supply,
      wherein said first and second electrical contacts pass electric current through said nonlinear-optical waveguide;
   e) an input element inputting at least one optical radiation into said nonlinear-optical waveguide, said input element positioned at an input of said nonlinear-optical waveguide downstream of an optical beam;
   f) an output element outputting at least one optical radiation from said nonlinear-optical waveguide, said output element positioned at an output of said nonlinear-optical waveguide downstream of the optical beam; and
   g) a separator of said unidirectional distributively coupled waves, separating said unidirectional distributively coupled waves and mounted after said output of said nonlinear-optical waveguide downstream of the optical beam,
      wherein said nonlinear-optical waveguide has a length larger than $3\lambda$.

2. The device of claim 1, wherein the concentration of the acceptor dope in said outer layer having p-type conductivity and the concentration of the donor dope in said outer layer having n-type conductivity exceed by at least 2 times the concentration of a dope in said MQW-type structure.

3. The device of claim 1, wherein a separator of said unidirectional distributively coupled waves separates said unidirectional distributively coupled waves and is mounted after the output element downstream of the optical beam.

4. The device of claim 1, wherein when the nonlinear-optical waveguide with cubic nonlinearity is used, the peak power of optical radiation fed into the waveguide is selected within the range of from $0.25\,P_M$ to $4\,P_M$, where $P_M$ is critical power.

5. The device of claim 1, wherein said separator of unidirectional distributively coupled waves serves to separate said unidirectional distributively coupled waves according to a parameter selected from the group consisting of directivity of a polarization vector, frequency, mode number, direction of propagation, distribution of power in time, phase, distribution of intensity of optical radiation in respect to cross section.

6. The device of claim 1, wherein a separator of unidirectional distributively coupled waves selected from the group consisting of a Glan prism, polaroid, polarizing prism, dispersive element, diaphragm, diffraction grating, directional coupler, birefringent prism, birefringent waveguide, frequency filter, optical isolator, waveguide separator of modes and any combination thereof, is used as said separator of said unidirectional distributively coupled waves.

7. The device of claim 1, further comprising a means for setting an operation threshold and maintaining a constant temperature of said nonlinear-optical waveguide, said means selected from the group consisting of at least one Peltier element and a thermostat.

8. The device of claim 7, wherein in the case where the means for setting an operation threshold is made as at least one Peltier element, the device comprises one temperature sensor, and one side of said Peltier element is in thermal contact with said nonlinear-optical waveguide and temperature sensor.

9. The device of claim 8, further comprising a temperature controller which is electrically coupled to said Peltier element and to said temperature sensor.

10. The device of claim 1, wherein a single-mode nonlinear-optical waveguide is used as the nonlinear-optical waveguide.

11. The device of claim 1, wherein said MQW-type structure comprises alternating layers selected from the group consisting of $GaAs/Al_xGa_{1-x}As$, $In_xGa_{1-x}As/InP$,
$In_{1-x}Ga_xAs_yP_{1-y}/In_{1-x'}Ga_{x'}As_{y'}P_{1-y'}$,
$CdSe_{1-x}S_x/CdSe$, $InAs_{1-x}Sb_x/InAs$,
$PbS_xSe_{1-x}/PbSe$, $Ge_xSi_{1-x}/Si$, where $x \neq x'$, $y \neq y'$.

12. The device of claim 1, wherein end faces of said nonlinear-optical waveguide have an antireflection coating.

13. The device of claim 1, wherein a current driver providing an exactness of maintaining the current within the range of from 0.5 mA to 10 mA with an accuracy of 0.01 mA is used as the power supply.

14. The device of claim 1, wherein said nonlinear-optical waveguide is selected from the group consisting of a strip waveguide, ridge waveguide, waveguide with buried heterostructure, waveguide with buried strip heterostructure, waveguide produced by proton implantation method, waveguide produced by method of oxide insulation, waveguide produced by method of diffusion.

15. The device of claim 1, wherein elements selected from the group consisting of an objective, an optical waveguide and any combination thereof are used as said input/output element.

16. The device of claim 15, wherein an element selected from the group consisting of a cylindrical lens, a gradan, a spherical microlens, a focon, and a cylindrical lens and a gradan simultaneously, and any combination thereof, is used as said objective.

17. The device of claim 15, wherein a fiber optical waveguide is used as said optical waveguide.

18. The device of claim 15, wherein when an optical waveguide is used as said input/output element, an optical lens is formed on an end face of said optical waveguide from the side of the nonlinear-optical waveguide.

19. The device of claim 15, wherein when an optical waveguide is used as the input element, a microlens is mounted or an immersion liquid is disposed between an end face of said nonlinear-optical waveguide and an end face of said optical waveguide.

20. The device of claim 1, wherein said input/output elements are connected to the nonlinear-optical waveguide by means of a connection selected from the group consisting of glue, epoxide resin, solder, weld, splice, mechanical connectors.

21. The device of claim 1, further comprising a phase compensator for setting a phase difference of said unidirectional distributively coupled waves at the input into the nonlinear-optical waveguide, is mounted at the input of said nonlinear-optical waveguide, is optically coupled to said nonlinear-optical waveguide, wherein the optical coupling is implemented by means of said input element.

22. The device of claim 1, further comprising an element for setting polarization of optical radiation at the input into said nonlinear-optical waveguide and preventing passage of opposite-directed optical radiation, said element is selected from the group consisting of an optical isolator, a polarizer, a phase compensator, a polarization controller and any combination thereof, is mounted before the input into said nonlinear-optical waveguide, is optically coupled to said nonlinear-optical waveguide, wherein the optical coupling is implemented by means of said input element.

23. The device of claim 1, further comprising an element for modulation of the optical radiation fed into said nonlinear-optical waveguide, said element for modulation of the optical radiation is selected from the group consisting of an amplitude modulator, phase modulator, polarization modulator, frequency modulator, is mounted before the input of said nonlinear-optical waveguide, is optically coupled to said nonlinear-optical waveguide, wherein the optical coupling is implemented by means of said input element.

24. The device of claim 1, further comprising as the source of optical radiation a semiconductor laser equipped with a Peltier element and a temperature sensor and optically coupled to said nonlinear-optical waveguide by means of said input element.

25. The device of claim 1, further comprising a mixer for mixing pump optical radiation and at least one control signal optical radiation, which is mounted before the input of said nonlinear-optical waveguide and is optically coupled to said nonlinear-optical waveguide via the input element.

26. The device of claim 1, wherein an element serving to treat said separated, changing in opposite phase, waves is mounted after said separator of unidirectional distributively coupled waves, the element being selected from the group consisting of a correlator, differential amplifier, and correlator and differential amplifier simultaneously.

27. A nonlinear-optical device for switching the power of optical radiation, comprising:
a) a multilayer semiconductor structure having two outer layers and a plurality of inner layers, said outer layers having different chemical compositions determining a refractive index, wherein said outer layer on one side of said semiconductor structure has p-type conductivity, while said outer layer on an opposite side of said semiconductor structure has n-type conductivity;
b) at least two nonlinear-optical waveguides, tunnel-coupled to each other, which are formed from a part of said inner layers of said multilayer semiconductor structure, wherein a part of said inner layers forming a core of each said nonlinear-optical waveguide has an MQW-type structure containing at least two heterotransitions and providing propagation of at least one optical radiation,
wherein at least one of said nonlinear-optical waveguides has a nonlinearity selected from the group consisting of cubic nonlinearity, quadratic nonlinearity, and simultaneously cubic and quadratic nonlinearity, wherein said MQW-type structure having a resonance wavelength $\lambda_r$, the resonance selected from the group consisting of one-photon exiton resonance, two-photon exiton resonance, band-gap resonance and half-band-gap resonance, said wavelength being in the range of 0.5 $\lambda_r \leq \lambda \leq 1.5$ $\lambda_r$, where $\lambda$ is the wavelength of said at least one optical radiation is fed into at least one nonlinear-optical waveguide;

c) a first electrical contact positioned on said outer p-type layer, said contact electrically connected to said nonlinear-optical waveguide and connecting to a positive pole of a power supply;

d) a second electrical contact positioned on said outer n-type layer, said contact electrically connected to said nonlinear-optical waveguide connecting to a negative pole of said power supply, wherein said first and second electrical contacts pass electric current through said nonlinear-optical waveguide;

e) at least one input element inputting at least one optical radiation into said nonlinear-optical waveguide, said input element positioned at an input of said at least one nonlinear-optical waveguide downstream of an optical beam; and f) at least one output element outputting at least one optical radiation from said at least one nonlinear-optical waveguide, said output element positioned at an output of said nonlinear-optical waveguide downstream of the optical beam, wherein the length of the tunnel coupling of said at least two nonlinear-optical waveguide is larger than $3\lambda$, wherein single-mode nonlinear-optical waveguides are used as the tunnel-coupled nonlinear-optical waveguides.

28. The device of claim 27, wherein the concentration of the acceptor dope in said outer layer having p-type conductivity and the concentration of the donor dope in said outer layer having n-type conductivity exceed by at least 2 times the concentration of a dope in said MQW-type structure.

29. The device of claim 27, wherein when the nonlinear-optical waveguide with cubic nonlinearity is used, the peak power of optical radiation fed into the waveguide is selected within the range of from 0.25 $P_M$ to 4 $P_M$, where $P_M$ is critical power.

30. The device of claim 27, further comprising a means for setting an operation threshold and maintaining a constant temperature of said nonlinear-optical waveguides, said means selected from the group consisting of at least one Peltier element and a thermostat.

31. The device of claim 30, wherein in the case where the means for setting an operation threshold is made as at least one Peltier element, the device comprises one temperature sensor, and one side of said Peltier element is in thermal contact with said nonlinear-optical waveguides and temperature sensor.

32. The device of claim 27, further comprising a temperature controller which is electrically coupled to said Peltier element and to said temperature sensor.

33. The device of claim 27, wherein said MQW-type structure comprises alternating layers selected from the group consisting of $GaAs/Al_xGa_{1-x}As$, $In_xGa_{1-x}As/InP$,
$In_{1-x}Ga_xAs_yP_{1-y}/In_{1-x'}Ga_{x'}As_{y'}P_{1-y'}$,
$CdSe_{1-x}S_x/CdSe$, $InAs_{1-x}Sb_x/InAs$,
$PbS_xSe_{1-x}/PbSe$, $Ge_xSi_{1-x}/Si$,
where $x \neq x'$, $y \neq y'$.

34. The device of claim 27, wherein end faces of said nonlinear-optical waveguides have an antireflection coating.

35. The device of claim 27, wherein a current driver providing an exactness of maintaining the current within the range of from 0.5 mA to 10 mA with an accuracy of 0.01 mA is used as the power supply.

36. The device of claim 27, wherein said input/output elements are connected to said at least one nonlinear-optical waveguide by means of a connection selected from the group consisting of glue, epoxide resin, solder, weld, splice, mechanical connectors.

37. The device of claim 27, further comprising an element for setting a phase difference between waves at the inputs into the tunnel-coupled nonlinear-optical waveguides, said element for setting a phase difference is selected from the group consisting of a phase compensator, a polarization controller, is mounted at the input of at least one said nonlinear-optical waveguide, is optically coupled to said nonlinear-optical waveguide, wherein the optical coupling is implemented by means of said input optical elements.

38. The device of claim 27, further comprising at least one optical isolator, for preventing passage of opposite-directed optical radiation, said optical isolator is mounted before the input into at least one of said nonlinear-optical waveguides, is optically coupled to said nonlinear-optical waveguide, wherein the optical coupling is implemented by means of said input element.

39. The device of claim 27, further comprising an element for modulation of the optical radiation fed into said nonlinear-optical waveguide, said element for modulation of the optical radiation is selected from the group consisting of an amplitude modulator, a phase modulator, a polarization modulator, a frequency modulator, is mounted before the input of one of said nonlinear-optical waveguides, is optically coupled to said nonlinear-optical waveguide, wherein the optical coupling is implemented by means of said optical input element of optical radiation.

40. The device of claim 27, further comprising as a source of optical radiation at least one semiconductor laser, equipped with a Peltier element and a temperature sensor, which is optically coupled with at least one of said nonlinear-optical waveguides by means of said optical radiation input element.

41. The device of claim 27, further comprising a mixer for mixing -pump optical radiation and at least one control signal optical radiation, which is mounted before the input of at least one of said nonlinear-optical waveguides and is optically coupled to said nonlinear-optical waveguide via the input element.

42. The device of claim 27, wherein an element serving to treat said separated waves, changing in time in respect to power in opposite phase, is mounted after exit from said tunnel-coupled nonlinear-optical waveguides, the element being selected from the group consisting of a correlator, differential amplifier, and simultaneously correlator and differential amplifier.

43. The device of claim 27, further comprising a separator of waves in respect to frequency and polarization, the separator is mounted after the output from at least one of said nonlinear-optical waveguides, is optically coupled to said nonlinear-optical waveguides, wherein the optical coupling is implemented by means of said output element.

44. A nonlinear-optical device for switching the power of optical radiation, comprising:

a) a multilayer semiconductor structure having two outer layers and a plurality of inner layers, said outer layers having different chemical compositions determining the refractive index, wherein said outer layer on one side of said semiconductor structure has p-type conductivity, while said outer layer on an opposite side of said semiconductor structure has n-type conductivity;

b) a nonlinear-optical waveguide formed from a part of said inner layers of said multilayer semiconductor structure, wherein a part of said inner layers form a core of said nonlinear-optical waveguide which has an MQW-type structure containing at least two hetero-transitions and providing propagation of at least one optical radiation consisting of at least two unidirectional distributively coupled waves, wherein said nonlinear-optical waveguide has a nonlinearity selected from the group consisting of cubic nonlinearity, quadratic nonlinearity and simultaneously cubic and quadratic nonlinearity, wherein said MQW-type structure has a resonance wavelength $\lambda_r$, said resonance wavelength selected from the group consisting of one-photon exiton resonance, two-photon exiton resonance, band-gap resonance and half-band-gap resonance, said wavelength being in the range of $0.5\ \lambda_r \leq \lambda \leq 1.5\ \lambda_r$, where $\lambda$ is the wavelength of said at least one optical radiation fed into the nonlinear-optical waveguide;

c) a first electrical contact positioned on said outer p-type layer, said contact electrically connected to said nonlinear-optical waveguide and connecting to a positive pole of a power supply;

d) a second electrical contact positioned on said n-type outer layer, said contact electrically connected to said nonlinear-optical waveguide and connecting to a negative pole of said power supply, wherein said first and second electrical contacts pass electric current through said nonlinear-optical waveguide;

e) an input element inputting at least one optical radiation into said nonlinear-optical waveguide, positioned at an input of said nonlinear-optical waveguide downstream of an optical beam; and f) an output element outputting at least one optical radiation from said nonlinear-optical waveguide, positioned at an output of said nonlinear-optical waveguide downstream of an optical beam.

45. The device of claim 44, wherein the concentration of the acceptor dope in said outer layer having p-type conductivity and the concentration of the donor dope in said outer layer having n-type conductivity exceed by at least 2 times the concentration of a dope in said MQW-type structure.

46. The device of claim 44, wherein a means for forming coupling is selected from the group consisting of a distributed periodic Bragg grating made in a layer of said semiconductor wafer nearby said MQW-type structure, mirrors formed on end faces of the nonlinear-optical waveguide, and Bragg mirrors formed adjacent to the ends of the nonlinear-optical waveguide.

47. The device of claim 44, further comprising a means for setting an operation threshold and maintaining a constant temperature of said nonlinear-optical waveguide, said means selected from the group consisting of at least one Peltier element and a thermostat.

48. The device of claim 44, wherein in the case where the means for setting an operation threshold is made at least one Peltier element, the device comprises one temperature sensor, and one side of said Peltier element is in thermal contact with said nonlinear-optical waveguide and temperature sensor.

49. A method for producing a nonlinear-optical module for a nonlinear-optical device for switching the power of optical radiation, comprising the following steps:

a) providing a multilayer semiconductor structure having two outer layers and a plurality of inner layers, said outer layers having different chemical compositions determining the refractive index, wherein said outer layer on one side of said semiconductor structure has p-type conductivity, while said outer layer on an opposite side of said semiconductor structure has n-type conductivity;

b) providing at least one nonlinear-optical waveguide, which are formed from a part of said inner layers of said multilayer semiconductor structure, wherein a part of said inner layers forming a core of said at least one nonlinear-optical waveguide has an MQW-type structure containing at least two hetero-transitions and providing propagation of at least one optical radiation consisting of at least two coupled waves, wherein said nonlinear-optical waveguide has a nonlinearity selected from the group consisting of cubic nonlinearity, quadratic nonlinearity and simultaneously cubic and quadratic nonlinearity wherein said MQW-type structure has a resonance wavelength $\lambda_r$, said resonance wavelength selected from the group consisting of one-photon exiton resonance, two-photon exiton resonance, band-gap resonance and half-band-gap resonance, said wavelength being in the range of $0.5\ \lambda \leq \lambda_r \leq 1.5\lambda$, where $\lambda$ is the wavelength of said at least one optical radiation fed into the nonlinear-optical waveguide;

c) positioning a first electrical contact on said outer p-type layer, said contact being electrically connected to said nonlinear-optical waveguide and connecting to a positive pole of a power supply;

d) positioning a second electrical contact on said outer n-type layer, said contact being electrically connected to said nonlinear-optical waveguide and connecting to a negative pole of said power supply;

e) connecting a power supply to said first and second electrical contacts;

f) passing a current through said nonlinear-optical waveguide, wherein the current value is set greater than a threshold value determined by the occurrence of injection luminescent radiation in said nonlinear-optical waveguide;

g) placing an input element, inputting optical radiation into said nonlinear-optical waveguide in operation of the nonlinear-optical device, adjacent to one end of said nonlinear-optical waveguide, wherein alignment of said input element relative to said nonlinear-optical waveguide is carried out by means of using injection luminescent radiation which occurs when current passes in said nonlinear-optical waveguide;

h) fixing said input element relative to said nonlinear-optical waveguide;

i) placing an output element, outputting optical radiation from said nonlinear-optical waveguide in operation of the nonlinear-optical device, adjacent to another end of said nonlinear-optical waveguide, wherein alignment of said output element relative to said nonlinear-optical waveguide is carried out by means of using luminescent radiation which occurs when current passes in said nonlinear-optical waveguide; and j) fixing said output element relative to said nonlinear-optical waveguide.

50. The method of claim 49, wherein said outer layers are doped so that the concentration of the acceptor dope in said outer layer having p-type conductivity, and the concentration of the donor dope in said outer layer having n-type conductivity exceeds by at least 2 times the concentration of a dope in said MQW-type structure.

51. The method of claim 49, wherein unidirectional distributively coupled waves are used as said coupled waves.

52. The method of claim 51, wherein a separator of unidirectional distributively coupled waves is additionally used, the separator serving to separate unidirectional distributively coupled waves and mounted after the optical radiation output element downstream of the optical beam.

53. The method of claim 49, wherein the power supply is a current driver providing a flow of current through the nonlinear-optical waveguide, which is above the threshold value necessary for initiation of injection luminescence in said nonlinear-optical waveguide.

54. The method of claim 49, wherein an element selected from the group consisting of an objective and an optical waveguide is used as said input/output element.

55. The method of claim 54, wherein an element selected from the group consisting of a cylindrical lens, a gradan, spherical microlens, focon, and a cylindrical lens and gradan simultaneously, and any combination thereof, is used as said objective.

56. The method of claim 54, wherein a fiber optical waveguide is used as said optical waveguide.

57. The method of claim 54, wherein when an optical waveguide is used as the input/output element, a microlens is mounted or an immersion liquid is disposed between an end face of said nonlinear-optical waveguide and an end face of said optical waveguide.

58. The method of claim 54, wherein when an objective is used as the input/output element, positioning, mounting and fixing said objective relative to a closest end face of said nonlinear-optical waveguide are carried out until a beam of optical luminescent radiation is formed, the beam selected from the group consisting of a collimated beam of optical radiation, an axial-symmetrical beam of optical radiation, and a simultaneously collimated and axial-symmetrical beam of optical radiation.

59. The method of claim 54, wherein when said optical waveguide is used as the input/output element, positioning, mounting and fixing the end face of said optical waveguide relative to the closest end face of said nonlinear-optical waveguide are carried out, wherefore:

a) said luminescent radiation is fed to an end face of said optical waveguide;

b) the power of said luminescent radiation passing through said optical waveguide is measured and the position of said end face of the waveguide is determined at the moment of achievement of the maximum value of the power of optical luminescent radiation at another end of the optical waveguide; and c) said end face of the optical waveguide is fixed relative to the nonlinear-optical waveguide.

60. The method of claim 58, wherein when an optical waveguide is used as the input/output element, an optical lens is formed on the end face of said optical waveguide.

61. The method of claim 49, wherein fixation is carried out by means of an operation selected from the group consisting of gluing, welding, soldering, mechanically connecting.

62. A method for assembling nonlinear-optical modules into an optical circuit, comprising the following steps:

a) mounting an input element of a second nonlinear-optical module, adjacent to an output element of a first nonlinear-optical module;

b) passing an electric current through at least one nonlinear-optical waveguide of at least one of said nonlinear-optical modules, said electric current having a value higher than a threshold value determined by the occurrence of injection luminescent radiation in said nonlinear-optical waveguide;

c) positioning said input element of the second module relative to said output element of the first module using injection luminescent radiation occurring when current passes in said nonlinear-optical waveguide of said nonlinear-optical module; and d) fixing said input element of the second module relative to said output element of the first module.

* * * * *